US009594842B2

(12) United States Patent
Pope et al.

(10) Patent No.: US 9,594,842 B2
(45) Date of Patent: Mar. 14, 2017

(54) HASHING ALGORITHM FOR NETWORK RECEIVE FILTERING

(71) Applicant: SOLARFLARE COMMUNICATIONS, INC., Irvine, CA (US)

(72) Inventors: Steven L. Pope, Costa Mesa, CA (US); Derek Roberts, Cambridge (GB); David J. Riddoch, Huntingdon (GB); Ching Yu, Santa Clara, CA (US); John Mingyung Chiang, San Jose, CA (US); Der-Ren Chu, San Jose, CA (US)

(73) Assignee: SOLARFLARE COMMUNICATIONS, INC., Irvine, CA (US)

( * ) Notice: Subject to any disclaimer, the term of this patent is extended or adjusted under 35 U.S.C. 154(b) by 0 days.

(21) Appl. No.: 14/611,105

(22) Filed: Jan. 30, 2015

(65) Prior Publication Data

US 2015/0142832 A1    May 21, 2015

Related U.S. Application Data

(63) Continuation of application No. 13/162,421, filed on Jun. 16, 2011, now Pat. No. 8,959,095, which is a
(Continued)

(51) Int. Cl.
*G06F 17/30* (2006.01)
*H04L 12/747* (2013.01)
(Continued)

(52) U.S. Cl.
CPC .. *G06F 17/30867* (2013.01); *G06F 17/30864* (2013.01); *H04L 45/742* (2013.01);
(Continued)

(58) Field of Classification Search
CPC .......................... G06F 17/30867; H04L 45/742
(Continued)

(56) References Cited

U.S. PATENT DOCUMENTS 5,272,599 A    12/1993  Koenen
5,325,532 A     6/1994  Crosswy et al.
(Continued)

FOREIGN PATENT DOCUMENTS

EP        620521 A2    10/1994
EP       2363996 A1     9/2011
(Continued)

OTHER PUBLICATIONS

Dixon JT et al., "Tuning TCP and UDP Demultiplexing," Georgia Institute of Technology, CC Technical Report GIT-CC-09-09, 1998, 36 pp.
(Continued)

*Primary Examiner* — Shahid Alam
(74) *Attorney, Agent, or Firm* — Haynes Beffel & Wolfeld LLP

(57) ABSTRACT

Roughly described, a network interface device is assigned a maximum extent-of-search. A hash function is applied to the header information of each incoming packet, to generate a hash code for the packet. The hash code designates a particular subset of the table within which the particular header information should be found, and an iterative search is made within that subset. If the search locates a matching entry before the search limit is exceeded, then the incoming data packet is delivered to the receive queue identified in the matching entry. But if the search reaches the search limit before a matching entry is located, then device delivers the packet to a default queue, such as a kernel queue, in the host computer system. The kernel is then responsible for delivering the packet to the correct endpoint.

30 Claims, 29 Drawing Sheets

Related U.S. Application Data continuation of application No. 11/255,124, filed on Oct. 20, 2005, now Pat. No. 7,984,180.

(51) Int. Cl.

| | |
|---|---|
| *H04L 12/741* | (2013.01) |
| *H04L 12/861* | (2013.01) |
| *H04L 29/06* | (2006.01) |
| *H04L 29/08* | (2006.01) |
| *H04L 12/851* | (2013.01) |
| *H04L 12/863* | (2013.01) |

(52) U.S. Cl.
CPC ............ *H04L 45/745* (2013.01); *H04L 49/90* (2013.01); *H04L 67/10* (2013.01); *H04L 69/16* (2013.01); *H04L 69/161* (2013.01); *H04L 69/162* (2013.01); *H04L 69/163* (2013.01); *H04L 69/164* (2013.01); *H04L 69/22* (2013.01); *H04L 47/2441* (2013.01); *H04L 47/621* (2013.01); *Y10S 707/922* (2013.01)

(58) Field of Classification Search
USPC ........................................................ 707/754
See application file for complete search history.

(56) References Cited

U.S. PATENT DOCUMENTS

| | | | |
|---|---|---|---|
| 5,682,341 A | 10/1997 | Kim et al. | |
| 5,740,467 A | 4/1998 | Chmielecki, Jr. et al. | |
| 5,914,938 A | 6/1999 | Brady et al. | |
| 5,946,189 A | 8/1999 | Koenen et al. | |
| 6,098,112 A | 8/2000 | Ishijima et al. | |
| 6,160,554 A | 12/2000 | Krause | |
| 6,304,945 B1 | 10/2001 | Koenen | |
| 6,334,162 B1 | 12/2001 | Garrett et al. | |
| 6,349,035 B1 | 2/2002 | Koenen | |
| 6,397,316 B2 | 5/2002 | Fesas, Jr. | |
| 6,424,650 B1 | 7/2002 | Yang et al. | |
| 6,438,130 B1 | 8/2002 | Kagan et al. | |
| 6,502,203 B2 | 12/2002 | Barron et al. | |
| 6,510,164 B1 | 1/2003 | Ramaswamy et al. | |
| 6,526,066 B1 | 2/2003 | Weaver | |
| 6,530,007 B2 | 3/2003 | Olarig et al. | |
| 6,597,661 B1 | 7/2003 | Bonn | |
| 6,667,918 B2 | 12/2003 | Leader et al. | |
| 6,675,163 B1 | 1/2004 | Bass et al. | |
| 6,683,865 B1 | 1/2004 | Garcia-Luna-Aceves et al. | |
| 6,708,218 B1 * | 3/2004 | Ellington, Jr. ........... H04L 29/06 709/230 | |
| 6,718,392 B1 | 4/2004 | Krause | |
| 6,728,743 B2 | 4/2004 | Shachar | |
| 6,735,642 B2 | 5/2004 | Kagan et al. | |
| 6,768,996 B1 | 7/2004 | Steffens et al. | |
| 6,798,777 B1 | 9/2004 | Ferguson et al. | |
| 6,880,089 B1 | 4/2005 | Bommareddy et al. | |
| 6,888,797 B1 | 5/2005 | Cao et al. | |
| 6,904,534 B2 | 6/2005 | Koenen | |
| 6,909,713 B2 | 6/2005 | Magnussen et al. | |
| 6,950,961 B2 | 9/2005 | Krause et al. | |
| 6,959,297 B2 | 10/2005 | Oh et al. | |
| 6,970,462 B1 * | 11/2005 | McRae ............... H04L 41/0893 370/392 | |
| 6,978,331 B1 | 12/2005 | Kagan et al. | |
| 7,068,652 B2 | 6/2006 | Lin et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,133,400 B1 | 11/2006 | Henderson et al. | |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,216,225 B2 | 5/2007 | Haviv et al. | |
| 7,227,842 B1 * | 6/2007 | Ji ........................... H04L 45/00 370/235 |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,260,565 B2 | 8/2007 | Lee et al. | |
| 7,285,996 B2 | 10/2007 | Fiedler | |
| 7,304,992 B2 | 12/2007 | Relan | |
| 7,316,017 B1 | 1/2008 | Jacobson et al. | |
| 7,346,702 B2 | 3/2008 | Haviv | |
| 7,386,619 B1 | 6/2008 | Jacobson et al. | |
| 7,397,797 B2 | 7/2008 | Alfieri et al. | |
| 7,403,535 B2 | 7/2008 | Modi et al. | |
| 7,404,190 B2 | 7/2008 | Krause et al. | |
| 7,478,426 B2 | 1/2009 | Corl, Jr. et al. | |
| 7,480,302 B2 | 1/2009 | Choi | |
| 7,502,826 B2 | 3/2009 | Barron et al. | |
| 7,509,355 B2 | 3/2009 | Hanes et al. | |
| 7,518,164 B2 | 4/2009 | Smelloy et al. | |
| 7,551,614 B2 | 6/2009 | Teisberg et al. | |
| 7,554,993 B2 | 6/2009 | Modi et al. | |
| 7,573,880 B2 | 8/2009 | Kaxiras et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,631,106 B2 | 12/2009 | Goldenberg et al. | |
| 7,650,386 B2 | 1/2010 | McMahan et al. | |
| 7,653,754 B2 | 1/2010 | Kagan et al. | |
| 7,688,853 B2 | 3/2010 | Santiago et al. | |
| 7,689,485 B2 | 3/2010 | Kanekar et al. | |
| 7,757,232 B2 | 7/2010 | Hilland et al. | |
| 7,801,027 B2 | 9/2010 | Kagan et al. | |
| 7,802,071 B2 | 9/2010 | Oved | |
| 7,813,460 B2 | 10/2010 | Fiedler | |
| 7,827,442 B2 | 11/2010 | Sharma et al. | |
| 7,835,375 B2 | 11/2010 | Sarkinen et al. | |
| 7,848,322 B2 | 12/2010 | Oved | |
| 7,856,488 B2 | 12/2010 | Cripe et al. | |
| 7,864,787 B2 | 1/2011 | Oved | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,930,437 B2 | 4/2011 | Kagan et al. | |
| 7,934,959 B2 | 5/2011 | Rephaeli et al. | |
| 7,978,606 B2 | 7/2011 | Buskirk et al. | |
| 8,000,336 B2 | 8/2011 | Harel | |
| 2002/0023089 A1 | 2/2002 | Woo | |
| 2002/0059052 A1 | 5/2002 | Bloch et al. | |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0152209 A1 | 10/2002 | Merugu et al. | |
| 2002/0156784 A1 | 10/2002 | Hanes et al. | |
| 2002/0198981 A1 | 12/2002 | Corl et al. | |
| 2003/0007165 A1 | 1/2003 | Hudson | |
| 2003/0043805 A1 | 3/2003 | Graham et al. | |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0081060 A1 | 5/2003 | Zeng et al. | |
| 2003/0081615 A1 | 5/2003 | Kohn et al. | |
| 2003/0172330 A1 | 9/2003 | Barron et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2004/0071250 A1 | 4/2004 | Bunton et al. | |
| 2004/0141642 A1 | 7/2004 | Zeng et al. | |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0210754 A1 | 10/2004 | Barron et al. | |
| 2004/0252685 A1 | 12/2004 | Kagan et al. | |
| 2005/0008223 A1 | 1/2005 | Zeng et al. | |
| 2005/0018221 A1 | 1/2005 | Zeng et al. | |
| 2005/0038918 A1 | 2/2005 | Hilland et al. | |

(56) References Cited

U.S. PATENT DOCUMENTS

| | | |
|---|---|---|
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0231751 A1 | 10/2005 | Wu et al. |
| 2006/0026443 A1 | 2/2006 | McMahan et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0011734 A1* | 1/2007 | Balakrishnan ........ H04L 43/026 726/13 |
| 2007/0188351 A1 | 8/2007 | Brown et al. |
| 2007/0220183 A1 | 9/2007 | Kagan et al. |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0165003 A1 | 6/2009 | Jacobson et al. |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0302923 A1 | 12/2009 | Smeloy et al. |
| 2010/0088437 A1 | 4/2010 | Zahavi |
| 2010/0138840 A1 | 6/2010 | Kagan et al. |
| 2010/0169880 A1 | 7/2010 | Haviv et al. |
| 2010/0188140 A1 | 7/2010 | Smeloy |
| 2010/0189206 A1 | 7/2010 | Kagan |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |

FOREIGN PATENT DOCUMENTS

| | | |
|---|---|---|
| WO | 0148972 A1 | 7/2001 |
| WO | 0235838 A1 | 5/2002 |
| WO | 2005104453 A1 | 11/2005 |
| WO | 2008127672 A2 | 10/2008 |
| WO | 2009134219 A1 | 11/2009 |
| WO | 2009136933 A1 | 11/2009 |
| WO | 2010020907 A2 | 2/2010 |
| WO | 2010087826 A1 | 8/2010 |
| WO | 2011043769 A1 | 4/2011 |
| WO | 2011053305 A1 | 5/2011 |
| WO | 2011053330 A1 | 5/2011 |

OTHER PUBLICATIONS

PCT/GB2006/003828—International Preliminary Report on Patentability, Chapter I, mailed May 2, 2008, 11 pages.

Moore, Gordon E., Electronics, vol. 38, No. 8, pp. 114-117, 1965, Apr. 19, 1965.

Dennis, Jack B. and Van Horn, Earl C., Communications of the ACM, vol. 9, No. 3, pp. 143-155, 1966, Mar. 1966.

Zelkowitz, Marvin, Communications of the ACM, vol. 14, No. 6, p. 417-418, 1971, Jun. 1971.

Hill, J. Carver, Communications of the ACM, vol. 16, No. 6, p. 350-351, 1973, Jun. 1973.

Kuo, F.F., "The ALOHA system," ACM Computer Communication Review, vol. 4 No. 1, 1974, Jan. 1974, pp. 5-8.

Cerf, Vinton and Kahn, Robert, IEEE Transactions on Communications, vol. COM-22, No. 5, pp. 637-648, 1974, May 1974.

Cerf, V., et al.; ACM Computer Communication Review, vol. 6 No. 1, p. 1-18, 1976, Jan. 1976.

Metcalfe, Robert M. and Boggs, David R., Communications of the ACM, vol. 19, Issue 7, pp. 395-404, 1976, Jul. 1976.

Kermani, P. and Kleinrock, L. Computer Networks, vol. 3, No. 4, pp. 267-286, 1979, Sep. 1979.

McQuillan, John M., et al.; Proceedings of the 6th Data Communications Symposium, p. 63, 1979, Nov. 1979.

Birrell, Andrew D., et al.; Communications of the ACM, vol. 25, Issue 4, pp. 260-274, 1982, Apr. 1982.

Leslie, Ian M., et al.; ACM Computer Communication Review, vol. 14, No. 2, pp. 2-9, 1984, Jun. 1984.

Nagle, John, ACM Computer Communication Review, vol. 14, No. 4, p. 11-17, 1984, Oct. 1984.

Brandriff, Robert K., et al.; "Development of a TCP/IP for the IBM/370," ACM SIGCOMM Computer Communication Review, vol. 15, No. 4, 1985, Sep. 1985, pp. 2-8.

Kline, C., "Supercomputers on the internet: a case study," ACM Computer Communication Review, vol. 17, No. 5, 1987, Aug. 1987, pp. 27-33.

Kent, Christopher A. and Mogul, Jeffrey C., ACM Computer Communication Review, vol. 17, No. 5, pp. 390-401, 1987, Oct. 1987.

Delp, Gary S., et al.; ACM Computer Communication Review, vol. 18, No. 4, p. 165-174, 1988, Aug. 1988.

Boggs, David R., et al.; ACM Computer Communication Review, vol. 18, No. 4, p. 222-234, 1988, Aug. 1988.

Kanakia, H. and Cheriton, D., ACM Computer Communication Review, vol. 18, No. 4, p. 175-187, 1988, Aug. 1988.

Jacobson, V., ACM Computer Communication Review, vol. 18, No. 4, p. 314-329, 1988, Aug. 1988.

Clark, David D., ACM Computer Communication Review, vol. 18, No. 4, pp. 106-114, 1988, Aug. 1988.

Mockapetris, Paul V. and Dunlap, Kevin J., ACM Computer Communication Review, vol. 18, No. 4, pp. 123-133, 1988, Aug. 1988.

Simmons, Margaret L. and Wasserman, Harvey J., Proceedings of the 1988 ACM/IEEE conference on Supercomputing, p. 288-295, Orlando, Florida, Nov. 12, 1988.

Borman, David A., ACM Computer Communication Review, vol. 19, No. 2, p. 11-15, 1989, Apr. 1989.

Braden, R., et al.; ACM Computer Communication Review, vol. 19, No. 2, p. 86-94, 1989, Apr. 1989.

Clark, David D., et al.; IEEE Communications Magazine, vol. 27, No. 6, pp. 23-29, 1989, Jun. 1989.

Cheriton, David R., ACM Computer Communication Review, vol. 19, No. 4, p. 158-169, 1989, Sep. 1989.

McAuley, Derek Robert, "Protocol Design for High Speed Networks," Ph.D. Thesis, University of Cambridge, 1989, Sep. 1989, 104 pp.

Partridge, Craig, ACM Computer Communication Review, vol. 20, No. 1, p. 44-53, 1990, Jan. 1990.

Clark, D. D. and Tennenhouse, D. L., ACM Computer Communication Review, vol. 20, No. 4, pp. 200-208, 1990, Sep. 1990.

Cooper, Eric C., et al.; ACM Computer Communication Review, vol. 20, No. 4, p. 135-144, 1990, Sep. 1990.

Davie, Bruce S., "A host-network interface architecture for ATM," ACM Computer Communication Review, vol. 21, No. 4, 1991, Sep. 1991, pp. 307-315.

Traw, C. Brendan S., et al.; ACM Computer Communication Review, vol. 21, No. 4, p. 317-325, 1991, Sep. 1991.

(56) References Cited

OTHER PUBLICATIONS

Leslie, Ian and McAuley, Derek R., ACM Computer Communication Review, vol. 21, No. 4, p. 327, 1991, Sep. 1991.
Hayter, Mark and McAuley, Derek, ACM Operating Systems Review, vol. 25, Issue 4, p. 14-21, 1991, Oct. 1991.
Finn, Gregory G., ACM Computer Communication Review, vol. 21, No. 5, p. 18-29, 1991, Oct. 1991.
Chesson, Greg, "The Evolution of XTP," Proceedings of the Third International Conference on High Speed Networking, 1991, Nov. 1991, 10 pp.
Dixon, Michael J., "System support for multi-service traffic," University of Cambridge Computer Laboratory Technical Report No. 245, Jan. 1992, 113 pp.
Cohen, Danny; Finn, Gregory; Felderman, Robert; DeSchon, Annette; Made available by authors, Jan. 10, 1992, "ATOMIC: A Local Communication Network Created through Repeated Application of Multicomputing Components," 11 pp + cover.
Tsudik, Gene, ACM Computer Communication Review, vol. 22, No. 5, pp. 29-38, 1992, Oct. 1992.
Steenkiste, Peter, "Analyzing communication latency using the Nectar communication processor," ACM Computer Communication Review, vol. 22, No. 4, 1992, Oct. 1992, pp. 199-209.
McKenney, Paul E. and Dove, Ken F., "Efficient demultiplexing of incoming TCP packets," ACM Computer Communication Review, vol. 22, No. 4, 1992, Oct. 1992, pp. 269-279.
Ruetsche, Erich and Kaiserswerth, Matthias, "TCP/IP on the parallel protocol engine," Proceedings of the IFIP TC6/WG6, 4 Fourth International Conference on High Performance Networking IV, Dec. 14, 1992, pp. 119-134.
Traw, C. and Smith, J., IEEE Journal on Selected Areas in Communications, pp. 240-253, 1993, Feb. 1993.
Ruetsche, E., "The architecture of a Gb/s multimedia protocol adapter," ACM Computer Communication Review, vol. 23, No. 3, 1993, Jul. 1993, pp. 59-68.
Smith, Jonathan M. and Traw, C. Brendan S., IEEE Network, vol. 7, Issue 4, pp. 44-52, 1993, Jul. 1993.
Michel, Jeffrey R., "The Design and Evaluation of an Off-Host Communications Protocol Architecture," M.Sci. Thesis, University of Virginia, 1993, Aug. 1993, 139 pp.
Hayter, Mark David, "A Workstation Architecture to Support Multimedia," Ph.D. Thesis, University of Cambridge, 1993, Sep. 1993, 111 pp.
Mogl,., "TCP offload is a dumb idea whose time has come," USENIX Assoc., Proceedings of HotOS IX: The 9th Workshop on Hot Topics in Operating Systems, May 2003, pp. 24-30.
Petrini, F., "Protocol Off-loading vs On-loading in High-Performance Networks," 14th Symposium on High Performance Interconnects, Aug. 23, 2006, 4pp.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.
U.S. Appl. No. 11/25,124—Notice of Allowance dated Mar. 10, 2011, 6 pp.
Microsoft Corp., Microsoft Windows, "Scalable Networking with RSS", WinHEC 2005 Update, Apr. 19, 2005.
Compaq Computer Corp., Intel Corp, Microsoft Corp., "Virtual Interface Architecture Specification", Version 1.0, Dec. 16, 1997.
Wartik et al, "Information Retrieval Data Structures & Algorithms", Hashing Algorithms, Chapter 13, Software Productivity Consortium, Virginia Polytechnic Institute and State University, Prentice-Hall, Inc., Upper Saddle River, New Jersey, 1992.
Information Sciences Institute, University of Southern California, Marina del Rey, CA, "Transmission Control Protocol", Darpa Internet Program Protocol Specification, pp. 1-84, Sep. 1981.
J. Postel, "User Datagram Protocol", Isi Aug. 28, 1980, pp. 1-3.
Riddoch, David et al.; "Distributed Computing With the CLAM Network"; Laboratory for Communications Engineering, Cambridge, England; SIGCOMM 2002, 13 pages.
Mansley, Kieran; "Engineering a User-Level TCP for the Clan Network"; Laboratory for Communication Engineering, University of Cambridge, Cambridge, England; AGM SIGCOMM Aug. 2003 Workshops, 228-236.
Kay, Jonathan and Pasquale, Joseph, ACM Computer Communication Review, vol. 23, No. 4, pp. 259-268, 1993, Oct. 1993.
Leland, W. E., et al.; ACM Computer Communication Review, vol. 23, No. 4, p. 85-95, 1993, Oct. 1993.
Thekkath, C. A., et al., "Implementing network protocols at user level," ACM Computer Communication Review, vol. 23, No. 4, 1993, Oct. 1993, pp. 64-73.
Singh, Raj K., et al.; Proceedings of the 1993 ACM/IEEE conference on Supercomputing, p. 452-461, Portland, Oregon, Nov. 15, 1993.
Druschel, Peter and Peterson, Larry L., ACM Operating Systems Review, vol. 27, Issue 5, p. 189-202, 1993, Dec. 1993.
Kaiserswerth, Matthias, IEEE/ACM Transactions on Networking, vol. 1, No. 6, p. 650-663, 1993, Dec. 1993.
Maeda, Chris and Bershad, Brian, ACM Operating Systems Review, vol. 27, Issue 5, p. 244-255, 1993, Dec. 1993.
Regnier, Greg, et al.; IEEE Micro, vol. 24, No. 1, p. 24-31, 1994, Jan. 1994.
Vis, J., ACM Computer Communication Review, vol. 24, No. 1, pp. 7-11, 1994, Jan. 1994.
Cohen, Danny; Finn, Gregory; Felderman, Robert; and DeSchon, Annette, "Atomic: A High Speed Local Communication Architecture," Journal of High Speed Networks, vol. 3:1 (1994), pp. 1-28.
Finn, Gregory G. and Mockapetris, Paul, "Netstation Architecture Multi-Gigabit Workstation Network Fabric," Proceedings of InterOp '94, Las Vegas, Nevada, May 1994, 9pp.
Wray, Stuart, et al.; Proceedings of the International Conference on Multimedia Computing and Systems, p. 265-273, Boston, 1994, May 1994.
"MPI: A Message-Passing Interface Standard," various forum members, Message-Passing Interface Forum, University of Tennessee, Knoxville, 1994, May 5, 1994 (corrected version), 239 pp.
Singh, Raj K., et al.; ACM Computer Communication Review, vol. 24, No. 3, p. 8-17, 1994, Jul. 1994.
Druschel, P., et al. "Experiences with a high-speed network adaptor: a software perspective," ACM Computer Communication Review, vol. 24, No. 4, 1994, Oct. 1994, pp. 2-13.
Floyd, Sally, ACM Computer Communication Review, vol. 24, No. 5, p. 8-23, 1994, Oct. 1994.
Edwards, A., et al.; ACM Computer Communication Review, vol. 24, No. 4, pp. 14-23, 1994, Oct. 1994.
Brakmo, L.S., et al., "TCP Vegas: new techniques for congestion detection and avoidance," ACM Computer Communication Review, vol. 24, No. 4, Oct. 1994, p. 24-35.
Romanow, A. and Floyd, S., ACM Computer Communication Review, vol. 24, No. 4, p. 79-88, 1994, Oct. 1994.
Black, R. J.; Leslie, I.; and McAuley, D., ACM Computer Communication Review, vol. 24, No. 4, p. 158-167, 1994, Oct. 1994.
Falsafi, Babak, et al.; Proceedings of the 1994 conference on Supercomputing, pp. 380-389, Washington D.C., Nov. 14, 1994.
Lin, Mengjou, et al., "Performance of High-Speed Network I/O Subsystems: Case Study of A Fibre Channel Network," Proc.1994 Conf. on Supercomputing, Washington D.C., Nov. 14, 1994, pp. 174-183.
Boden, Nanette J., et al.; Draft of paper published in IEEE Micro, vol. 15, No. 1, pp. 29-36, 1995, Nov. 16, 1994.
Sterling, Thomas, et al.; Proceedings of the 24th International Conference on Parallel Processing, pp. 11-14, Aug. 1995.
Kleinpaste, K.; Steenkiste, P.; and Zill, B., ACM Computer Communication Review, vol. 25, No. 4, p. 87-98, 1995, Oct. 1995.
Partridge, C.; Hughes, J.; and Stone, J., ACM Computer Communication Review, vol. 25, No. 4, p. 68-76, 1995, Oct. 1995.
Edwards, A. and Muir, S., "Experiences implementing a high performance TCP in user-space," ACM Computer Communication Review, vol. 25, No. 4, 1995, Oct. 1995, pp. 196-205.
Mogul, J. C., "The case for persistent-connection HTTP," ACM Computer Communication Review, vol. 25, No. 4, 1995, Oct. 1995, pp. 299-313.

(56) References Cited

OTHER PUBLICATIONS

Von Eicken, Thorsten, et al.; ACM Operating Systems Review, vol. 29, Issue 5, p. 109-126, 1995, Dec. 1995.
Tennenhouse, D. L. and Wetherall, D. J., ACM Computer Communication Review, vol. 26, No. 2, pp. 15-20, 1996, Apr. 1996.
Barham, Paul Ronald, "Devices in a Multi-Service Operating System," Ph.D. thesis, University of Cambridge, 1996, Jul. 1996, 142pp.
Chang, Chi-Chao, et al., "Low-Latency Communication on the IBM RISC System/6000 SP," Proc. 1996 ACM/IEEE conference on Supercomputing, Pittsburgh, Nov. 17, 1996, 17pp.
Touch, Joe, et al.; "Atomic-2" slides, Gigabit Networking Workshop '97 Meeting, Kobe, Japan, Apr. 1997, 10pp.
Touch, Joe, et al.; "Host-based Routing Using Peer DMA," Gigabit Networking Workshop '97 Meeting, Kobe, Japan, Apr. 1997, 2pp.
Angin, O., et al.; ACM Computer Communication Review, vol. 27, No. 3, pp. 100-117, 1997, Jul. 1997.
Thacker, Charles P. and Stewart, Lawrence C., ACM Operating Systems Review, vol. 21, Issue 4, p. 164-172, 1987, Oct. 1997.
Anderson, Ed, et al.; Proceedings of the 1997 ACM/IEEE conference on Supercomputing, p. 1-17, San Jose, California, Nov. 16, 1997.
Wassermann, Harvey J., et al.; Proceedings of the 1997 ACM/IEEE conference on Supercomputing, p. 1-11, San Jose, California, Nov. 16, 1997.
Buonadonna, Philip, et al.; Proceedings of the 1998 ACM/IEEE conference on Supercomputing, p. 1-15, Orlando, Florida, Nov. 7, 1998.
Husbands, Parry and Hoe, James C., Proceedings of the 1998 ACM/IEEE conference on Supercomputing, p. 1-15, Orlando, Florida, Nov. 7, 1998.
Warren, Michael S., et al., "Avalon: An Alpha/Linux Cluster Achieves 10 Gflops for $150k," Proc. 1998 ACM/IEEE conference on Supercomputing, Orlando, Florida, Nov. 7, 1998, 10pp.
Salmon, John, et al., "Scaling of Beowulf-class Distributed Systems," Proc. 1998 ACM/IEEE conference on Supercomputing, Orlando, Florida, Nov. 7, 1998, 18pp.
Chiou, Derek; Ang, Boon S., et al., "StarT-Voyager: A Flexible Platform for Exploring Scalable SMP Issues," Proc. 1998 ACM/IEEE conference on Supercomputing, Orlando, Florida, Nov. 7, 1998, 20pp.
Pope, S. L., et al., "Enhancing Distributed Systems with Low-Latency Networking," Parallel and Distributed Computing and Networks, Brisbane, Australia, 1998, Dec. 1998, 10pp.
De Vivo, M., et al.; ACM Computer Communication Review, vol. 29, No. 1, pp. 81-85, 1999, Jan. 1999.
Allman, M., "TCP Byte Counting Refinements," ACM Computer Communication Review, vol. 29, No. 3, 1999, Jul. 1999, pp. 14-22.
Muir, Steve and Smith, Jonathan, "Piglet: A Low-Intrusion Vertical Operating System," Technical Report MS-CIS-00-04, University of Pennsylvania, 2000, Jan. 2000, 15pp.
Crowley, Patrick, et al.; Proceedings of the 14th international conference on Supercomputing, pp. 54-65, Santa Fe, New Mexico, May 8, 2000.
Stone, Jonathan and Partridge, Craig, ACM Computer Communication Review, vol. 30, No. 4, pp. 309-319, 2000, Oct. 2000.
Feng, W. and Tinnakornsrisuphap, P., "The Failure of TCP in High-Performance Computational Grids," Proc. 2000 ACM/IEEE conference on Supercomputing, Dallas, Texas, Nov. 4, 2000, 11p.
Hsieh, Jenwei, et al., "Architectural and Performance Evaluation of GigaNet and Myrinet Interconnects on Clusters of Small-Scale SMP Servers," Proc. 2000 ACM/IEEE conference on Supercomputing, Dallas, Texas, Nov. 4, 2000, 9pp.
Pratt, Ian and Fraser, Keir, Proceedings of IEEE Infocom 2001, pp. 67-76, Apr. 22, 2001.
Hrvoye, Bilic, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.

Hrvoye, Bilic, et al.; presentation slides from 9th Symposium on High Performance Interconnects, "Deferred Segmentation for Wire-Speed Transmission of Large TCP Frames over Standard GbE Networks," Aug. 22, 2001, 9pp.
Lowekamp, Bruce, et al., "Topology discovery for large ethernet networks," ACM SIGCOMM Computer Communication Review—Proc. 2001 SIGCOMM conf., vol. 31, No. 4, 2001, Oct. 2001, pp. 237-248.
Shivam, Piyush, et al., "EMP: Zero-copy OS-bypass NIC-driven Gigabit Ethernet Message Passing," Proc. 2001 ACM/IEEE Conf. on Supercomputing, Denver, Nov. 10, 2001 (8 pp).
Ross, Robert, et al., "A Case Study in Application I/O on Linux Clusters," Proc. 2001 ACM/IEEE Conf. on Supercomputing, Denver, Nov. 10, 2001, 17pp.
Blanton, E. and Allman, M., "On Making TCP More Robust to Packet Reordering," ACM Computer Communication Review, vol. 32, No. 1, 2002, Jan. 2002, pp. 20-30.
Rangarajan, Murali, et al., "TCP Servers: Offloading TCP Processing in Internet Servers. Design, Implementation, and Performance," Technical Report DCR-TR-481, Computer Science Department, Rutgers University, 2002, Mar. 2002, 14 pp.
Crowcroft, Jon and McAuley, Derek, "ATM: A Retrospective on Systems Legacy or 'A technology with a fabulous future behind it?'", ACM Computer Communication Review, vol. 32, No. 5, 2002, Nov. 2002, pp. 11-12.
Kalmanek, Charles, ACM Computer Communication Review, vol. 32, No. 5, pp. 13-19, 2002, Nov. 2002.
Smith, Jonathan, ACM Computer Communication Review, vol. 32, No. 5, pp. 29-37, 2002, Nov. 2002.
Adiga, NR, et al., "An Overview of the BlueGene/L Supercomputer," Proceedings of the 2002 ACM/IEEE conference on Supercomputing, Baltimore, Nov. 16, 2002, pp. 1-22.
Sistare, Steven J. and Jackson, Christopher J., Proceedings of the 2002 ACM/IEEE conference on Supercomputing, p. 1-15, Baltimore, Nov. 16, 2002.
Bush, R. Bush and Meyer, D., IETF Network Working Group, Request for Comments memo: 3439 [extending RFC1958], Dec. 2002, Some Internet Architectural Guidelines and Philosophy, 25 pp, The Internet Society (c)2002.
Sarolahti, Pasi, et al., "F-RTO: an enhanced recovery algorithm for TCP retransmission timeouts," ACM Computer Communication Review, vol. 33, No. 2, 2003, Apr. 2003, pp. 51-63.
Kelly, Tom, ACM Computer Communication Review, vol. 33, No. 2, pp. 83-91, 2003, Apr. 2003.
Mogul, Jeffrey C., Proceedings of HotOS IX: The 9th Workshop on Hot Topics in Operating Systems, pp. 25-30, May 18, 2003.
McAuley, Derek and Neugebauer, Rolf, "A case for virtual channel processors," NICELI '03 Proc.of the ACM SIGCOMM workshop, Aug. 2003, pp. 237-242.
Hurwitz, Justin and Feng, Wu-chun, "Initial end-to-end performance evaluation of 10-Gigabit Ethernet," Proc. 11th Symposium on High Performance Interconnects, Aug. 20, 2003, pp. 116-121.
Aggarwal, Vinay, et al., summary, NICELI workshop, ACM SIGCOMM Computer Communication Review, vol. 33, No. 5, 2003, Oct. 2003, pp. 75-80.
Feng, Wu-chun, et al., "Optimizing 10-Gigabit Ethernet for Networks of Workstations, Clusters, and Grids: A Case Study," Proceedings of the 2003 ACM/IEEE conference on Supercomputing, Phoenix, Arizona, Nov. 15, 2003, 13 pp.
Liu, Jiuxing, et al., "Performance Comparison of MPI Implementations over InfiniBand, Myrinet and Quadrics," Proc. 2003 ACM/IEEE conference on Supercomputing, Phoenix, Arizona, Nov. 15, 2003, 14 pp (58-71).
Makineni, Srihari and Iyer, Ravi, Proceedings of the 10th International Symposium on High Performance Computer Architecture, pp. 152, Feb. 14, 2004.
Jin, Cheng, et al.; Proceedings of IEEE Infocom 2004, pp. 1246-1259, Mar. 7, 2004.
Currid, Andy, "TCP Offload to the Rescue," ACM Queue, vol. 2, No. 3, 2004, May 1, 2004, pp. 58-65.
Reginer, Greg, et al.; Computer, IEEE Computer Society, vol. 37, No. 11, pp. 48-58, 2004, Nov. 2004.

(56) References Cited

OTHER PUBLICATIONS

Declaration of Dr. Gregory L. Chesson in Support of Microsoft's Opposition to Alacritech's Motion for Preliminary Injunction; United States District Court, Northern District California, San Francisco Division, Case No. 3:04-cv-03284-JSW, filed Feb. 4, 2005, 289 pp including exhibits (declaration is 25 pp).

Lazowska, Edward D. and Patterson, David A., "Computing Research: A Looming Crisis," ACM Computer Communication Review, vol. 35, No. 2, 2005, Jul. 2005, pp. 65-68.

Feng, W., et al., "Permormance characterization of a 10-Gigabit Ethernet TOE," Proc. 13th Symp. on High Performance Interconnects, Aug. 17, 2005, pp. 58-63.

Leslie, B., et al., "User-level Device Drivers: Achieved Performance," J. Comput. Sci. & Technol., vol. 20, Sep. 2005, Sep. 2005, 17pp.

Balaji, P., et al., "Head-to TOE Evaluation of High-Performance Sockets over Protocol Offload Entines," Proceedings of the IEEE International Conference on Cluster Computing, 2005, Sep. 2005, 10pp.

Kamal, Humaira, et al., "SCTP versus TCP for MPI," Proc.2005 ACM/IEEE conference on Supercomputing, Seattle, Washington, Nov. 12, 2005, 14pp.

Bhandarkar, Sumitha, et al., "LTCP: Improving the Permormance of TCP in Highspeed Networks," ACM Computer Communication Review, vol. 36, No. 1, 2006, Jan. 2006, pp. 41-50.

Chu, H. K. Jerry, "Zero-Copy TCP in Solaris," Proc. USENIX Annual Technical Conference 1996, Jan. 1996, 13pp.

Calvert, Ken, ACM Computer Communication Review, vol. 36, No. 2, pp. 27-30, 2006, Apr. 2006.

Crowcroft, Jon Crowcroft; ACM Computer Communication Review, vol. 36, No. 2, pp. 51-52, 2006, Apr. 2006.

Minshall, Greg, et al.; ACM Computer Communication Review, vol. 36, No. 3, pp. 79-92, 2006, Jul. 2006.

Wetherall, Davi,; ACM Computer Communication Review, vol. 36, No. 3, pp. 77-78, 2006, Jul. 2006.

Geoffray, Patrick, "A Critique of RDMA," HPCWire article, Aug. 18, 2006, 7pp. Available at http://www.hpcwire.com/hpcwire/2006-08-18/a_critique_of_rdma-1.html.

Geoffray, P., "Protocol off-loading vs on-loading in high-performance networks," 14th Symposium on High Performance Interconnects, Aug. 23, 2006, 5pp.

Sancho, Jose Carlos, et al., "Quantifying the Potential Benefit of Overlapping Communication and Computation in Large-Scale Scientific Applications," Proc.2006 ACM/IEEE conference on Supercomputing, Tampa, Florida, Nov. 11, 2006, 16pp.

Sur, Sayantan, et al.; Proceedings of the 2006 ACM/IEEE conference on Supercomputing, Tampa, Florida, Nov. 11, 2006.

Pope, Steven and Riddoch, David, ACM Computer Communication Review, vol. 37, No. 2, pp. 89-92, 2007, Mar. 19, 2007.

Mansley, Kieran, et al.; Euro-Par Conference 2007, pp. 224-233, Rennes, France, Aug. 28, 2007.

Kaiserswerth, M., IEEE/ACM Transactions in Networking vol. 1, Issue 6, pp. 650-663, 1993, Dec. 1993.

Cohen, Danny, et al.; ACM Computer Communication Review, vol. 23, No. 4, p. 32-44, 1993, Jul. 1993.

Evans, J. and Buller, T., IEEE TCGN Gigabit Networking Workshop, 2001, Apr. 22, 2001.

Wilkes, M.V. and Needham, R.M., "The Cambridge Model Distributed System," ACM SIGOPS Operating Systems Review, vol. 14, Issue 1, pp. 21-29, 1980, Jan. 1980.

Dickman, L., "Protocol OffLoading vs OnLoading in High Performance Networks," 14th Symposium on High Performance Interconnects, Aug. 23, 2006, 8pp.

\* cited by examiner

HASHING ALGORITHM FOR NETWORK RECEIVE FILTERING

RELATED APPLICATION

This application is a continuation of prior U.S. application Ser. No. 13/162,421 filed Jun. 16, 2011, which is a continuation of prior U.S. application Ser. No. 11/255,124, filed Oct. 20, 2005, now U.S. Pat. No. 7,984,180 issued Jul. 19, 2011, both of which applications are incorporated by reference herein.

BACKGROUND

Field of the Invention

The invention relates to network interfaces, and more particularly to queue-based network receive mechanisms supporting a plurality of receive queues in a host computer system.

Description of Related Art

When data is to be transferred between two devices over a data channel, such as a network, each of the devices must have a suitable network interface to allow it to communicate across the channel. Often the network is based on Ethernet technology. Devices that are to communicate over a network are equipped with network interfaces that are capable of supporting the physical and logical requirements of the network protocol. The physical hardware component of network interfaces are referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

Most computer systems include an operating system (OS) through which user level applications communicate with the network. A portion of the operating system, known as the kernel, includes protocol stacks for translating commands and data between the applications and a device driver specific to the NIC, and the device drivers for directly controlling the NIC. By providing these functions in the operating system kernel, the complexities of and differences among NICs can be hidden from the user level application. In addition, the network hardware and other system resources (such as memory) can be safely shared by many applications and the system can be secured against faulty or malicious applications.

It is desirable for the network interface device to be capable of supporting standard transport level protocols such as TCP, UDP, RDMA and ISCSI at user level: i.e. in such a way that they can be made accessible to an application program running on the computer. TCP is defined in RFC: 0793 Transmission Control Protocol. J. Postel. Sep. 1, 1981, and UDP is defined in RFC:0768 User Datagram Protocol. J. Postel. Aug. 28, 1980, both incorporated by reference herein. Support of transport protocols at user level enables data transfers which require use of standard protocols to be made without requiring data to traverse the kernel stack. Involving the kernel stack requires context switches, which can significantly degrade performance of the computer system overall. To avoid this, standard transport protocols can be implemented both within transport libraries accessible only to the operating system of the computer as well as within transport libraries accessible to user level applications.

FIG. 1A illustrates one implementation of this. In this architecture the TCP (and other) protocols are implemented twice: as denoted TCP1 and TCP2 in FIG. 2. In a typical operating system TCP2 will be the standard implementation of the TCP protocol that is built into the operating system of the computer. In order to control and/or communicate with the network interface device an application running on the computer may issue API (application programming interface) calls. Some API calls may be handled by the transport libraries that have been provided to support the network interface device. API calls which cannot be serviced by the transport libraries that are available directly to the application can typically be passed on through the interface between the application and the operating system to be handled by the libraries that are available to the operating system or modules within the operating system. For implementation with many operating systems it is convenient for the transport libraries to use existing Ethernet/IP based control-plane structures: e.g. SNMP and ARP protocols via the OS interface.

There are a number of difficulties in implementing transport protocols at user level. Most implementations to date have been based on porting pre-existing kernel code bases to user level. Examples of these are Arsenic and Jet-stream. These have demonstrated the potential of user-level transports, but have not addressed a number of the problems required to achieve a complete, robust, high-performance commercially viable implementation.

FIG. 1B shows an architecture employing a standard kernel TCP transport (TCPk). In operation, on packet reception from the network interface hardware (NIC), the NIC transfers data into pre-allocated data buffer (a) and invokes the OS interrupt handler by means of the interrupt line. (Step I). The interrupt handler manages the hardware interface e.g. posts new receive buffers and passes the received (in this case Ethernet) packet looking for protocol information. If a packet is identified as destined for a valid protocol e.g. TCP/IP it is passed (not copied) to the appropriate receive protocol processing block. (Step ii).

TCP receive-side processing takes place and the destination port is identified from the packet. If the packet contains valid data for the port then the packet is engaged on the port's data queue (step iii) and that port marked (which may involve the scheduler and the awakening of blocked process) as holding valid data.

The TCP receive processing may require other packets to be transmitted (step iv), for example in the cases that previously transmitted data should be retransmitted or that previously enqueued data (perhaps because the TCP window has opened) can now be transmitted. In this case packets are enqueued with the OS "NDIS" driver for transmission.

In order for an application to retrieve a data buffer it must invoke the OS API (step v), for example by means of a call such as recv( ) select( ) or poll( ). This has the effect of informing the application that data has been received and (in the case of a recv( ) call) copying the data from the kernel buffer to the application's buffer. The copy enables the kernel (OS) to reuse its network buffers, which have special attributes such as being DMA accessible and means that the application does not necessarily have to handle data in units provided by the network, or that the application needs to know a priori the final destination of the data, or that the application must pre-allocate buffers which can then be used for data reception.

It should be noted that on the receive side there are at least two distinct threads of control which interact asynchronously: the up-call from the interrupt and the system call from the application. Many operating systems will also split the up-call to avoid executing too much code at interrupt priority, for example by means of "soft interrupt" or "deferred procedure call" techniques.

The send process behaves similarly except that there is usually one path of execution. The application calls the operating system API (e.g. using a send( ) call) with data to be transmitted (Step vi). This call copies data into a kernel data buffer and invokes TCP send processing. Here protocol is applied and fully formed TCP/IP packets are enqueued with the interface driver for transmission.

If successful, the system call returns with an indication of the data scheduled (by the hardware) for transmission. However there are a number of circumstances where data does not become enqueued by the network interface device. For example the transport protocol may queue pending acknowledgments or window updates, and the device driver may queue in software pending data transmission requests to the hardware.

A third flow of control through the system is generated by actions which must be performed on the passing of time. One example is the triggering of retransmission algorithms. Generally the operating system provides all OS modules with time and scheduling services (driven by the hardware clock interrupt), which enable the TCP stack to implement timers on a per-connection basis.

If a standard kernel stack were implemented at user-level then the structure might be generally as shown in FIG. 1C. The application is linked with the transport library, rather than directly with the OS interface. The structure is very similar to the kernel stack implementation with services such as timer support provided by user level packages, and the device driver interface replaced with user-level virtual interface module. However in order to provide the model of a asynchronous processing required by the TCP implementation there must be a number of active threads of execution within the transport library:

(I) System API calls provided by the application
(ii) Timer generated calls into protocol code
(iii) Management of the virtual network interface and resultant upcalls into protocol code. (ii and iii can be combined for some architectures)

However, this arrangement introduces a number of problems:

(a) The overheads of context switching between these threads and implementing locking to protect shared-data structures can be significant, costing a significant amount of processing time.

(b) The user level timer code generally operates by using operating system provided timer/time support. Large overheads caused by system calls from the timer module result in the system failing to satisfy the aim of preventing interaction between the operating system and the data path.

(c) There may be a number of independent applications each of which manages a sub-set of the network connections; some via their own transport libraries and some by existing kernel stack transport libraries. The NIC must be able to efficiently parse packets and deliver them to the appropriate virtual interface (or the OS) based on protocol information such as IP port and host address bits.

(d) It is possible for an application to pass control of a particular network connection to another application for example during a fork( ) system call on a Unix operating system. This requires that a completely different transport library instance would be required to access connection state. Worse, a number of applications may share a network connection which would mean transport libraries sharing ownership via (inter process communication) techniques. Existing transports at user level do not attempt to support this.

(e) It is common for transport protocols to mandate that a network connection outlives the application to which it is tethered. For example using the TCP protocol, the transport must endeavor to deliver sent, but unacknowledged data and gracefully close a connection when a sending application exits or crashes. This is not a problem with a kernel stack implementation that is able to provide the "timer" input to the protocol stack no matter what the state (or existence) of the application, but is an issue for a transport library which will disappear (possibly ungracefully) if the application exits, crashes, or stopped in a debugger.

In addition, in order that incoming data packets be delivered to the data port of the correct application, a mechanism is required which examines the header information of the packet and looks up the associated destination queue. Such filtering is commonly performed on a number of fields of the header, including source and destination ports and addresses. In order to maximize efficiency, it is preferable that the filtering be accomplished in hardware on the network interface device, rather than in software within the kernel or user level drivers.

One means of filtering packets in the network interface card is by presenting the packet header information to a content addressable memory (CAM) which associates each combination of header bit information with a specified receive port. But in a TCP/IP packet, for example, the header information may be as wide as 96 bits: 32 source IP address bits, 32 destination IP address bits, 16 source port bits, and 16 destination port bits. A CAM could be provided that is wide enough to accommodate the full width of all the fields against which filtering is to be performed, but such a CAM becomes prohibitively large and expensive if it is desired that the number of potential destination ports is large, and especially if it is to be implemented as only part of a custom integrated circuit. Modern servers in certain environments may require huge numbers of network endpoints, such that filtering through a CAM is not practical.

In situations where CAM lookups are too expensive, one might consider instead performing iterative lookups through a table, comparing the input data (the header bit information, in the case of an incoming data packet filter) with various entries in the table successively until a match is found. But iterative lookups can take a long time, often more time than is available before the next incoming packet arrives. Again, this problem worsens as the maximum number of network endpoints supported by the system increases.

In situations where CAM lookups are too expensive and iterative lookups will take too long, one might consider a hashed lookup, which is a form of hybrid between the parallel approach of a CAM and the sequential approach of an iterative lookup. In a hashed lookup, the table is subdivided into a number of subsets of entries. The input data is passed through a consistent mathematical "hashing function", which converts it to an index (called a hash code) pointing to the particular list (or "bucket") within which the data belongs. When new data is to be added to the table, it is simply inserted into an available free entry of the list pointed to by its hash code. When input data is to be located in the table, an iterative search is performed within the list pointed to by the hash code.

Many hashing algorithms are known, and some examples may be found in Knuth, "Art of Computer Programming", Volume 3: Sorting and Searching (2nd Edition), incorporated herein by reference. In one variation, the buckets pointed to by the hash codes are contiguous and of fixed length, and when a bucket is filled, additional entries are placed into a common overflow area. The buckets may even be limited to only one entry. In another variation, the buckets pointed to by the hash codes are linked lists of entries, which can have variable length. All the linked lists may be interspersed together within a single combined region of memory. In yet another variation, known as open hashing, each bucket has a fixed length (for example a length of one), and if the bucket is filled, a secondary hash function is used to hop to a different next entry of the table. If that entry is filled, then the secondary hash function is used to hop again to yet another entry, and so on, until an available entry is found. Multiple level hashing algorithms are also available. In the open hashing case the subset of entries pointed to by the primary hash function is considered herein to include all the entries that will be reached in multiple iterations of the secondary hash function, so that the subset may be discontiguous. Whatever algorithm is used for placing entries into the table, the same algorithm is used for searching the table.

One problem that arises in most hashing algorithms is the problem of clustering: because the designer of the hashing algorithm does not know in advance what the input data will be that is to be stored in the table, there is always some probability that the hash function will distribute the data unevenly among the various possible hash codes. Uneven data distribution means that while the average length of a list (and therefore the average search time to find a matching entry) may be small, some hash codes will point to lists that are very long (and therefore take a long time to search). In implementations having a maximum list length, uneven data distributions increase the probability that some lists will overflow, forcing the search algorithm into its back-up mechanism, such as searching a common overflow area.

Different hashing algorithms handle the clustering problem differently, but most suffer from the problem that the iterative search time required to search the list pointed to by a heavily used hash code can become exorbitant. In the context of network receive packet filtering, such a long search time means the network interface device may not be ready to handle a future packet when it arrives, thereby potentially dropping the packet. Merely applying a hashing solution to the problem of filtering incoming data packets to identify the correct destination queue therefore may not be sufficient.

In order to address this issue, roughly described, a network interface device is assigned a maximum extent-of-search. A hash function is applied to the header information of each incoming packet, to generate a hash code for the packet. The hash code designates a particular subset of the table within which the particular header information should be found, and an iterative search is made within that subset. If the search locates a matching entry before the search limit is exceeded, then the incoming data packet is delivered to the receive queue identified in the matching entry. But if the search reaches the search limit before a matching entry is located, then device delivers the packet to a default queue, preferably a kernel queue, in the host computer system. The kernel is then responsible for delivering the packet to the correct endpoint.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1A:
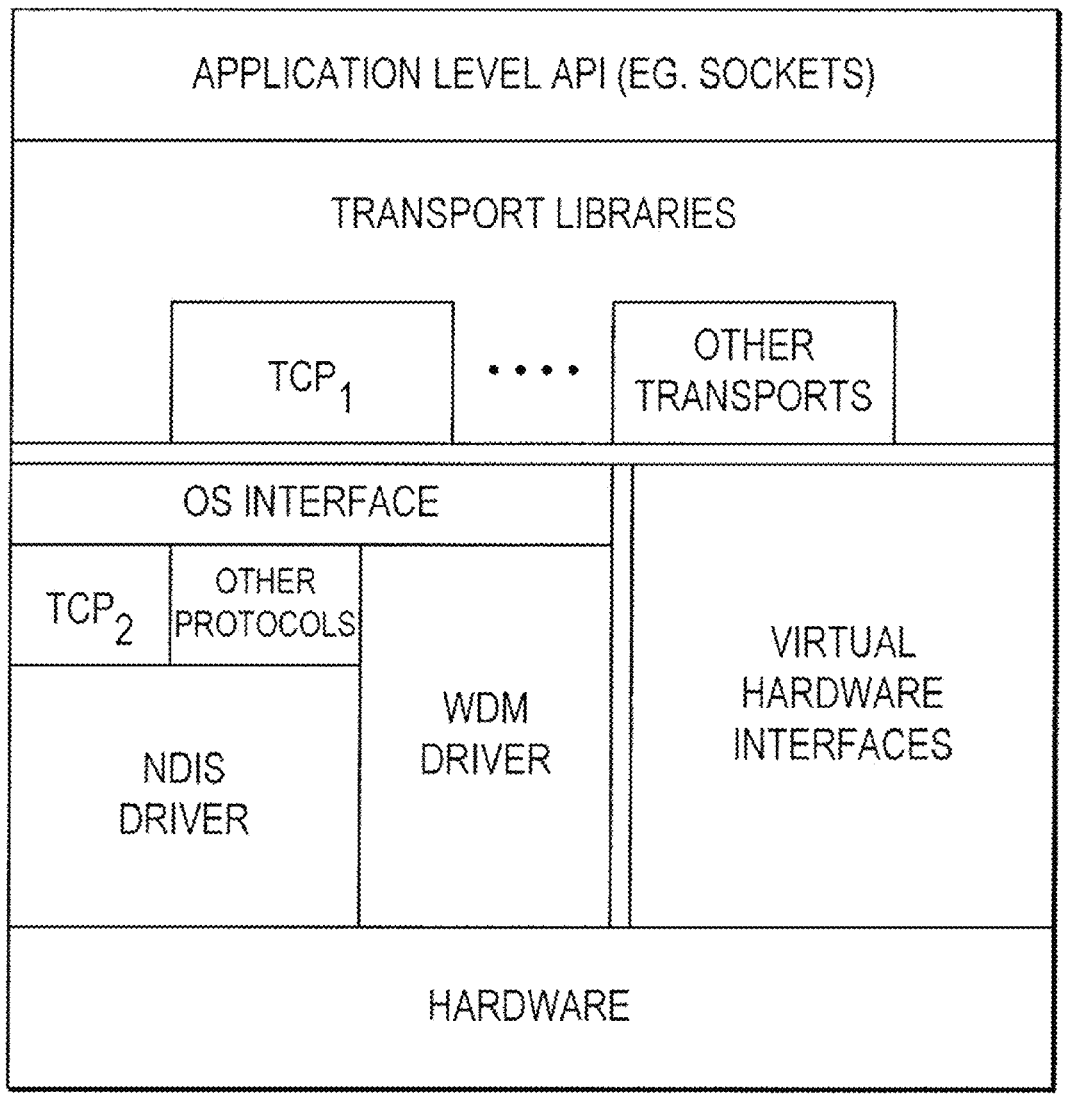
FIG. 1A illustrates an implementation of a transport library architecture.
Figure 1B:
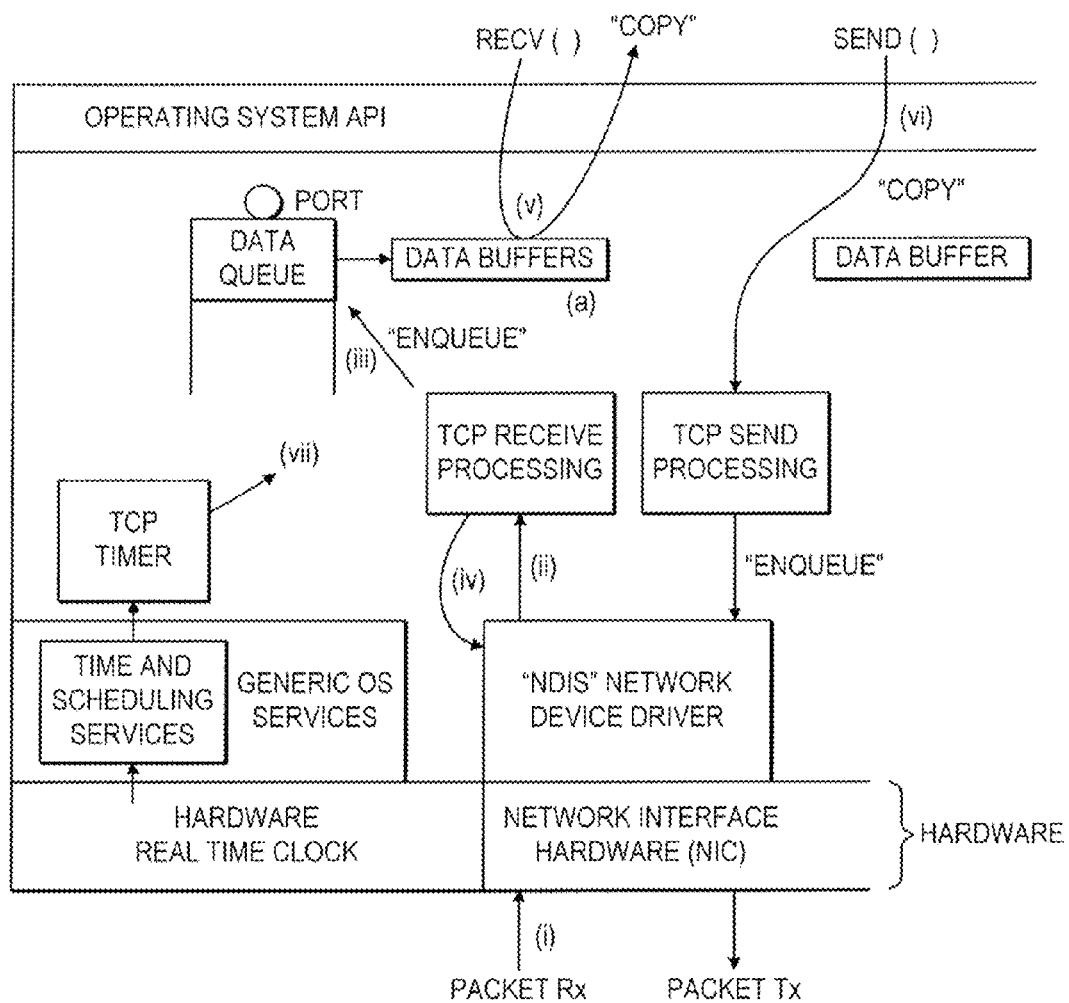
FIG. 1B shows an architecture employing a standard kernel TCP transport with a user level TCP transport.
Figure 1C:
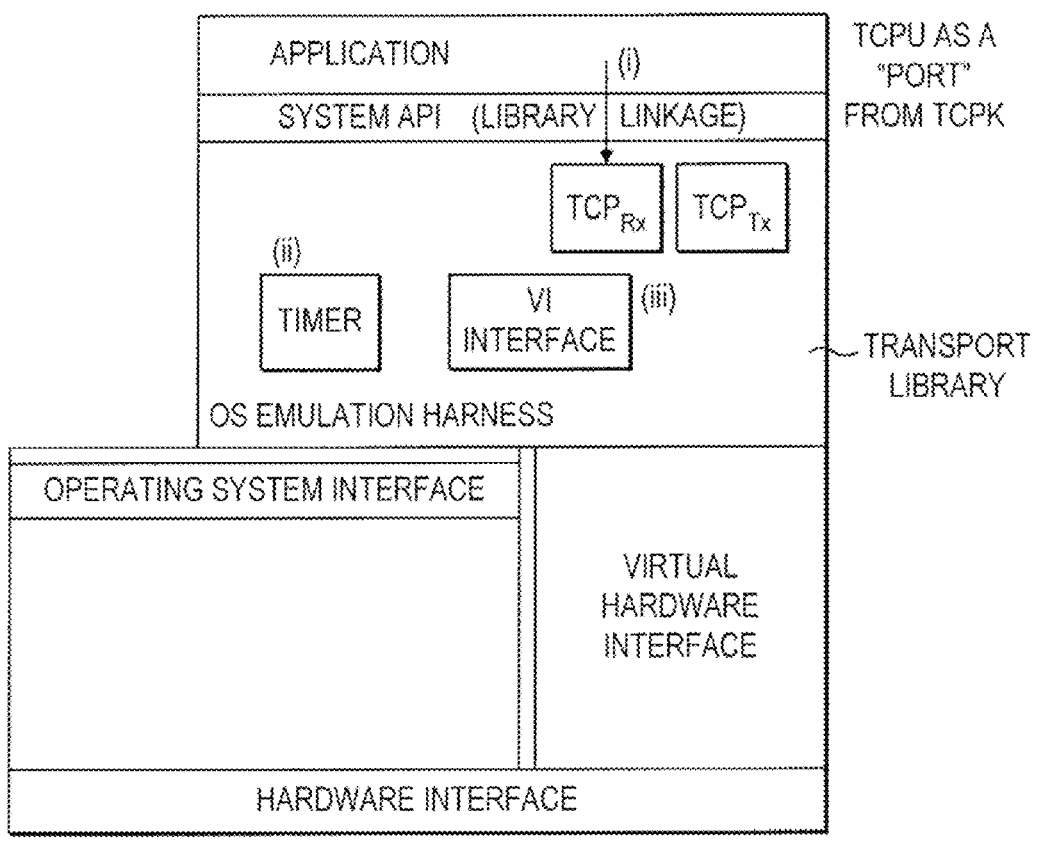
FIG. 1C illustrates an architecture in which a standard kernel stack is implemented at user-level.
Figure 2:
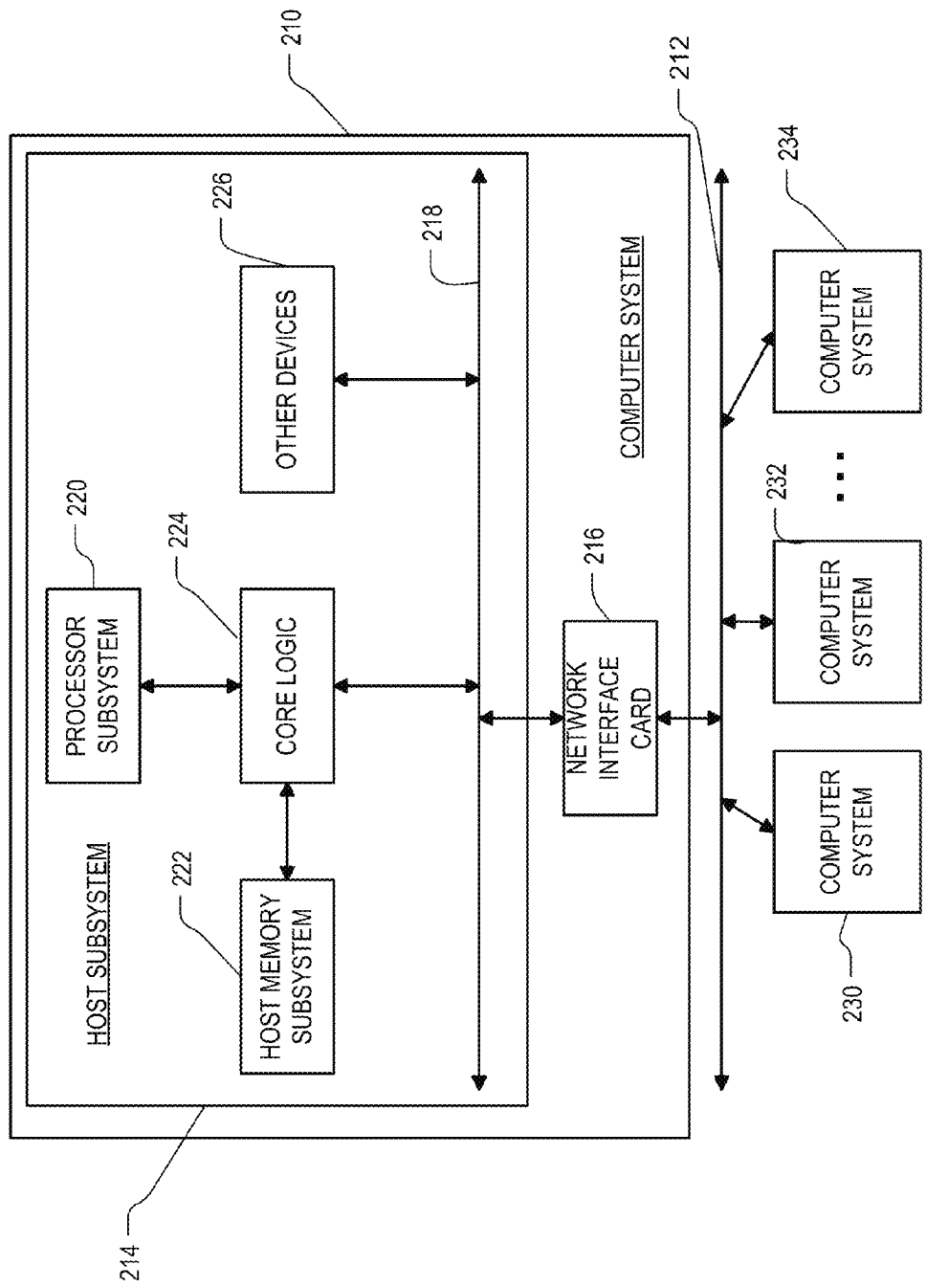
FIG. 2 is a simplified block diagram of a typical computer system that can incorporate the invention.

FIG. 2 is a simplified block diagram of a typical computer system 210 which can communicate via a network 212 with other computer systems such as 230, 232 and 234. Computer system 210 includes a network interface card (NIC) 216 communicating via a communication channel 218 with a host subsystem 214. The host subsystem 214 includes a processor subsystem 220 which includes at least one processor, a host memory subsystem 222, and a core logic subsystem 224. The core logic subsystem 224 provides bridges among the processor subsystem 220, the host memory subsystem 222 and the communication channel 218. The host subsystem 214 may also include other devices 226 in communication with the communication channel 218. As used herein, the host subsystem 214 is considered to be one type of "computing device". Other types of computing devices include non-reconfigurable processing devices for which network connectivity is desired.

The network interface card 216 provides an interface to outside networks, including an interface to the network 212, and is coupled via network 212 to corresponding interface devices in other computer systems. Network 212 may comprise many interconnected computer systems and communication links. These communication links may be wireline links, optical links, wireless links or any other mechanism for communication of information. While in one embodiment network 212 is the Internet, in other embodiments, network 212 may be any suitable computer network or combination of networks. In and embodiment described herein, network 212 supports an Ethernet protocol.

Host memory subsystem 222 typically includes a number of memories including a main random access memory (RAM) for storage of instructions and data during program execution, and a read only memory (ROM) in which fixed instructions and data are stored. One or more levels of cache memory may also be included in the host memory subsystem 222. For simplicity of discussion, the host memory subsystem 222 is sometimes referred to herein simply as "host memory". As used herein, virtual memory is considered part of the host memory subsystem even though part of it may be stored physically at various times on a peripheral device.

The communication channel 218 provides a mechanism for allowing the various components and subsystems of computer system 210 to communicate with each other. In one embodiment the communication channel 218 comprises a PCI Express bus. Other embodiments may include other buses, and may also include multiple buses. The PCI bus and its progeny, including the version known as PCI Express, support burst transfer protocols such as that described above. PCI express is described in PCI Special Interest Group, "PCI Express Base Specification 1.0a", Apr. 15, 2003, incorporated herein by reference.

Computer system 210 itself can be of varying types including a personal computer, a portable computer, a workstation, a computer terminal, a network computer, a television, a mainframe, a server or any other data processing system or user devices. Due to the ever-changing nature of computers and networks, the description of computer system 210 depicted in FIG. 2 is intended only as a specific example for purposes of illustrating an embodiment of the present invention. Many other configurations of computer system 210 are possible having more or less components, and configured similarly or differently than, the computer system depicted in FIG. 2.

Figure 3A:
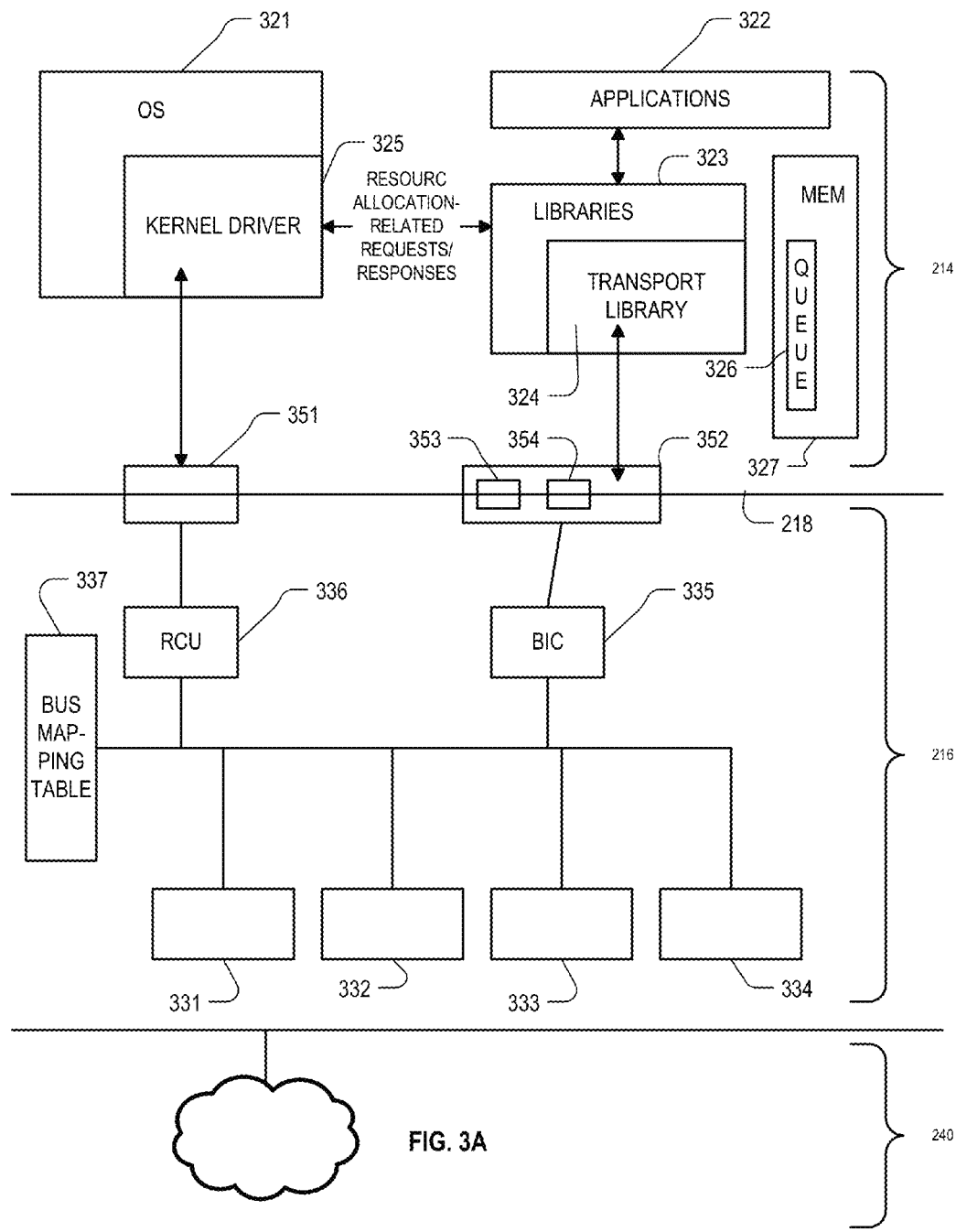
FIGS. 3A, 3B and 4 are software functional views of the computer system of FIG. 2.

FIG. 3A is another view of the computer system 210, presented to better illustrate certain software and functional features. The computer runs an operating system 321 which is capable of supporting application processes 322 also running on the computer. As used herein, a "process" is a program, for example an application program, in execution. A process may run multiple "threads", which can also be thought of as lightweight processes. A library 323 of instructions is stored by the computer and available to the applications. The part of the library usable for communications with the NIC 216 is termed a transport library 324. Included in the operating system kernel is a driver component 325: a dedicated set of instructions which allow for data transfer with the NIC 216. Each application would normally take the form of a software program running on the computer, but it could be embedded in firmware. Some operating systems include applications in addition to fundamental operating system code.

The NIC 216 supports resources of a number of types: i.e. resources having capabilities of different natures. Examples include DMA queues, event queues, timers and support resources for remote apertures of the type described in WO2004/025477, incorporated by reference herein. Each type of resource (331-334) is provided from a dedicated hardware resource pool which can support numerous instances of resources of the respective type. In order for such an instance to be made operational it is configured by means of instructions from the computing device 214, as described in more detail below.

The NIC 216 communicates with the computing device 214 over the bus 218. In this example the bus is a PCI bus, but the invention is not limited to such a bus. Data transmitted over the PCI bus 218 is associated with a destination address and is received by whichever entity that is connected to the bus has had that address allocated to it. In a typical PC implementation the addresses are allocated in pages of 4 or 8 kB. One or more of these pages may be allocated to the NIC 216. Blocks 351 and 352 represent allocated pages on the PCI bus 218.

The NIC 216 has a bus interface controller (BIC) 335, a resource configuration unit (RCU) 336 and a bus mapping table 337. The resource configuration unit processes communications received from the computer that provide instructions on the allocation, re-allocation and de-allocation of resources on the NIC 216, and configures the resources in accordance with such instructions. The kernel driver 325 stores a record of which resources on the NIC 216 are allocated. When a resource is to be allocated the driver 325 identifies a suitable free resource of the required type on the NIC 216 and transmits an allocation instruction to the NIC 216. The instruction identifies the resource and specifies the details of how it is to be allocated, including details of the internal configuration of the resource (e.g. in the case of a timer the amount of time it is to run for). That instruction is passed to the resource configuration unit. The resource configuration unit then loads the specified configuration into the identified resource. The instruction also includes an ownership string, which may be an identification of which application or process on the computer is using the resource. The resource configuration unit stores these in a row of the bus mapping table. When a resource is to be re-allocated the relevant entries in the resource's own configuration store and in the bus mapping table are altered as necessary. When a resource is to be de-allocated it is disabled and any rows of the bus mapping table that relate to it are deleted.

During setup of the system one or more pages (351, 352) on the bus 218 are allocated to the NIC 216. Part of this address space (page 351) can be used by the kernel driver 325 to send instructions to the NIC 216. Other pages (e.g. page 352) can be used for communication between application processes such as application 322 and the resources 331-334. The resource configuration unit 336 stores a record of the pages that are allocated to the NIC 216 for use by resources. Note that in some embodiments, some or all of the functions of the resource configuration unit 336 may alternatively be provided by the kernel driver 325 itself When an application 322 wishes to open a data connection over the network it calls a routine in the user level transport library 324 to cause the NIC resources that are required for the connection to be allocated. Standard types of network connection require standard sets of resources; for example: an event queue, transmit and receive DMA command queues, and a set of DMA'able memory buffers. For example a typical set may contain one TX command queue, one RX command queue, two timers, and on the order of 100-1000 DMA memory buffers.

The user level transport library 324 includes routines that can be called directly by the application process 322 and that initiate the allocation of such standard sets of resources, including set numbers of resources of different types. The transport library also includes routines that allow a resource of each type to be allocated, re-allocated or de-allocated individually. The presence of both these types of instruction means that standard connections can be set up efficiently, and yet non-standard groups of resources can be created, and existing connections can be reconfigured on a resource-by-resource basis. As used herein, a "user level stack" is any protocol processing software that runs in unprotected mode. A "protocol stack" is the set of data structures and logical entities associated with the networking interfaces. This includes sockets, protocol drivers, and the media device drivers.

The routines for allocation, re-allocation and de-allocation of resources require access to restricted memory mapped addresses, such as page 351 for sending configuration instructions to the NIC 216. Since the user level transport library 324 lacks the necessary privilege level to perform these accesses, these routines in the user level transport library 324 make calls to the kernel driver 325. In a Unix environment, for example, such calls might take the form of IOCtl( ) system calls. These calls cause an initial context switch to a kernel level process, which in turn communicate the instructions to the NIC 216 for the allocation of the resources as specified in the routines. Those instructions specify the identity of the application or process with which the resources are to be associated, and the nature of the resources. The instructions are processed by the resource configuration unit 336 of the NIC 216.

The space on the bus 218 that is allocated to the NIC 216 can be split dynamically between the resources on the bus 218. Once one or more pages 352 have been allocated to the NIC 216 for use by resources those resources can be allocated one or more individual sub-page addresses within that page, corresponding to locations as illustrated at 353, 354. Thus each resource can have a part of the total space allocated to it. A record of which part of the total space is allocated to which resource is stored in the bus mapping table 337. The effect is that a single page of the bus can be used for communication to resources of multiple types and/or resources that relate to multiple connections and/or resources that are associated with multiple applications or processes on the computer 214. As a result, the total bus space can be used relatively efficiently.

The usage of the allocated bus space 352 is managed by the kernel driver 325. When a resource is to be allocated the RCU identifies using a data store whose content it manages an unused block in the space on the bus that has already been allocated for use by resources of the NIC 216, the space being of the size required for the resource. It then stores in that data store the identity of the resource ("resource ID"), the address of the block within the allocated space ("sub-page ID"), and the identity of the application or process that is to use the resource ("process tag"); and sends a message to the resource configuration unit 336 to cause it to store corresponding data in the bus mapping table 337. If the RCU finds that table 337 indicates the address to be already occupied then it returns an error code to the driver. The sub-page address may need to be supplemented with the address of the page in which the sub-page lies if that cannot be inferred as a result of only a single page having been allocated for use by the resources. If the total space allocated for use by resources is insufficient then the kernel driver allocates it more space. Having allocated the resources, the RCU returns a success message to the kernel driver. The allocated page and sub-page addresses are returned to and mapped into the virtual address space of the user level process that requested the resources in order that it can access them by means of that data. Another context switch then takes place back to the user level calling process.

An application that has had resources allocated to it can access them by sending data (e.g. by means of load/store cycles through a virtual memory mapping) to the relevant bus page, at the sub-page address corresponding to the respective resource. Since these addresses are part of the application's virtual address space, no context switch to any kernel level processes are required in order to perform these accesses. Any data sent to pages allocated to resources is picked off the bus 218 by the bus interface controller 335. It directs that data to the appropriate one of the resources 331-334 by performing a look-up in the table 337 to identify the identity of the resource to which the sub-page address has been allocated. An application can also access a resource by means other than a bus write: for example by means of direct memory access (DMA). In those instances, the NIC 216 checks that the identity of the application/process from which the access has been received matches the identity indicated in the table 337 for the resource. If it does not match, the data is ignored. If it matches, it is passed to the relevant resource. This adds to security and helps to prevent corruption of the resources by other applications.

The set of resources allocated to an application or process may be considered to constitute a virtual network interface (VNIC).

Once a virtual interface has been composed, it may be reconfigured dynamically. As one example of dynamic reconfiguration, a resource that is no longer required may be freed-up. To achieve this, the application using the resource calls a de-allocation routine in the user level transport library 323. The de-allocation routine calls the kernel driver 325, which instructs the RCU to de-allocate the resource by disabling it, clearing its status and deleting its row in the table 337.

As another example of dynamic reconfiguration, additional resources may be added to the VNIC. The process is analogous to that described above for initial composition of the VNIC.

As yet another example of dynamic reconfiguration, resources may be passed from one application or process to another. This is most useful in the situation where a single application has multiple processes and wants to pass control of a resource from one process to another, for example if data from the network is to be received into and processed by a new process. To achieve this, the application using the resource calls a re-allocation routine in the transport library 323. The re-allocation routine calls the kernel driver 325, which instructs the RCU to re-allocate the resource modifying its row in the table 337 to specify the identity of the application or process that is taking over its control.

In some instances it may be desirable for resources of one type to communicate with resources of another type. For example, data received from the network 240 may be being passed to an application 322 for processing. The application has a queue 326 in a memory 327 connected to the bus 218. The queue is managed in part by the transport library 323, which provides a DMA queue resource 331 on the NIC 216 with an up-to-date pointer to the next available location on the queue 326. This is updated as the application reads data from the queue 326. When data is received from the network it is passed to an event queue resource 332, which writes it to the location identified by the pointer and also triggers an event such as an interrupt on the computing device 214 to indicate that data is available on the queue. In order for this to happen the event queue resource 332 must learn the pointer details from the DMA queue resource 331. This requires data to be passed from the DMA queue resource to the event queue resource.

To achieve this, the "process tag" column of the table 337 can be treated more generally as an ownership tag, and can link the DMA queue to the related event queue. To achieve this, the ownership tag of the event queue can be set to the identity of the related DMA queue. When the DMA queue needs to pass data to the related event queue it can identify the event queue from the table 337 by performing a look-up on its own identity in the ownership tag column.

Data intended to be passed from one resource to another can be checked by the bus interface controller 335 to ensure that it is compatible with the settings in the table 337. Specifically, when data is to be sent from one resource to another the bus controller checks that there is a row in the table 337 that has the identity of the resource that is the source of the data in the ownership tag field, and the identity of the resource that is the intended destination of the data in the resource ID field. If there is no match then the data is prevented from reaching its destination. This provides additional security and protection against corruption. Alternatively, or in addition, it may be permitted for one resource to transmit data to another if both are in common ownership: in this example if their resource ID fields indicate that they are owned by the same process, application or other resource.

The identities of resources linked in this way can also be reconfigured dynamically by means of the re-configuration routines in the transport library.

Figure 3B:
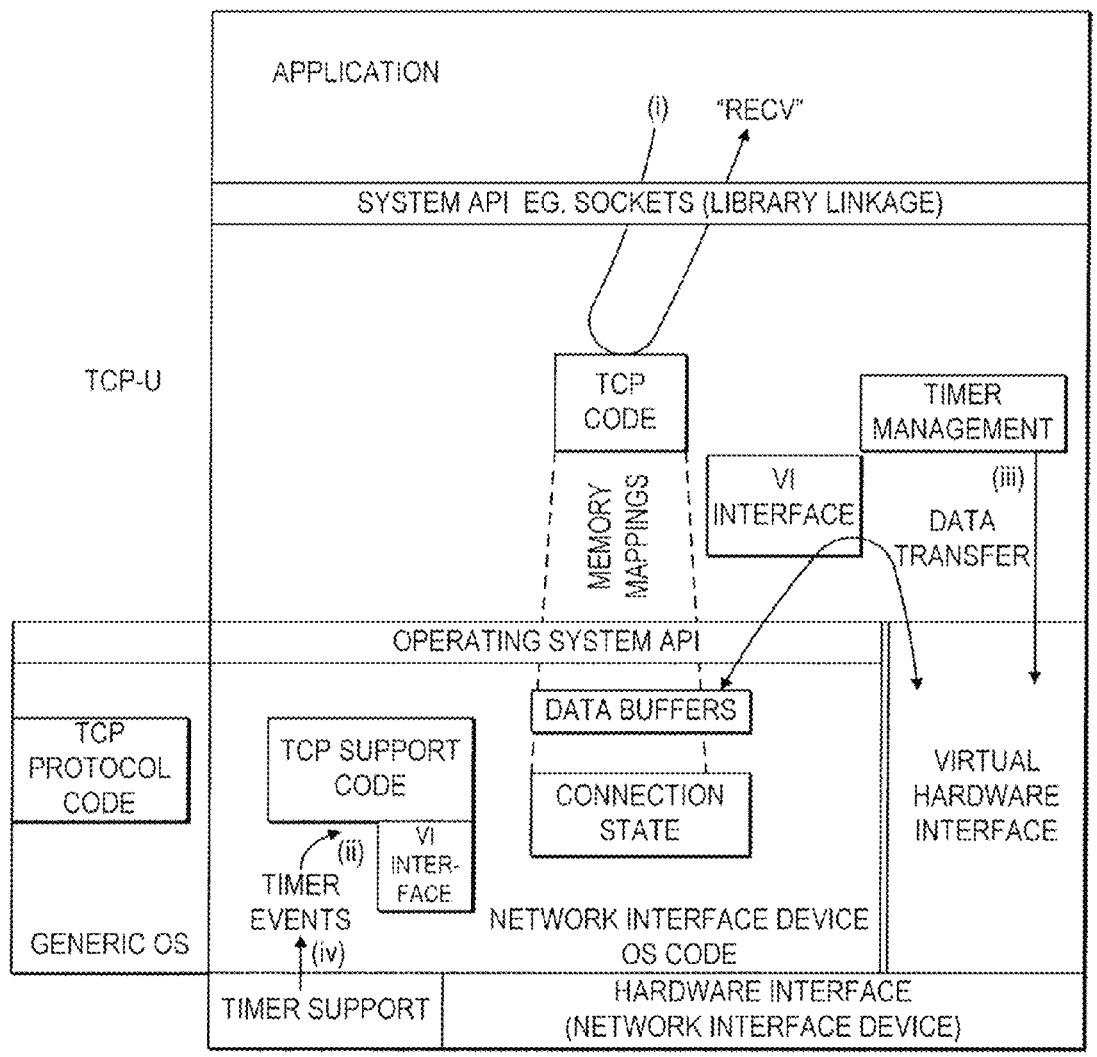

FIG. 3B shows yet another software functional view of the system of FIG. 2. Some of the features illustrated in FIG. 3B are as follows:

(i) TCP code which performs protocol processing on behalf of a network connection is located both in the transport library, and in the OS kernel. The fact that this code performs protocol processing is especially significant.

(ii) Connection state and data buffers are held in kernel memory and memory mapped into the transport library's address space (iii) Both kernel and transport library code may access the virtual hardware interface for and on behalf of a particular network connection (iv) Timers may be managed through the virtual hardware interface, (these correspond to real timers on the network interface device) without requiring system calls to set and clear them. The NIC generates timer events which are received by the network interface device driver and passed up to the TCP support code for the device.

It should be noted that the TCP support code for the network interface device is in addition to the generic OS TCP implementation. This is suitably able to co-exist with the stack of the network interface device.

Figure 4:
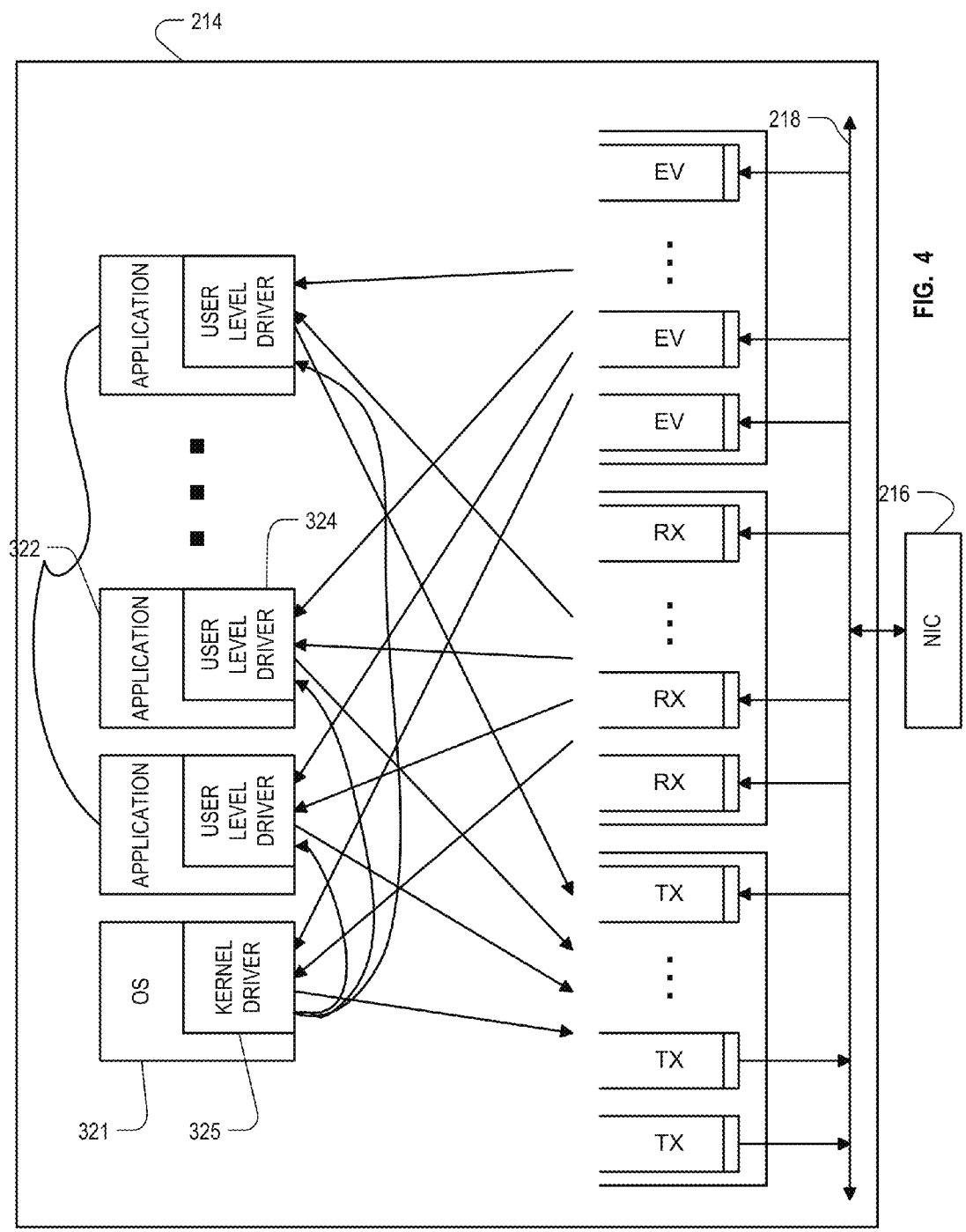

As a result of the above mechanisms, the operating system and many application programs can each maintain multiple TX, RX and Event DMA command queues. FIG. 4 illustrates this feature. As can be seen, the operating system 321 maintains, via kernel driver 325, TX, RX and Event data queues. Each such queue has an associated DMA command queue, not shown in FIG. 4 but maintained in the host memory 222 by the kernel driver 325. Multiple applications 322 can also be running in the computer system, each with its own instance of user level driver 324. Each such application 322 maintains, via its respective user level driver instance 324, TX, RX and Event data queues. As with the kernel queues, each such TX, RX and Event data queue has an associated DMA command queue, not shown in FIG. 4 but maintained in the host memory 222 by the respective user level driver 324. Note that the kernel driver 325 is also able to communicate data packets received by the kernel, to the user level driver of individual target applications. This communication occurs by standard interprocess communication mechanisms of the operating system.

Figure 5:
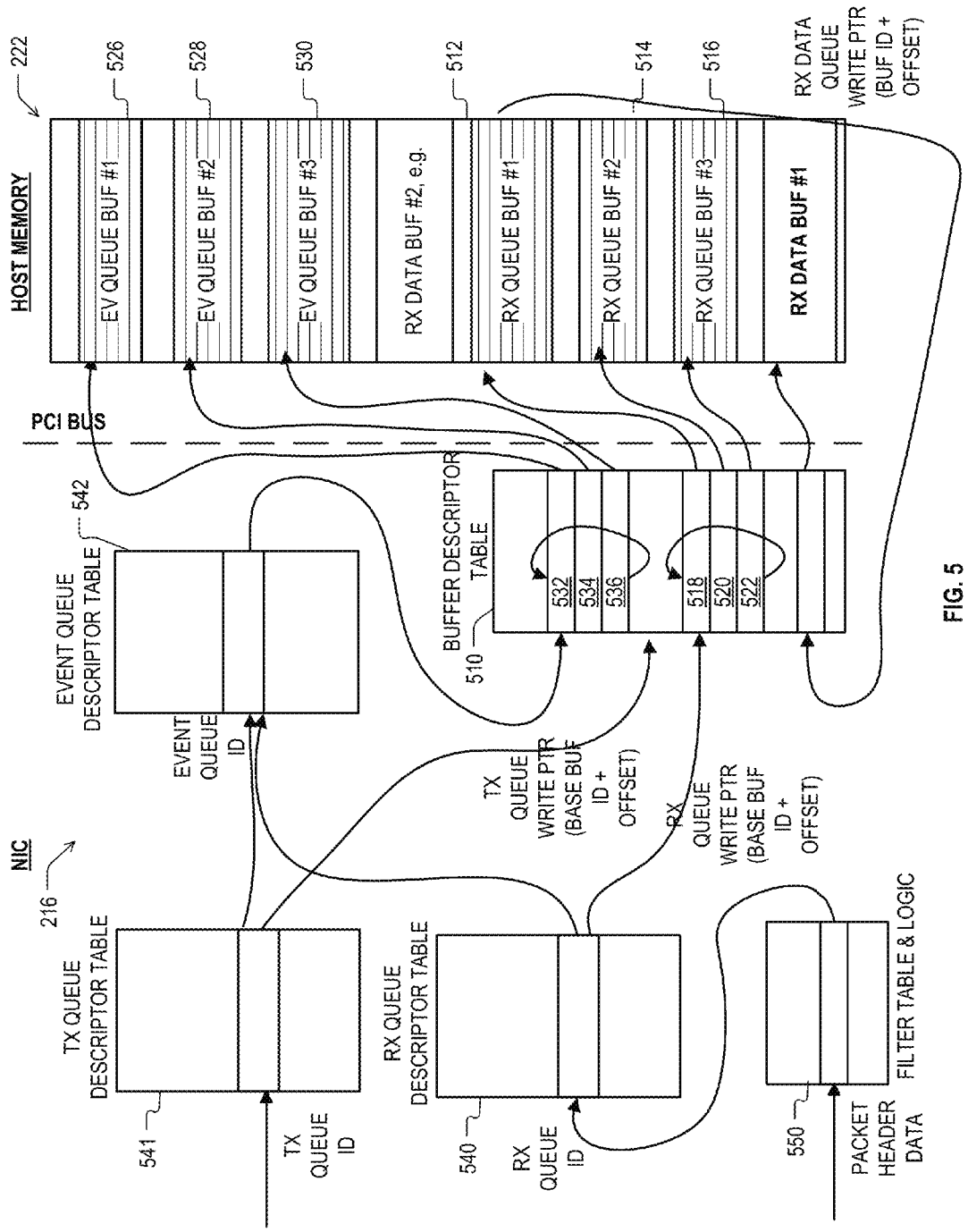
FIG. 5 is a block diagram of various data structures used by the system of FIG. 2.

FIG. 5 is a block diagram of various data structures used by the system of FIG. 2 in order to support separate transmit and receive queues for each of the VNICs. The diagram indicates which structures exist in host memory 222 and which exist on the NIC 216. The transmit and receive data buffers, the transmit and receive DMA descriptor queues, as well as one or more event queues, are all resident in host memory 222 and made up of generalized buffers which can be discontiguous and interspersed with each other in host memory 222. In FIG. 5, the buffers being used as receive data buffers are identified as "RX DATA BUF #n", and the buffers being used for a RX DMA command queue (or more simply, a receive queue) are identified as "RX QUEUE BUF #n". The buffers being used for the event queue are identified as "EV QUEUE BUF #n". Additional buffers in host memory 222, not shown explicitly in FIG. 5, are used for transmit data buffers and for a TX DMA command queue (also called simply a transmit queue). One process may have any number of transmit, receive and event queues, and all of them share the pool of generalized buffers that have been mapped into that process's virtual address space. Other processes use a different pool of generalized buffers mapped into their respective virtual address spaces.

Individual buffers may be either 4 k or 8 k bytes long in one embodiment, and they are chained together into logically contiguous sequences by means of physically contiguous descriptors in a buffer descriptor table 510 stored in the NIC 216. For example, one receive queue might occupy buffers 512, 514 and 516 in host memory 222, which are discontiguous and possibly out-of-order regions of memory. They are chained together into a single logically contiguous space by the physically contiguous entries 518, 520 and 522 in the buffer descriptor table 510. The entries 518, 520 and 522 are written and managed by the host 214 kernel driver and are viewed as a wrap-around ring. So for example, if the host wishes to define a receive queue having 64 k entries for receive data buffer descriptors, and each buffer is 4 k in size, then the host will allocate a physically contiguous sequence of 16 entries in buffer descriptor table 510 for this receive queue. Similarly, one event queue might occupy buffers 526, 528 and 530 in host memory 222. These buffers are discontiguous and possibly out-of-order in host memory, but are chained together into a single logically contiguous wrap-around space by the physically contiguous entries 532, 534 and 536 in the buffer descriptor table 510. The buffer descriptor table 510 is indexed by "buffer ID", and each of its entries identifies, among other things, the base address of the corresponding buffer in host memory 222.

In order to keep track of the state of each of the transmit, receive, and event queues for the many user-level applications that might be in communication with NIC 216 at the same time, the NIC 216 includes a receive queue descriptor table 540, a transmit queue descriptor table 541, and an event queue descriptor table 542. The transmit, receive and event queue descriptor tables are shown in FIG. 5 as separate tables, each containing the entire table, but it will be appreciated that in different embodiments the three tables can be implemented as a single unified table, or one of the tables can be implemented as separate sub-tables (divided by columns or by rows or by both), or some combination of these variations might be implemented. Each receive queue has a corresponding receive queue ID, which is used as an index into the receive queue descriptor table 540. The designated entry in the receive queue descriptor table 540 is the starting point for describing the state and other characteristics of that particular receive queue, as viewed by the NIC 216. Each such entry identifies, among other things:

whether the queue is a kernel queue, user queue or another kind of queue;
the size of the queue (number of receive data buffer descriptors it can contain)
the ID of the event queue associated with this receive queue;
buffer ID of base buffer for this receive queue;
"device centric" read and write pointers into this receive queue.

The host 214 maintains "host centric" versions of the read and write pointers as well, and when it has added additional receive buffers to the queue, it so notifies the NIC 216 by writing its updated host centric receive queue write pointer into the address on the NIC of the device centric receive queue write pointer for the particular receive queue.

As shown in FIG. 5, the NIC 216 also includes a filter table and logic block 550. Because the NIC 216 can support multiple simultaneous connections between user-level applications and remote agents on LAN 212, and because the NIC 216 supports these using multiple transmit and receive queues, one function performed by the NIC 216 is to direct each incoming data packet to the correct receive queue. The mechanisms used by NIC 216 to make this determination are described in detail hereinafter, but generally the filter table and logic 550 maintains a correspondence between packet header information and destination receive queue ID. The filter table and logic 550 thus uses the header information from the incoming packet to determine the ID of the proper destination receive queue and uses that receive queue ID to index into the receive queue descriptor table 540. The receive queue ID is the starting point for the NIC 216 to obtain all required information about the destination receive queue for proper forwarding of the packet data.

Thus logically described, in order to deliver a received data packet to the destination receive queue in host memory 222, the NIC 216 first uses the header information of the data packet to look up, in the filter table 550, the appropriate destination receive queue ID. It then uses the ID of the particular receive queue to look up, in the receive queue descriptor table 540, the buffer ID of the base buffer containing the receive descriptor queue. The NIC 216 also obtains from the same place, the current device centric read pointer into that receive descriptor queue. It then uses the base buffer ID as a base, and the device centric read pointer high order bits as an offset, into the buffer descriptor table 510, to obtain the base address in host memory 222 of the buffer that contains the particular receive queue. The NIC then uses that base address as a base, and as an offset the device centric receive queue read pointer low order bits times the number of bytes taken up per descriptor, as a starting host memory address for retrieving entries from the particular receive descriptor queue. The NIC does not allocate separate space for maintaining a write pointer into any local cache into which these entries will be written.

Each entry in the particular receive descriptor queue contains, among other things:
the buffer physical address of a receive data buffer; and
a 2-byte aligned offset into the receive data buffer.

Entries for kernel receive descriptor queues can identify the buffer physical address itself, rather than a buffer ID, because the kernel is trusted to write the correct physical address whereas a user level queue is not.

The NIC 216 then uses the buffer ID of the current receive data buffer as another index into buffer descriptor table 510 to retrieve the buffer descriptor for the buffer into which the current receive data is to be written. Note this buffer descriptor is an individual entry in buffer descriptor table 510; unlike the descriptors for buffers containing receive queues or event queues, this buffer descriptor is not part of a ring. The NIC 216 obtains the physical address in host memory 222 of the current receive data buffer, and then using that physical address as a base, and the 2-byte aligned offset from the receive descriptor queue entry as an offset, it determines the physical starting address in host memory 222 into which the data transfer should begin. The NIC 216 then transfers the received data packet into host memory 222 beginning at that address.

The system handles transmit queues in a similar manner.

The receive queue descriptor table 540 entry designated by the receive queue ID, as previously mentioned, also contains the ID of the receive event queue associated with the particular receive queue. Similarly, the transmit queue descriptor table 541 entry designated by the transmit queue ID contains the ID of the event queue associated with the particular transmit queue. All of the event queues for all the applications 322 are described by respective entries in the event queue descriptor table 542. The entry in the event queue descriptor table 542 identified by a queue ID from the receive or transmit queue descriptor table (540 or 541) is the starting point for describing the state and other characteristics of that particular event queue, as viewed by the NIC 216.

Note that as illustrated in FIG. 5, whereas each slot (e.g. 532, 534, 518) shown in the buffer descriptor table 510 represents a single descriptor, each slot (e.g. 526, 528, 514) in the host memory 222 represents a memory "page" of information. A page might be 4 k or 8 k bytes long for example, so if a receive data buffer descriptor in a receive queue occupies either 4 or 8 bytes, then each slot 512, 514 or 516 as shown in FIG. 5 might hold 512, 1 k or 2 k receive data buffer descriptors.

Figure 6:
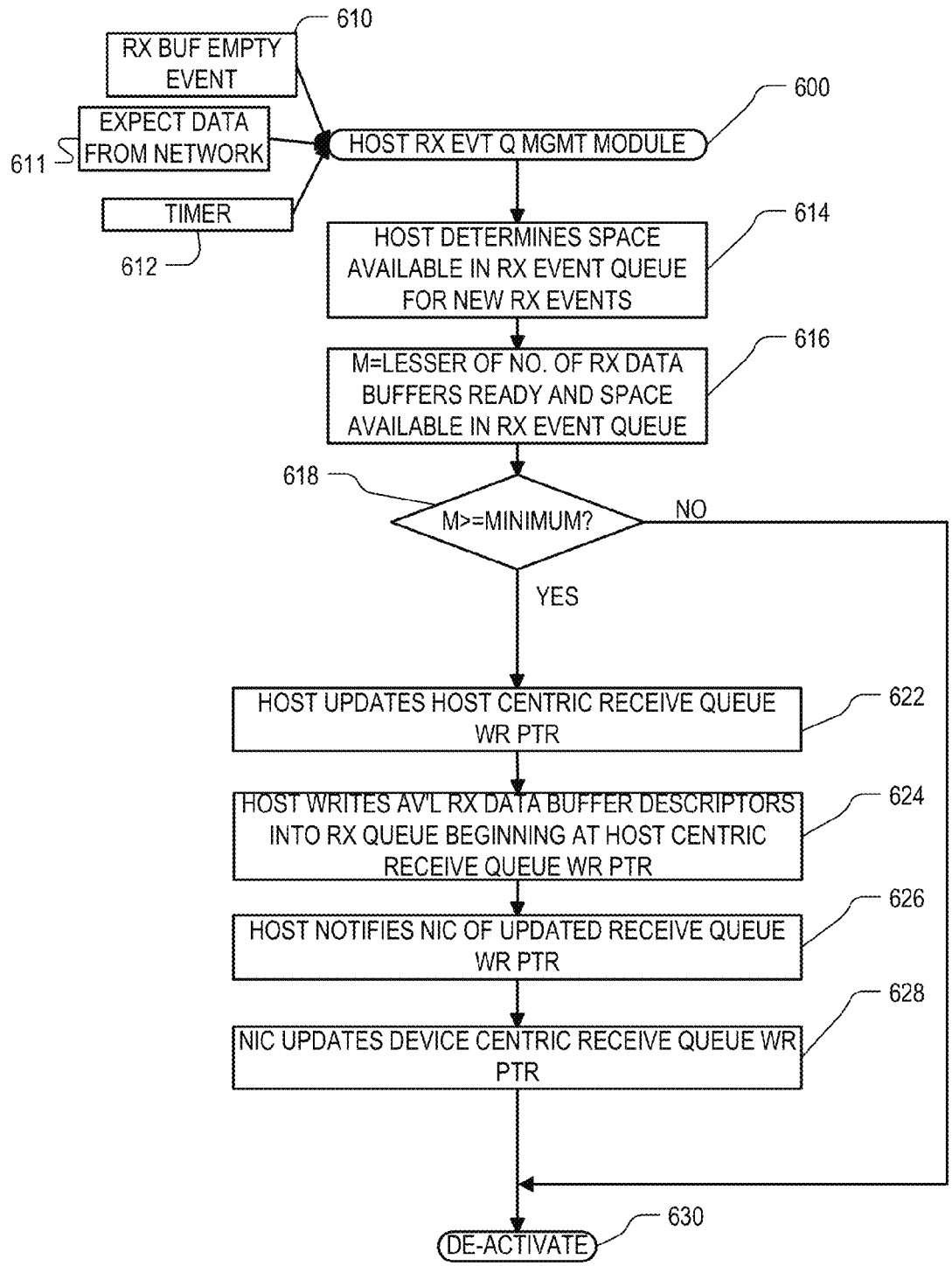
FIGS. 6, 7, 8 and 9 are flowcharts illustrating functions that take place for receiving data using the structures of FIG. 5.

FIGS. 6-9 are flowcharts illustrating functions that take place for receiving data using the structures of FIG. 5. In FIG. 6, a host receive event management module in the user level transport library for a given application process receives an indication from other software to expect data from the network (step 611). The module is also activated in response to receipt by the host of a receive queue empty event as described hereinafter (step 610). The module also may be activated periodically on expiration of a polling loop or timer (step 612). The host subsystem 214 will push receive buffers onto this receive queue in response to these triggers, but limited so as to guarantee that the corresponding event queue will not overflow. The host subsystem 214 therefore will not queue more data buffers for receive data than can be accommodated in the receive event queue by the number of receive completion events that would be generated.

After determining the amount of space currently available in the receive event queue, in step 616 the host subsystem 214 determines a number 'M', being the lesser of the number of data buffers available for queuing of receive data, and the minimum number of receive data buffers that can be represented by receive completion events in the space available in the receive event queue as determined in step 614.

In step 618, it is determined whether M is greater than or equal to some minimum threshold. Preferably the minimum threshold is 1, but in other embodiments a larger number may be chosen for the threshold. If M is less than the threshold, then the host receive event queue management module 600 simply goes inactive to await the next activation event (step 630).

If M is greater than or equal to the minimum threshold, then in step 622, the host subsystem 214 updates (modulo-increments) its host centric receive queue write pointer by M entries. In step 624 the host subsystem 214 writes M available receive data buffer descriptors into the receive queue beginning at the entry previously (before step 622) designated by the host centric receive queue write pointer. In step 626 the host subsystem 214 notifies the NIC 216 of the updated write pointer, and in step 628, the NIC 216 updates its own device centric receive queue write pointer for the specified receive queue. In one embodiment, steps 626 and 628 are combined into a single step in which the host subsystem 214 writes the updated write pointer into a memory mapped location of the device centric receive queue write pointer. In step 630, the host receive event queue management module goes inactive to await the next activation event.

Figure 7:
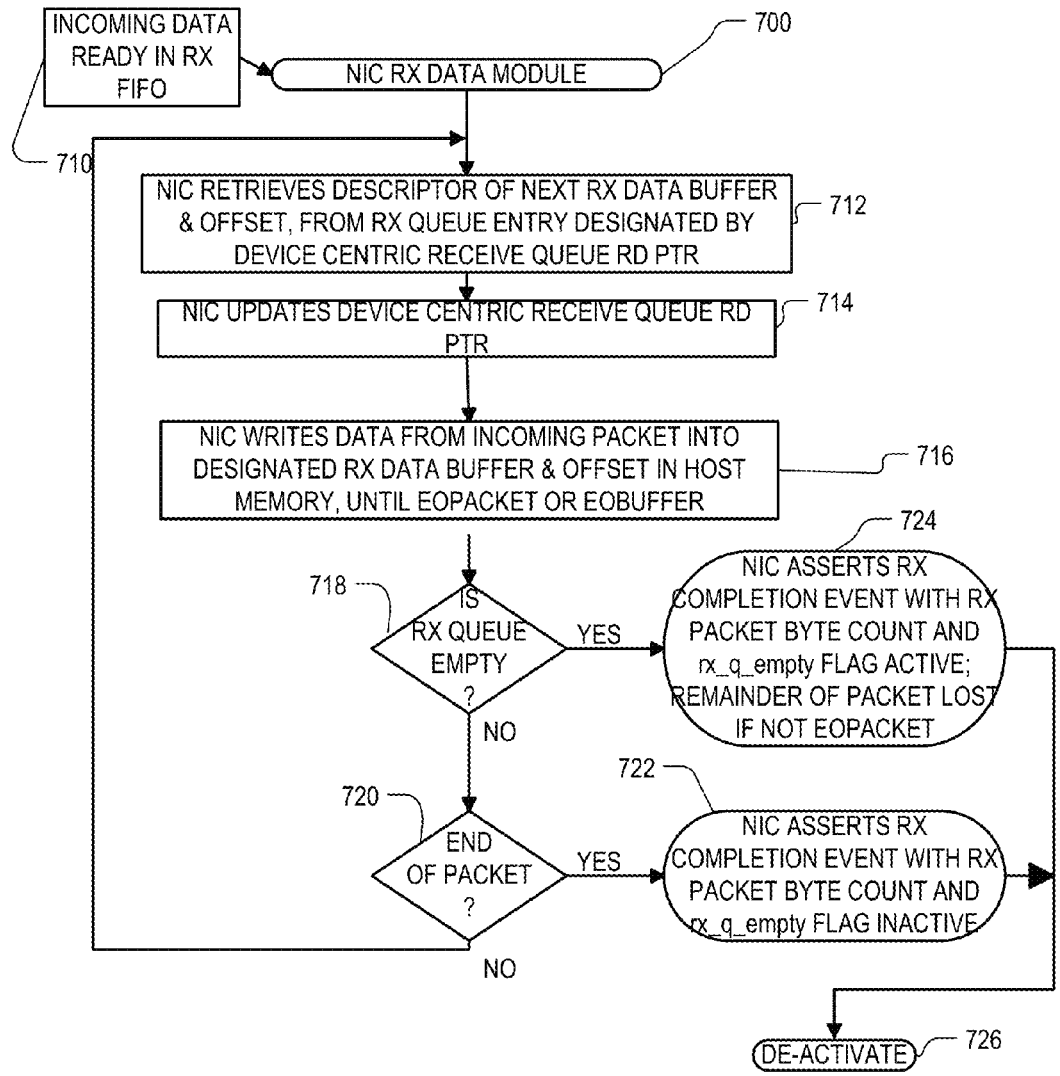

FIG. 7 is a flowchart illustrating functions initiated on the NIC 216 upon receipt of data from the network 212 which it has determined is destined for a particular receive queue. The incoming data is placed into a RX FIFO, and when a high water mark is reached, the NIC receive data module 700 is activated (step 710). In step 712, the NIC 216 retrieves the descriptor of the next receive data buffer and offset from the entry of the receive queue designated by device centric receive queue read pointer for the particular destination queue. In step 714, the NIC 216 updates (modulo-increments) its device centric receive queue read pointer for that queue. The NIC does not at this time notify the host 214 of the new read pointer since that notification will occur implicitly or explicitly through event delivery as described below.

In step 716, the NIC 216 writes data from the incoming packet into the receive data buffer designated by the retrieved descriptor, beginning at the specified offset. Writing continues by DMA until either the end of the current data buffer is reached or the end of the incoming data packet is reached, or both.

The NIC 216 detects and reports a queue empty alert when it believes it has retrieved and used the last buffer descriptor in the particular receive queue. This alert is combined into a single event descriptor with the receive completion event. In particular, the NIC 216 determines in step 718 whether it believes it has used the last receive buffer identified by a descriptor in the receive queue. The NIC can determine this by comparing its device centric receive queue read pointer to its device centric receive queue write pointer for the particular receive queue. If not, that is the NIC knows there are more receive buffer descriptors in the receive queue, then no alert is necessary and in step 720, the NIC determines whether end-of-packet has been reached. If not, then the NIC receive data module 700 returns to step 712 to retrieve the descriptor for the next receive data buffer. No event is asserted to indicate Receive Data Buffer Full in this embodiment. The host 214 will become aware of which receive data buffers are full based on the receive data buffers identified consecutively in the receive queue, beginning at the host-centric RX queue read pointer.

If step 720 determines that end-of-packet was reached, then in step 722 the NIC 216 asserts a receive completion event to cover all the receive data buffers that contain data from the packet. The receive completion event descriptor format includes a receive descriptor queue empty flag ('rx_desc_q_empty'), but in the receive completion event written in step 722, this flag is not set because the NIC 216 has determined (in step 718) that additional receive buffer descriptors remain in the receive queue. Note that in this embodiment, only one receive completion event will be asserted even if the packet data spans multiple buffers in receive data buffers. Multiple buffers are chained together by consecutive entries in the receive queue. Note also that if end-of-packet does not coincide with the end of a receive buffer, then the remaining space in the buffer is left unused.

Returning to step 718, if the NIC 216 believes that the last receive data buffer identified by a descriptor in the receive queue has been retrieved in step 712, then the NIC does not wait until end-of-packet before reporting the receive completion event. Instead, in step 724 the NIC asserts a receive completion event to cover all the receive data buffers that contain data from the packet. In this receive completion event the rx_desc_q_empty flag is set. If packet data remains in the NIC's RX FIFO when this occurs, it is lost.

In an embodiment in which the NIC supports more than one network port, the NIC 216 does not batch receive completion events. Receive completion events do not indicate completion of more than one receive data buffer. This embodiment supports both standard size data packets, in which data packets have a relatively small maximum length and the receive data buffers are at least as large as the maximum data packet length, and "jumbo" data packets, in which a data packet can be longer and can span more than one data buffer. A given receive queue is either in standard mode or jumbo mode. If the queue is in standard mode, then absent an error, every receive data buffer filled will contain an end-of-packet, so no receive completion event will indicate completion of more than one data buffer and the problem will not arise. If the queue is in jumbo mode then it is still the case that no receive completion event will indicate completion of more than one data buffer, since the NIC writes a receive completion event for each data buffer it fills. The receive completion event format includes a "RX_Jumbo_Cont" bit which the NIC sets in order to notify the host subsystem that the subject data buffer does not contain an end-of-packet (i.e. there will be a continuation buffer). This embodiment therefore does not batch receive completion events. The receive completion event still includes a copy of the NIC's updated device centric receive queue read pointer, which now points to the specific descriptor from the receive queue for whose data buffer the event indicates completion. The receive completion event format also indicates the NIC port number from which the packet was received.

Returning to the FIG. 7 embodiment, after both steps 724 and 722, once the NIC has asserted a receive completion event, the NIC receive data module 700 then returns to an inactive state (step 726).

Figure 8:
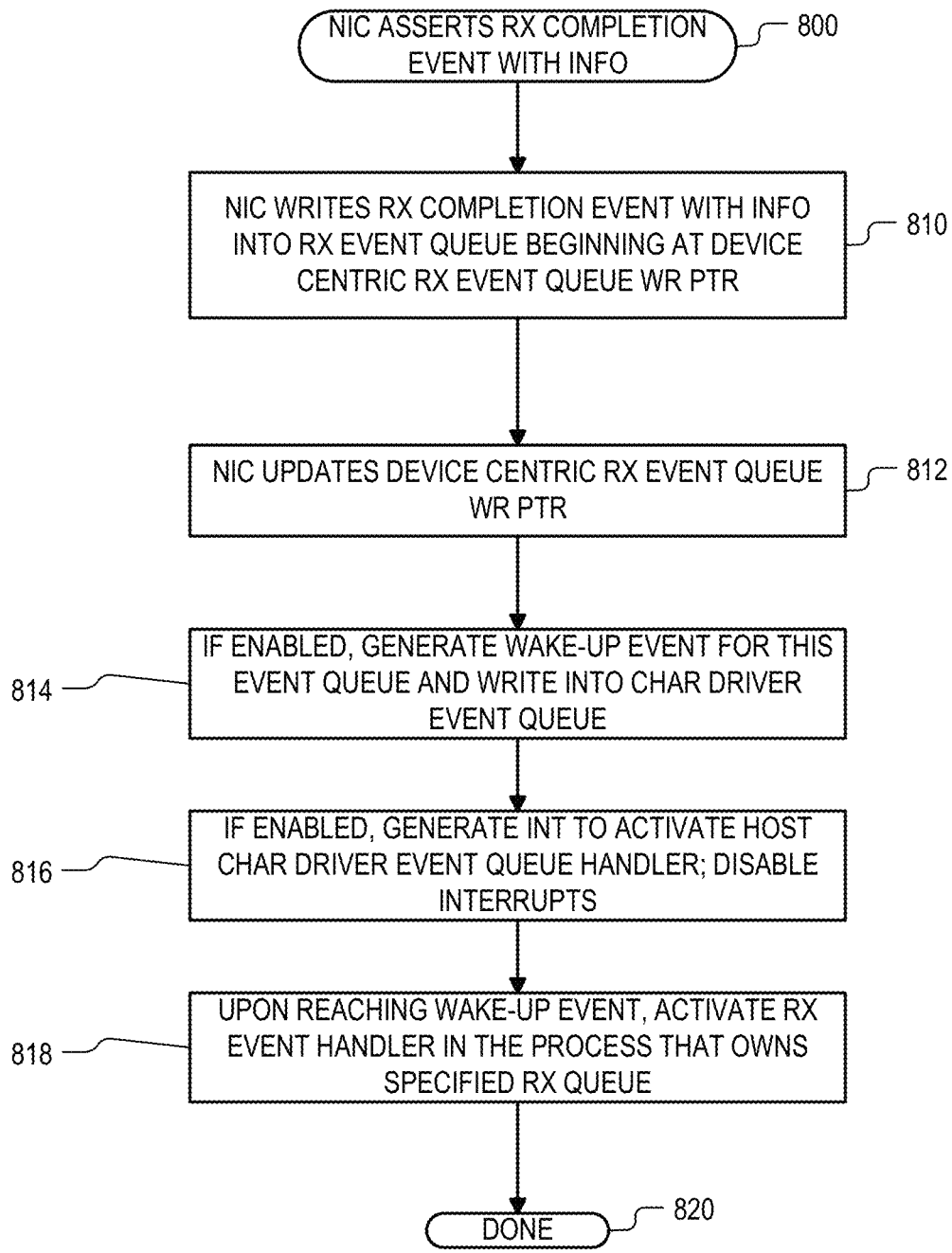

In both steps 724 and 722, the NIC asserts a receive completion event containing certain information. FIG. 8 is a flowchart detail of this step. In step 810, the NIC 216 writes the receive completion event into the corresponding receive event queue beginning at the entry identified by the device centric receive event queue write pointer for that event queue. In step 812, NIC 216 correspondingly updates its own receive event queue write pointer. In step 814, if enabled, the NIC 216 generates a wake-up event for this event queue and writes it into an event queue associated with a char driver in the kernel. In step 816, again if enabled, the NIC 216 generates an interrupt to activate the host char driver event queue handler, then disables interrupts. In step 818, the host char driver event queue handler, upon reaching the wake-up event, activates the receive event handler in the process that owns the specified receive queue.

Figure 9:
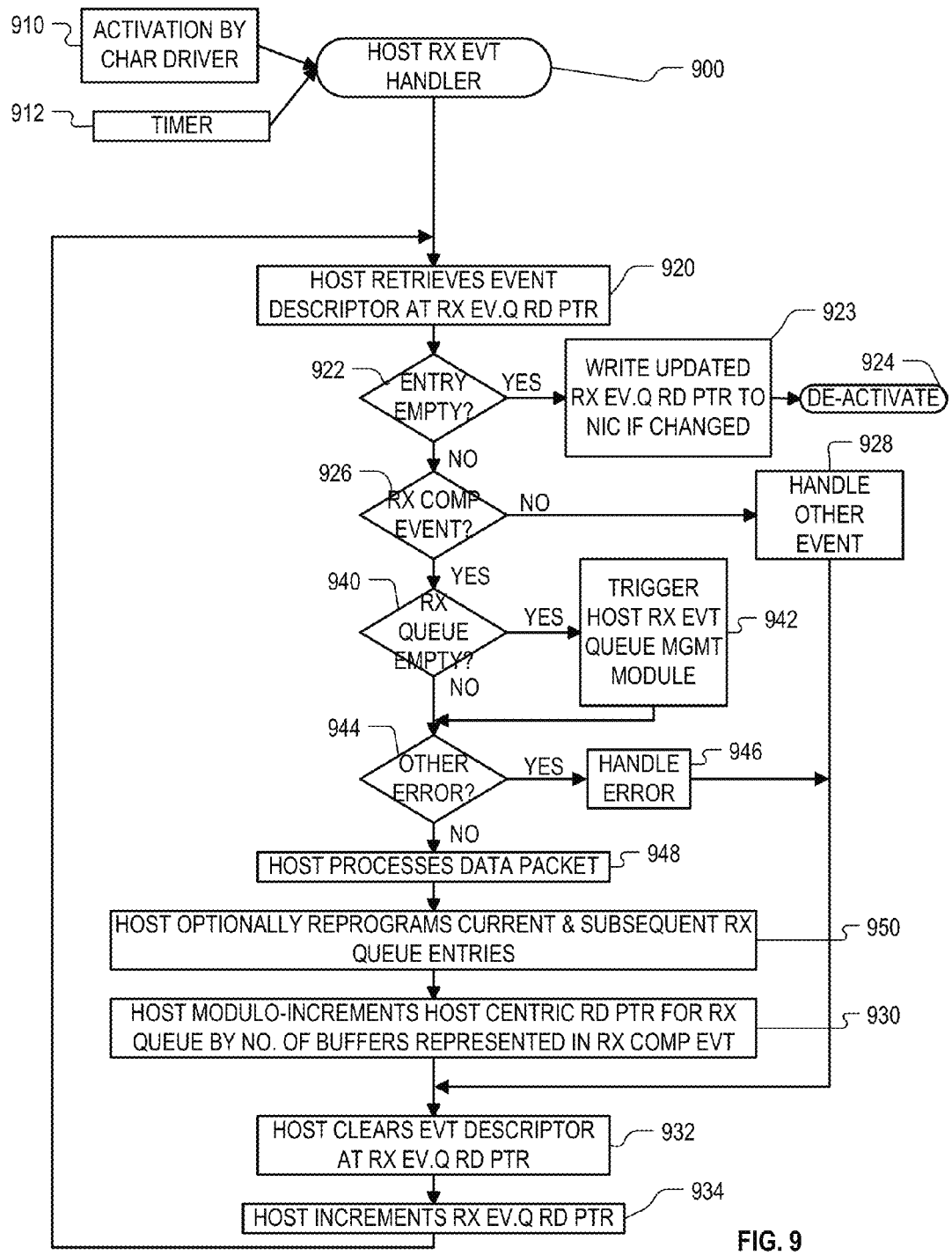

FIG. 9 is a flow chart illustrating pertinent functions of a host receive event handler module 900 of the user level transport library of the process that owns the particular destination receive queue. Module 900 is activated either by the host char driver in response to a wakeup event (step 818, FIG. 8), or on selection periodically by a polling loop or expiration of a timer (step 912).

In step 920, the host subsystem 214 retrieves the event descriptor at the location in the event queue designated by the receive event queue read pointer. If this new event is not in the cleared state (step 922), then the receive event queue contains events for handling at this time. In step 926, it is determined whether the new event is a receive completion event. In one embodiment receive event queue cannot contain any events other than receive completion events, but in another embodiment it can. Thus if the current event is something other than a receive completion event, such as a management event, then it is handled in step 928.

If the current event is a receive completion event, then in step 940 the host 214 determines whether the Receive Queue Empty flag is set. If so, then the module (in step 942) triggers the host receive event queue management module 600 in order to replenish the receive queue with additional receive data buffers. In step 944, the host 214 determines further whether any of a variety of error types are indicated by the receive completion event descriptor. If so, then in step 946 the host 214 handles the error. Note that some of the error types included in step 944 may actually be detected before or after the receive queue empty test of step 940, some may bypass the replenishment (triggered by step 942) of receive buffer descriptors in receive queue for the time being, and some may bypass processing of the data packet in step 948. The details of such error handling are not important for an understanding of the invention.

In step 948, assuming no serious error has been detected, the host 214 processes the newly received packet data, including protocol processing. This may require chaining together several receive data buffers in sequence as designated by consecutive receive queue entries. The host 214 knows the starting buffer and offset of the packet from the buffer descriptor in the receive queue pointed to by the host centric receive queue read pointer, and knows the end of the packet either from the receive packet byte count identified in the receive completion event or from the copy of the device centric receive queue read pointer that might be included in the receive completion event. After processing the packet data in these buffers, the host may release the buffers back into a pool for eventually re-writing into the receive queue for re-use by different incoming packet data.

In step 950, if the higher level software is so designed, the host subsystem 214 may reprogram the receive queue entry pointed to by the host centric receive queue read pointer with a descriptor for a new available receive data buffer, and may do the same with respect to all consecutively subsequent receive queue entries up to but not including the receive queue entry pointing to the beginning of data for the next receive packet. In step 930, the host subsystem 214 modulo-increments the host centric receive queue read pointer for the receive queue by the number of buffers represented in the current receive completion event. In step 932, the host subsystem 214 clears the event descriptor at the location in receive event queue identified by the current receive event queue read pointer, and in step 934 the host subsystem 214 modulo-increments the receive event queue read pointer. The module then loops back to step 920 to retrieve the next event descriptor, and so on until a cleared entry is retrieved and the module goes inactive (step 924).

If in step 922 it is determined that the retrieved next event descriptor is cleared, then the receive event queue contains no more events for handling at this time. In one embodiment, the host receive event handler 900 would then simply go inactive to await the next activation trigger (step 924). In another embodiment, in step 923, if the host centric receive event queue read pointer has changed, then the host writes the updated pointer value into the NIC's device centric receive event queue read pointer. The host receive event handler 900 then goes inactive in step 924.

Figure 10:
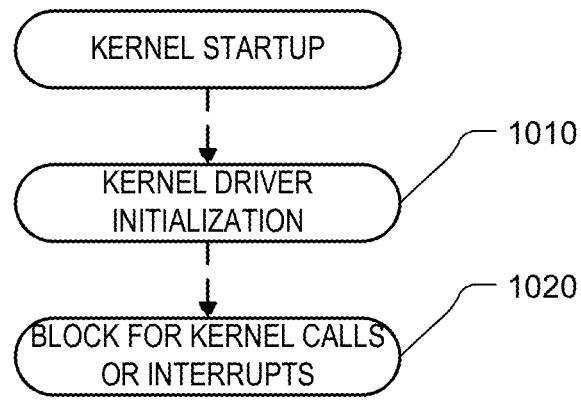
FIG. 10 is a flow chart of pertinent steps that are performed by the operating system kernel of FIG. 2 on system startup.

FIG. 10 is a brief flow chart of pertinent steps that are performed by the operating system kernel 325 on system startup. In a step 1010, the system calls a kernel driver initialization routine, and when that returns, in step 1020, the kernel blocks and awaits calls or other interrupts from the various hardware and software entities in the system. Many other steps of course are performed during kernel startup, but they are not shown in FIG. 10 since they are not pertinent to the present description.

Figure 11:
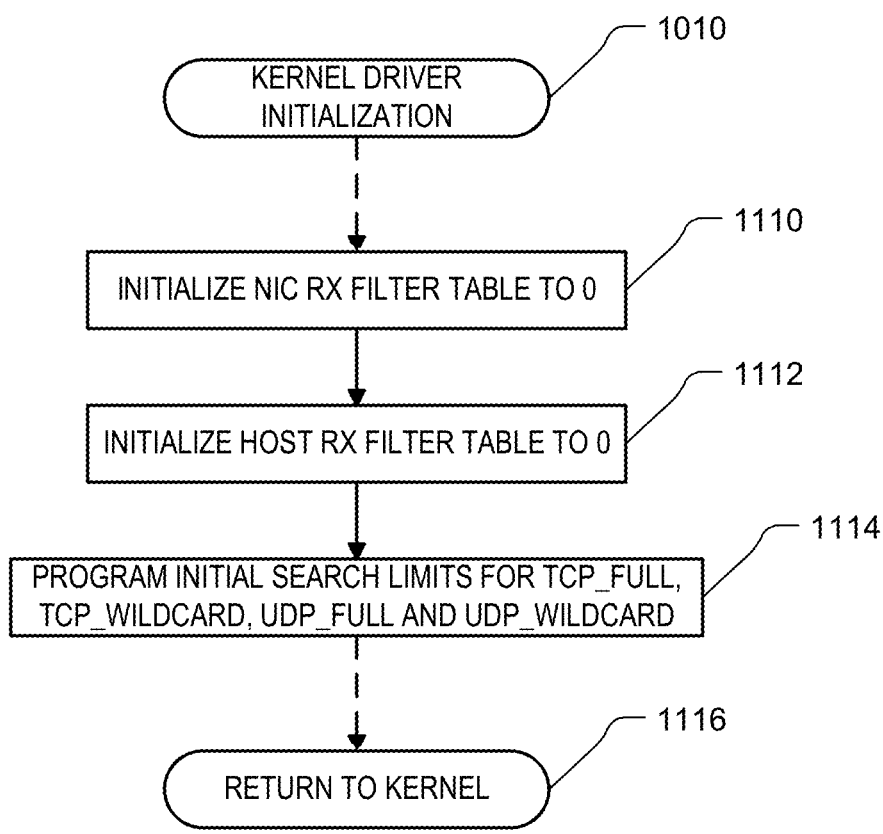
FIG. 11 is a flow chart of pertinent steps performed by the kernel driver initialization routine called in FIG. 10.

FIG. 11 is a flow chart of pertinent steps performed by the kernel driver initialization routine 1010. In step 1110, the routine initializes the receive filter table in the NIC 216 such that each entry in the table contains a value which will be recognized by the NIC as being empty. This can be done by setting an empty flag bit for each entry, or preferably, by writing a unique known value into each entry. In the present embodiment the value indicating an empty entry is zero. The kernel driver 325 maintains its own host-centric copy of the receive filter table in host memory 222, and in step 1112, the kernel driver initializes the host receive filter table to all zeros as well.

In step 1114, the kernel driver programs initial search limits for four kinds of filter table hash searches into the NIC 216. Before explaining this step, it will be useful to understand the organization of the receive filter table. There are many ways to organize the receive filter table, but in the present embodiment, all types of entries are intermixed in a single table address space. Four types of entries are supported: TCP_full, TCP_wildcard, UDP_full and UDP_wildcard. Table 1 below illustrates the format for an entry in the receive filter table.

| Entry Type | bit[108] | bits[107:96] | bits[95:64] | bits[63:48] | bits[47:16] | bits[15:0] |
|---|---|---|---|---|---|---|
| TCP_Full | 0 | Q_ID[11:0] | destIP[31:0] | destPORT[15:0] | srcIP[31:0] | srcPORT[15:0] |
| TCP_Wildcard | 0 | Q_ID[11:0] | destIP[31:0] | destPORT[15:0] | 0 | 0 |
| UDP_Full | 1 | Q_ID[11:0] | destIP[31:0] | destPORT[15:0] | srcIP[31:0] | srcPORT[15:0] |
| UDP_Wildcard | 1 | Q_ID[11:0] | destIP[31:0] | 0 | 0 | destPORT[15:0] |

It can be seen that each entry contains up to five fields for identifying a particular TCP or UDP endpoint in the host subsystem 214 (protocol (TCP or UDP), source IP address, source port number, destination IP address, destination port number), plus one for the associated receive queue ID. The queue ID field points to the entry in the receive queue descriptor table 540 (FIG. 5), into which an incoming packet should be delivered when the endpoint data specified in the entry matches that of the header of the incoming packet.

The four fields, source IP address, source port number, destination IP address, and destination port number are referred to herein as the endpoint data portion of the entry. For a TCP_full entry, all four fields of endpoint data are filled. An incoming data packet will not match such an entry unless it is a TCP packet and all four endpoint data fields match corresponding fields in the packet header. For a TCP_wildcard entry, the destination IP address and destination port number are filled in, and the remaining fields contain zeros. An incoming data packet will match a TCP_wildcard entry if the incoming packet is a TCP packet and the two filled-in endpoint fields of the entry match corresponding fields in the packet header, regardless of the source IP address and port. For a UDP_full entry, all four fields of endpoint data are filled. An incoming data packet will not match such an entry unless it is a UDP packet and all four endpoint data fields match corresponding fields in the packet header. For a UDP_wildcard entry, like the TCP_wildcard entry, only the destination IP address and ports are filled and the remaining fields contain zeros. The UDP_wildcard entry format differs from that of the TCP_wildcard entry format since the destination port number is located in the field in which, for the TCP_full entry, contains the source port number. An incoming data packet will match a UDP_wildcard entry if the incoming packet is a UDP packet and the two filled-in endpoint data fields of the entry match corresponding fields in the packet header, again regardless of the source IP address and port.

It will be appreciated that another implementation might support different table entry formats, different protocols, and/or different entry types. As one example, entries may contain other kinds of numeric range indications rather than a wildcard for the entire field. As another example, particular bits of an address or port field may be wildcarded out (such as the low-order bits of an IPv6 address). As can be seen, as used herein, therefore, the "matching" of an entry to particular header information does not necessarily require complete equality. It is sufficient that it satisfies all conditions specified for a match.

All invalid entries in the table are written with all zeros. Obsolete entries are removed ("tombstoned"), at least in the first instance, by marking them with all zeros as well.

Although all four entry types co-exist in the same filter table, separate searches are performed through the table for each type. If the incoming data packet is a UDP packet, then a search is performed first for a matching UDP_full entry, and if that fails, then for a matching UDP_wildcard entry. If the incoming data packet is a TCP packet, then a search is performed first for a matching TCP_full entry, and if that fails, then for a matching TCP_wildcard entry. All four kinds of searches are hashed searches, described in detail below. It will be seen that these searches will proceed through only a limited number of iterations before aborting. In one embodiment, the search limits for all four types of entries are the same, but in the present embodiment they can be different. In particular, the UDP_wildcard search limit is kept relatively small because UDP packets are relatively rare. It is not likely that the receive filter table will develop very long search chains of valid UDP entries, since not many software processes will need to program very many UDP filters. Similarly, the TCP_wildcard search limit is typically kept relatively small because again, few software processes are expected to require more than a few TCP_wildcard filter entries. The only one of these four types of entries that might require a high search limit is the TCP_full entry type, since a separate filter table entry might be required for example for each TCP connect( ) call made by an application or kernel process. In any event, if these assumptions are incorrect in a particular environment or at a particular point in time, the search limits can be adjusted dynamically as described hereinafter.

Accordingly, in step 1114, the kernel driver initialization routine programs into the NIC 216 the initial search limits for each of the four types of filter table entries. In step 1116, the driver routine returns to the kernel.

Figure 12:
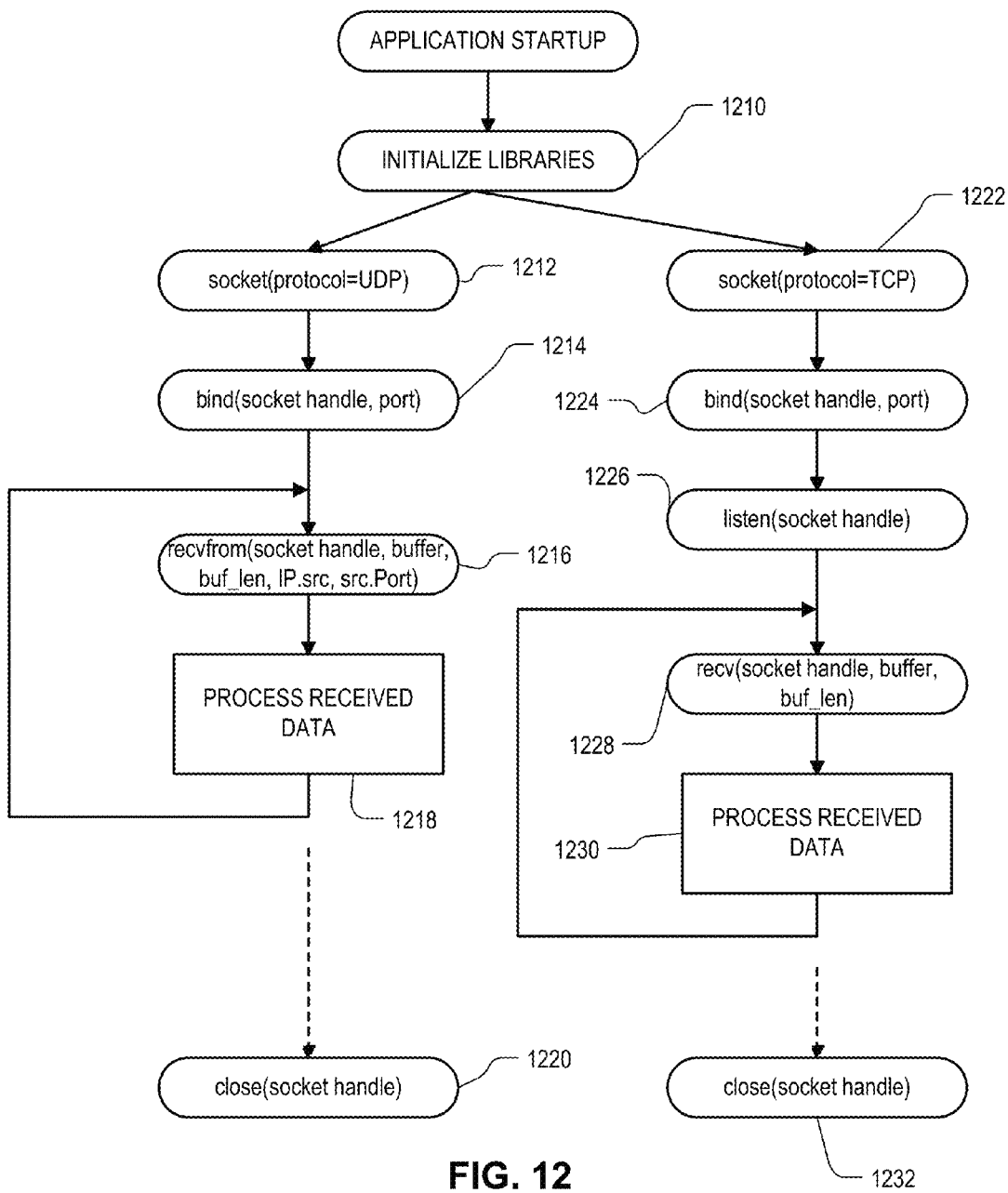
FIG. 12 is an example broad outline of steps that an application process might follow in the system of FIG. 2 for the reception of IP packets from the network.

FIG. 12 is an example broad outline of steps that an application process might follow in the system of FIG. 2 for the reception of IP packets from the network 212. This flowchart covers only the TCP and UDP transport level protocols; other embodiments can support other protocols, including but not limited to SCTP, RTP, ICMP and IGMP.

In a step 1210, when the application first starts up, its libraries are initialized. This includes the user level transport library 324, which is initialized into the application's virtual address space.

Step 1212 begins an example sequence of steps in which the application process uses a UDP transport protocol. In step 1212 the application makes a call to the socket( ) routine of the user level transport library 324, specifying that it would like a UDP socket. In step 1214, the application process calls the bind( ) routine of the user level transport library 324 in order to bind the socket to a port. In step 1216, the application process makes a call to the recvfrom( ) routine of the user level transport library 324, specifying the socket handle, the receive buffer, the buffer length, and the source IP address and port from which an incoming packet is expected. As described below, the recvfrom( ) routine of the User Level Transport Library, among other things, writes an appropriate UDP_full-type tuple into the receive filter table on the NIC 216 and in the host 214. If the application wishes to receive packets from any IP address and Port, these latter two fields may contain zeros. In this case the recvfrom( ) routine of the User Level Transport Library will write an appropriate UDP_wildcard-type tuple into the receive filter table on the NIC 216 and in the host 214.

After the recvfrom( ) call, the application blocks until a packet satisfying the specified criteria comes up from the NIC 216 or from the kernel driver 325. At that time, in step 1218, the application processes the received data and returns, in this example, to step 1216 to await the next incoming data packet.

Steps 1216 and 1218 are repeated many times, most likely interspersed with many other functions performed by the application process. When the application has finished with the socket that it had created in step 1212, then in step 1220, the application makes a call to the close( ) routine of the user level transport library 324 in order to close the socket.

Alternatively to the UDP sequence beginning with step 1212, step 1222 begins an example sequence of steps in which the application process uses a TCP transport protocol. In step 1222, instead of calling the socket routine of the user level transport library 324 to specify the UDP protocol, it calls the socket routine to specify the TCP protocol. In step 1224 the application process calls the bind( ) routine similarly to step 1214, in order to bind the socket to a port. In step 1226, since the transport protocol is now TCP, the application process calls the listen( ) routine of the user level transport library 324, in order to listen for an incoming TCP connection request. Alternatively in step 1226 the application process may call the accept( ) routine of the user level transport library 324. Both the listen( ) and accept( ) routines invoke the kernel to write into the receive filter table on the NIC 216 and in the host 214 a new IP tuple of type TCP_wildcard, so that any incoming TCP connection request (SYN) having the appropriate destination IP address and port number in its header, will be sent up to the present application process for handling.

In step 1230 the application process makes a call to the recv( ) function of the user level transport library 324, specifying a socket handle, the buffer into which data should be delivered, and the buffer length. At this point the application blocks until a packet satisfying the specified criteria comes up from the NIC 216 or from the kernel driver 325. At that time, in step 1230, new incoming data arrives in the buffer and the application processes it. The application then may return to the recv( ) step 1228 to await the next incoming data packet. Again, many other steps may take place in between those illustrated in the flow chart. In step 1232, the application terminates, or the connection may be terminated, at which time the application makes a call to the close( ) routine of the user level transport library 324 in order to close the socket.

Note that for TCP connections initiated by the present application process, instead of calling the listen( ) routine in step 1226, typically the application will make a call to the connect( ) routine of the User Level Transport Library, specifying the socket handle and the destination IP address and port number. The connect( ) routine of the User Level Transport Library will, among other things, invoke the kernel driver 325 to write into the receive filter table on the NIC 216 and the host 214 a new IP tuple of type TCP_full, so that only those incoming TCP packets having four matching endpoint data fields will be sent up into the present application process.

Figure 13:
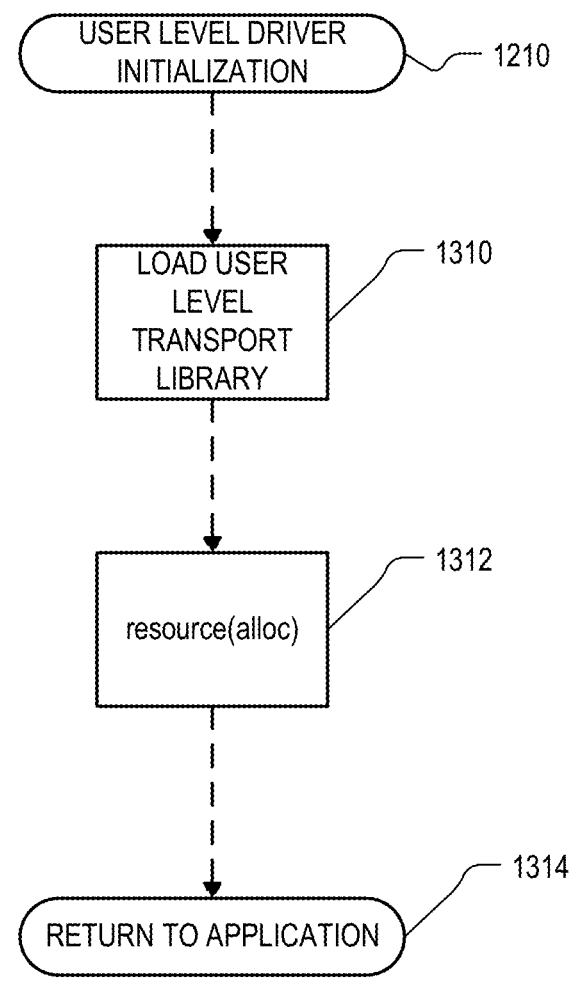
FIG. 13 is a flowchart detail of steps that might be performed during the library initialization step of FIG. 12.

FIG. 13 is a flowchart detail of steps that might be performed during the library initialization step 1210 of FIG. 12. In step 1310, the user level transport library 324 is loaded into the application's virtual address space. In a conventional system, the transport library loaded in step 1310 might be a very thin layer (or incorporated within another general purpose library such as glibc), which does little more than make calls to the kernel driver and return any results to the application. In the system of FIG. 2, however, the transport library loaded in step 1310 is more sophisticated in that it includes the user level routines described herein.

In step 1312, as part of the initialization of the user level transport library, a resource allocation routine in the kernel driver 325 is invoked. The kernel level routine is required for allocating resources in the network interface card and the host memory subsystem 222, since these resources are outside the virtual address space of the application, or involve direct hardware accesses that advisedly are restricted to kernel processes. After resource allocation, the user level driver initialization routine 1210 may perform a number of other steps before it returns to the application in step 1314.

Figure 14:
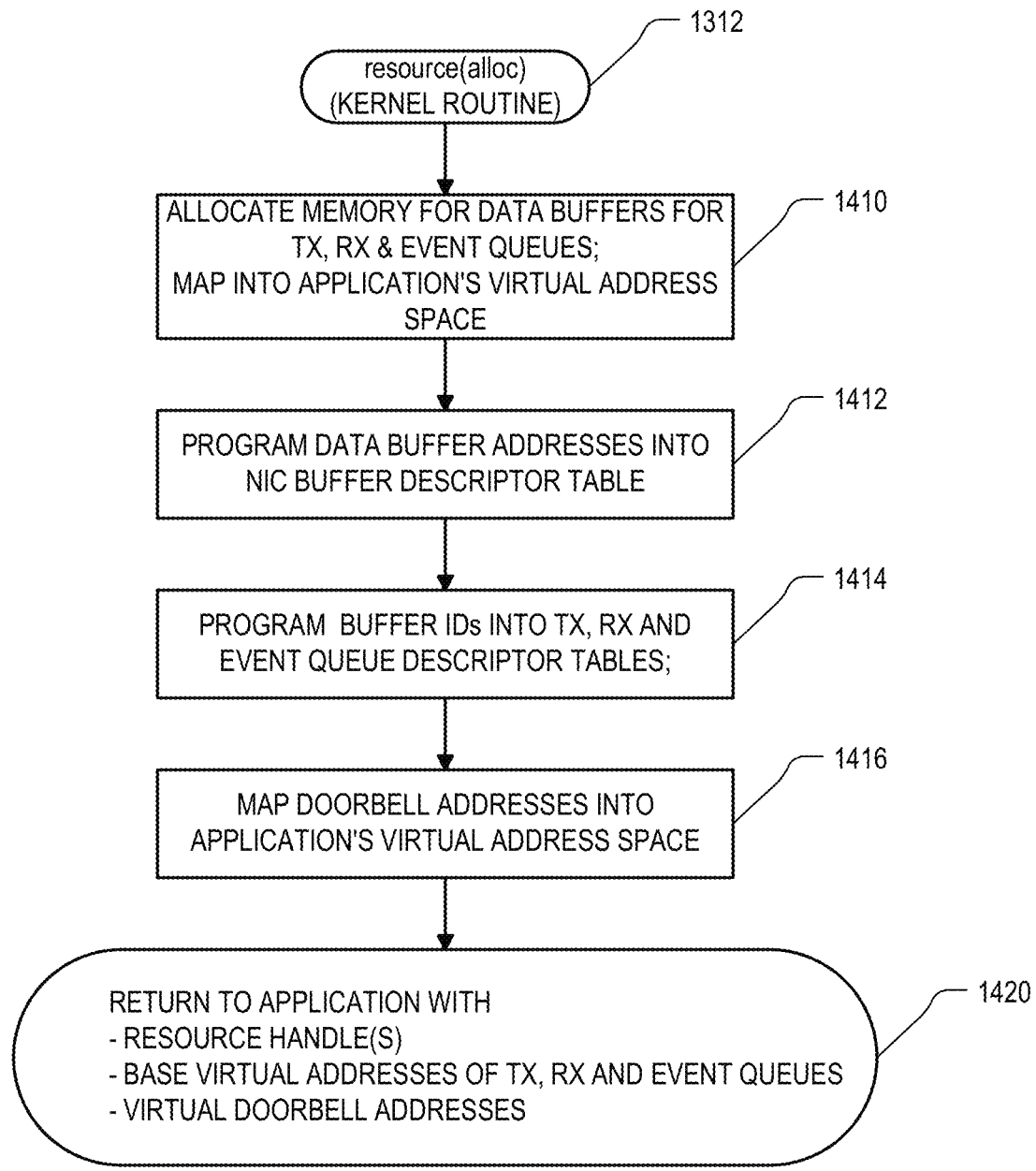
FIG. 14 is a flowchart illustrating significant steps performed by the kernel resource allocation routine in FIG. 13.

FIG. 14 is a flowchart illustrating significant steps performed by the kernel resource allocation routine 1312. In step 1410, the kernel begins by allocating memory for the generalized buffers that will be used to hold the transmit, receive, and event queues. It then maps the buffers into the application's virtual address space so that the application can read and write to them directly. (See previous description with respect to FIG. 3A). In step 1412, the kernel routine installs descriptors for these buffers in the buffer descriptor table 510.

In step 1414, the kernel routine allocates a minimum set of the buffers for each of the transmit, receive, and event queues requested, and programs their buffer IDs into the transmit, receive, and event queue descriptor tables (541, 540, and 542). In step 1416, the kernel routine determines the "doorbell" address in the NIC 216 for each of the transmit and receive queues, and maps them as well into the application's virtual address space. The doorbell address is the address to which the user level transport library will write a value, in order to notify the NIC either that a transmit buffer is ready or that a receive buffer can be released. For transmit queues, the doorbell address is the address of the device centric transmit queue read pointer in the transmit queue descriptor table 541 entry for the particular transmit queue. For receive queues, the doorbell address is the address of the device centric receive queue write pointer in the receive queue descriptor table 540 entry for the particular receive queue.

In step 1420, the resource allocation routine returns to the application with handles for the resources allocated, with the base virtual addresses of the transmit, receive and event queues, and virtual memory addresses corresponding to the doorbells allocated in the transmit and receive queue descriptor tables (541 and 540).

Figure 15:
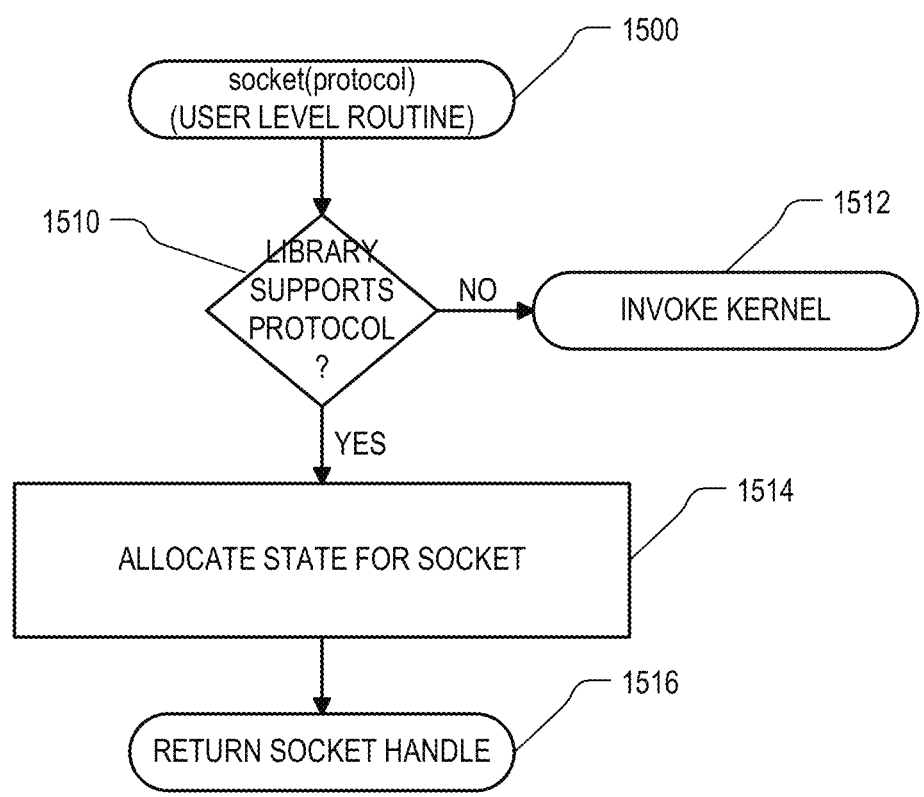
FIG. 15 is a flowchart of the user level routine in the transport library of FIG. 3A for establishing a socket.

FIG. 15 is a flowchart of the user level routine in the transport library 324 for establishing a socket. The socket routine is called in both steps 1212 and 1222 of FIG. 12. In step 1510, the routine first determines whether the user level transport library 324 contains the software code necessary to support the specified protocol. If not, then in step 1512, makes a system call to pass the request on to the kernel to handle. If it does support the specified protocol, then in step 1514 it allocates its internal state for the new socket. In step 1516 the routine returns to the application program with a handle for the new socket.

Figure 16:
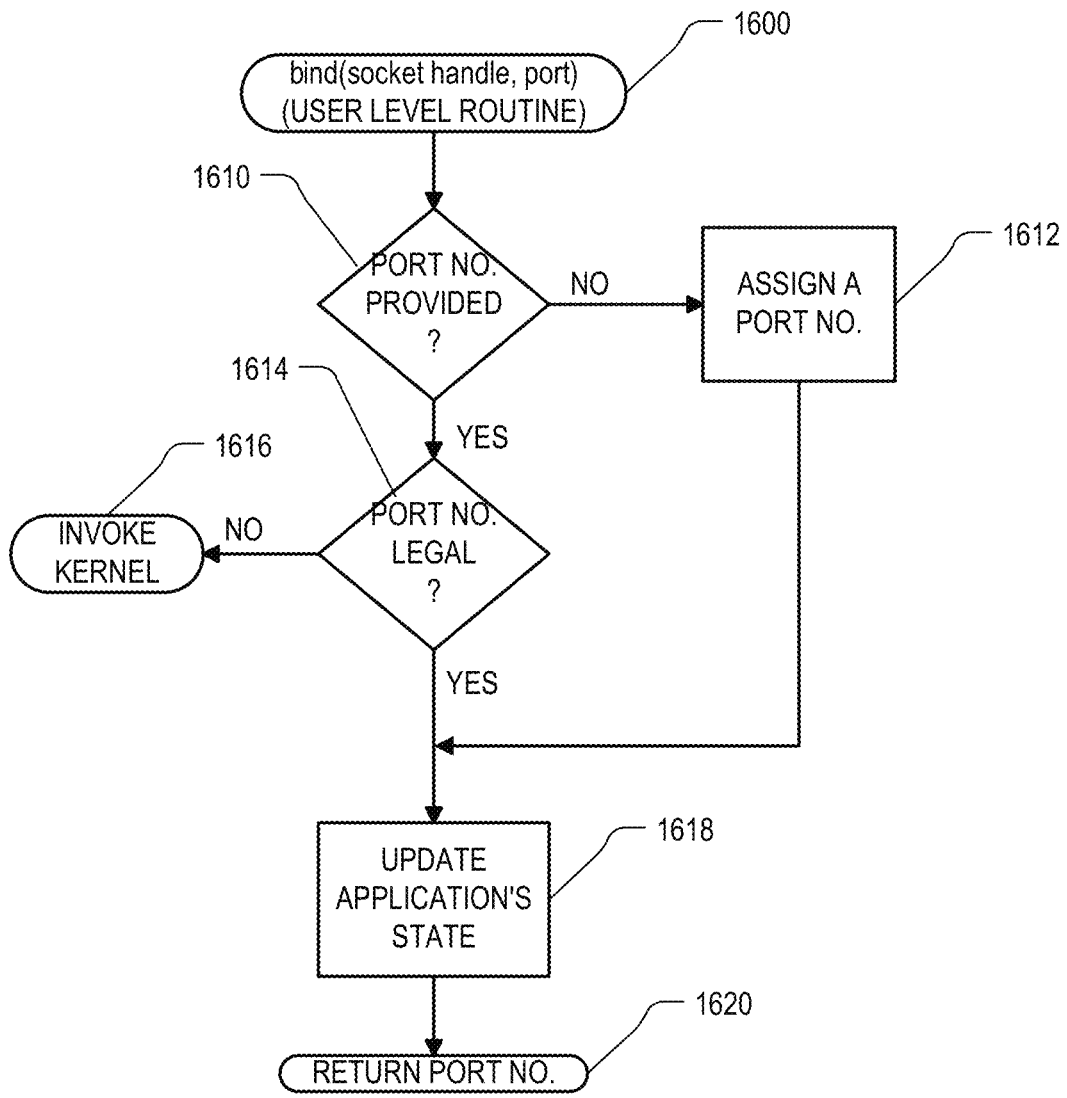
FIG. 16 is a flowchart of the user level routine transport library of FIG. 3A for binding a port number to a socket.

FIG. 16 is a flowchart of the user level routine transport library 324 for binding a port number to a socket. The bind routine is called in both steps 1214 and 1224 of FIG. 12. In step 1610, the routine first determines whether the caller provided a port number. If not, then in step 1612, a port number is assigned. If the caller did specify a port number, then in step 1614, the routine determines whether the port number is legal for the current user process. At least four different mechanisms might be used in the same or different embodiments to ensure that different processes do not interfere with each other's use of particular IP address/port number combinations, and that user processes do not improperly operate through physical or logical port numbers or other resources that should be reserved for the kernel. In one mechanism, a system-wide policy exists which allocates all port numbers within a particular range to the user stack only. The user level bind( ) routine can be designed to immediately accept only those requests from a user level process to bind to one of such port numbers, or to immediately pass such requests on to the kernel to handle.

In a second mechanism, during the resource allocation step 1312, performed during initialization of a particular instance of the user level driver, the kernel allocates a unique IP address for that instance to use as it wishes. If each instance of the user level driver has its own exclusively assigned IP address, then the instance can manage the available port numbers for use with that IP address without risking interference with any other process. This mechanism is useful only if there are sufficient numbers of IP addresses available to the computer system to allocate to the various requesting processes. Again, this mechanism can be used in conjunction with the first, to reject or pass on to the kernel all user level requests to bind to a kernel-only port number, regardless of the exclusivity of an assigned IP address.

In a third mechanism, again during initialization of a particular instance of the user level driver, the initialization routine makes a number of anticipatory bind( ) calls to the kernel in order to form a pool of port numbers that the user level driver instance can later allocate to the application program upon receipt of bind( ) calls to the user level driver. This mechanism can succeed with far fewer IP addresses available to the computer system, but also undesirably involves a context switch (during library initialization) for each port number to be added to the pool.

In yet a fourth mechanism, no IP address/port number combinations are pre-allocated to the particular instance of the user level driver. Instead, the user level bind( ) routine invokes the kernel bind( ) routine for each user level bind( ) call received. This mechanism utilizes IP address/port number combinations most conservatively, but may require more context switches than any of the first, second and third mechanisms. In an embodiment, this fourth mechanism is used only as a backup, for example if the user level process requires more port numbers than were made available using the anticipatory bind( ) calls in the third mechanism.

If in step 1614 the user level bind( ) routine determines that the requested port number is not available to the current instance of the user level driver, or otherwise cannot determine whether is available, then in step 1616, the routine makes a call to the kernel bind( ) routine to pass the request on to the kernel to handle. If the fourth mechanism above is the only way that the particular embodiment avoids conflicting or illegal allocation of address/port number combinations, then step 1616 will be taken during every user level call to the bind( ) routine 1600. Otherwise, step 1616 will be taken only as a backup if pre-allocated port numbers have been exhausted, or if the routine otherwise cannot determine that the requested port number is available.

If the specified port number is legal, or if a port number was assigned by the routine in step 1612, then in step 1618 the routine updates the application's state internally, to bind the port number with the specified socket. The routine returns to the caller in step 1620.

Figure 17:
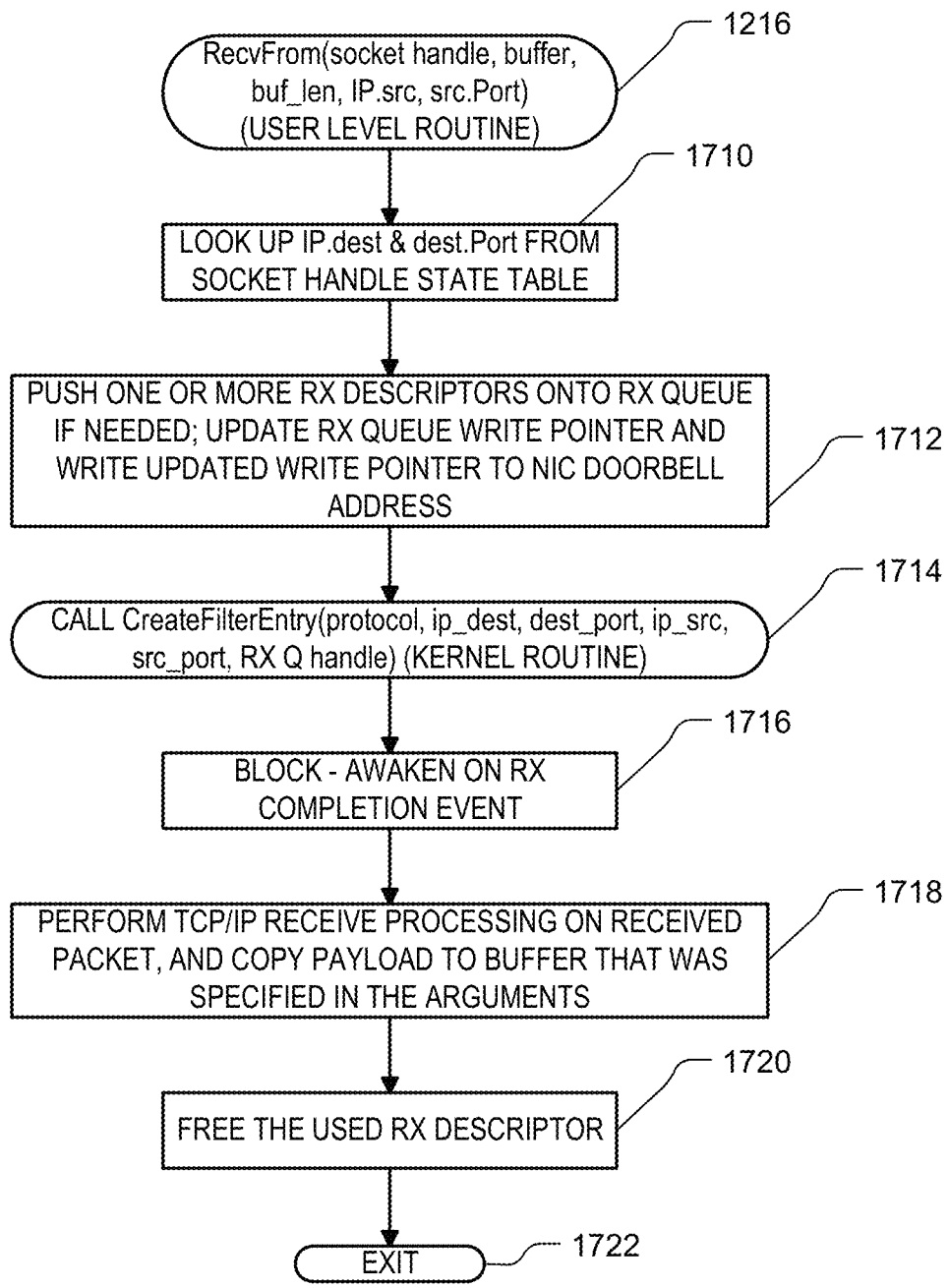
FIG. 17 is a flowchart of pertinent steps of the user level recvFrom( ) routine called in step FIG. 12.

FIG. 17 is a flowchart of pertinent steps of the user level recvFrom( ) routine called in step 1216 (FIG. 12). This routine is called with the socket handle, the address of a buffer that the application wishes to use, the length of the buffer, and optionally the source IP address and port from which the UDP packet is expected. The source IP address and port may be left as zeros if the application does not know them. The application does not necessarily know the destination IP address and port to which the packet will be directed, but in step 1710, the recvFrom( ) routine obtains this information from its own records of the IP address and port associated with the specified socket. In step 1712, the recvFrom( ) routine pushes one or more RX descriptors onto the RX queue if needed. It then updates the RX queue write pointer and writes the updated write pointer to the NIC doorbell address previously assigned. (See step 611, FIG. 6). In step 1714 the routine invokes the kernel routine to create a new filter entry, specifying the UDP protocol, the source and destination IP addresses and port numbers, and the handle previously assigned for the desired destination receive queue. In step 1716, the routine blocks, and awakens on the receipt of a receive completion event as described with respect to step 910 (FIG. 9). In step 1718 (corresponding to step 948 in FIG. 9) the routine then performs TCP/IP receive processing on received packet, and copies the payload to the buffer that the application had specified in the arguments in step 1216. In another embodiment the payload copy can be avoided, for example by delivering headers and payloads separately, and delivering data in-order with respect to the sequence numbers in the headers. In step 1720 the routine frees the receive buffer corresponding to the RX descriptor just used, and in step 1722 the routine exits and returns to the application.

Note that the user level recv( ) routine 1230 (FIG. 12) is in pertinent part the same as the recvFrom( ) routine of FIG. 17, except that since the filter has already been applied, steps 1710 and 1714 are omitted.

Figure 18:
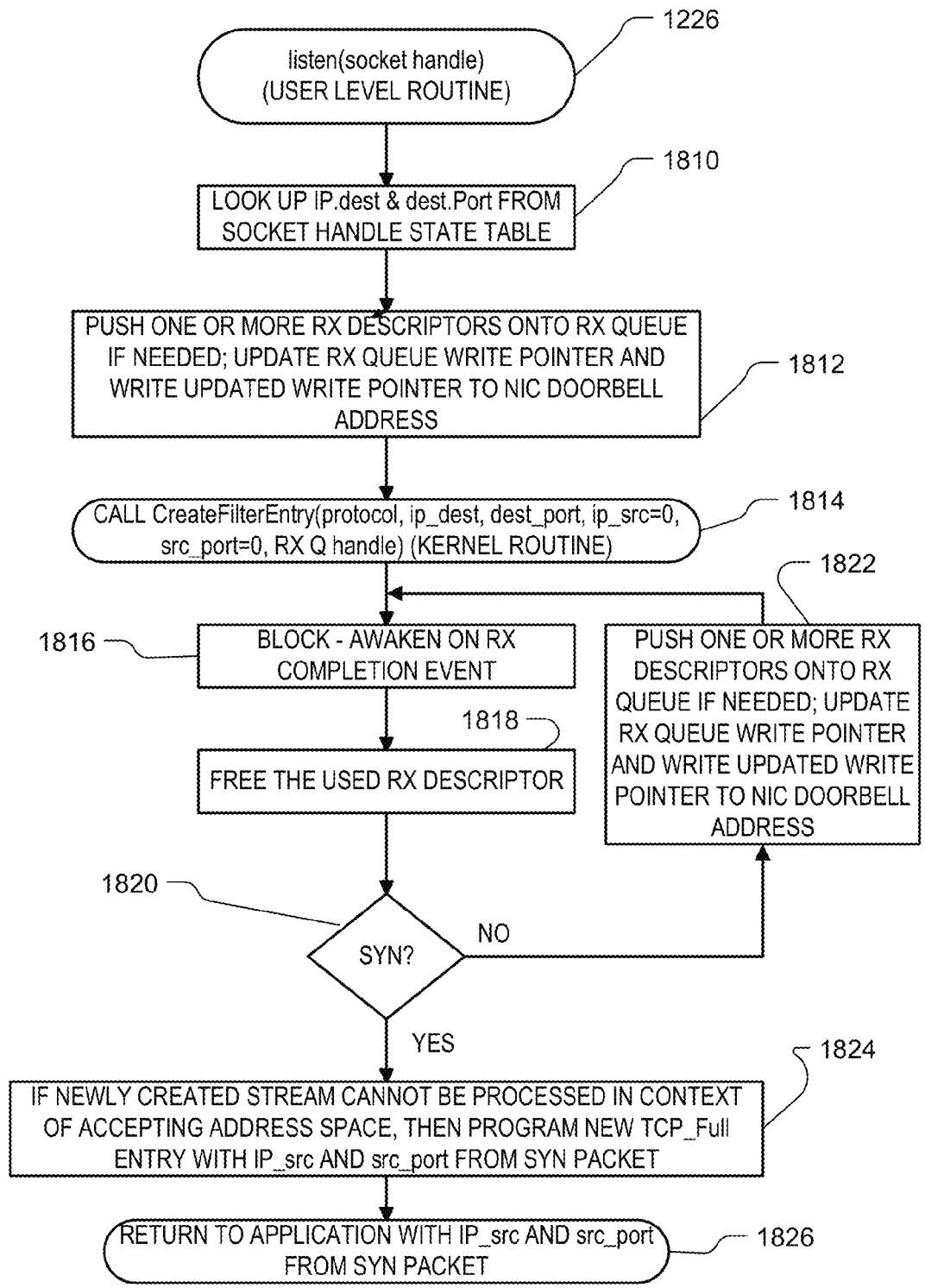
FIG. 18 is a flowchart of pertinent steps of the user level listen( ) routine called in step FIG. 12.

FIG. 18 is a flowchart of pertinent steps of the user level listen( ) routine called in step 1226 (FIG. 12). This routine is called with only the socket handle, since the source IP address and port from which a SYN packet might arrive are not yet known. In step 1810, the listen( ) routine obtains the destination IP address and port from the user level driver's records associated with the specified socket handle. In step 1812, the routine pushes one or more RX descriptors onto the RX queue if needed, anticipating the receipt of a TCP connection request packet (SYN packet). It then updates the RX queue write pointer and writes the updated write pointer to the NIC doorbell address previously assigned. In step 1814, the routine invokes the kernel routine to create a new filter entry, specifying the TCP protocol, the destination IP address and port number, and the handle previously assigned for the desired destination receive queue. The routine sets the ip_src and src_port arguments to 0. In step 1816, the routine blocks, and awakens on the receipt of a receive completion event. When one is received, in step 1818 the routine frees the receive buffer corresponding to the RX descriptor just used, and in step 1820 it is determined whether the received packet is in fact a SYN. If not, then the packet is dropped and in step 1822 another RX descriptor is pushed onto the RX queue if needed (similarly to step 1812). The routine then loops back again to block in anticipation of the next RX completion event (step 1816). If the received packet was in fact a SYN, and the newly created stream cannot be processed in the context of the accepting application address space, then in step 1824 the routine programs a new TCP_full entry with the IP source address and port from the SYN packet. In step 1826 the routine exits and returns to the application with the source IP address and port from the SYN packet, the new TCP connection having been established.

The user level accept( ) routine is in pertinent part the same as the listen( ) routine of FIG. 18, except that the routine will more likely program the new TCP_full entry into the filter table because the application is more likely to follow up with a fork( ) into a new address space.

Note that the User Level Transport Library routines that invoke the kernel to set up a new filter, also maintain a local copy of the filters that they already had set up. In this way they can avoid the context switch to the kernel to duplicate work that has already been performed.

Figure 19:
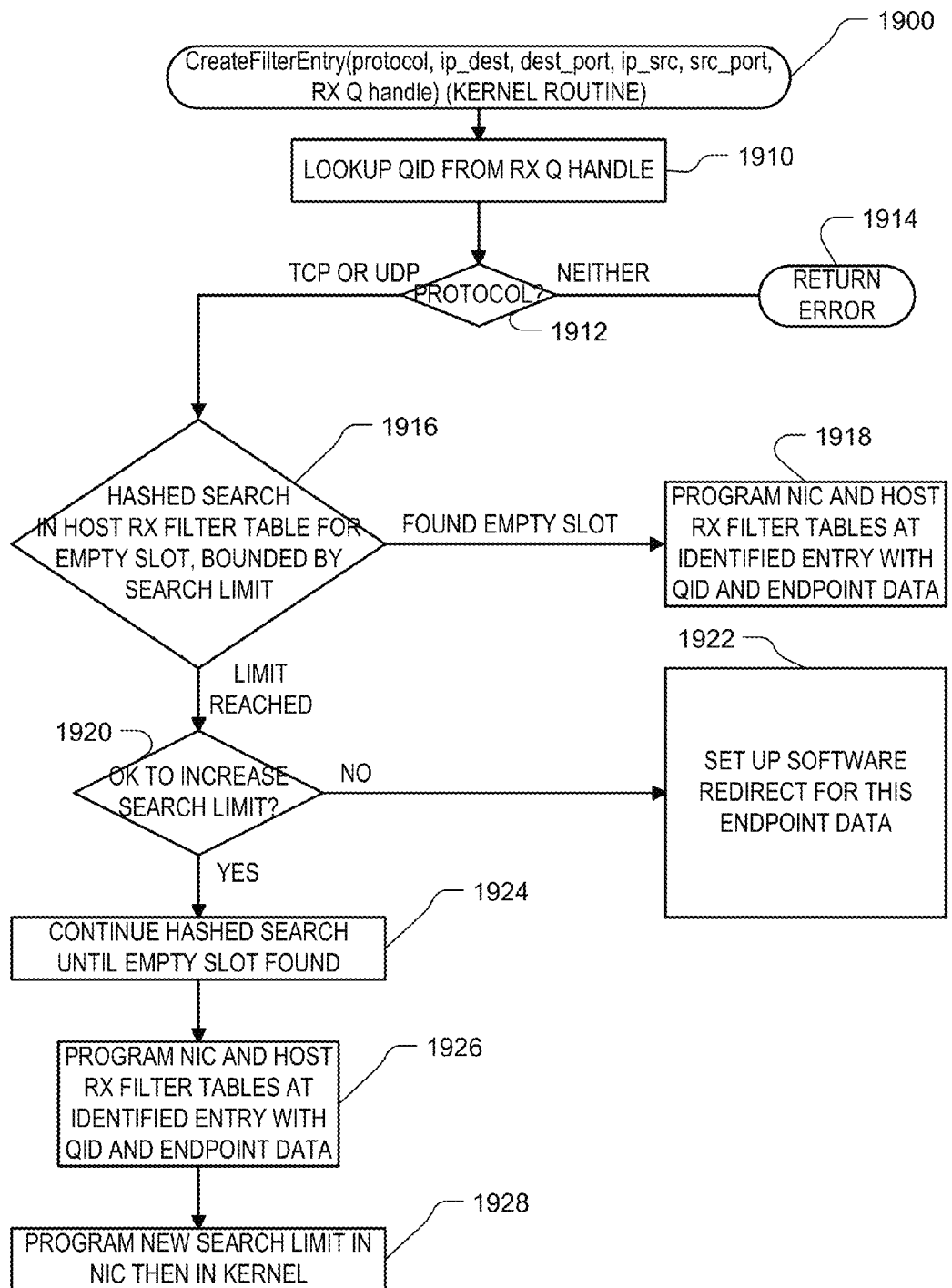
FIG. 19 is a flowchart of pertinent steps of the kernel routinely for creating a new filter table entry.

FIG. 19 is a flowchart of pertinent steps of the kernel routine for creating a new filter table entry. This routine is invoked at the request of the user level transport library during a listen( ) accept( ) recvfrom( ) or connect( ) call, or it can also be invoked by the kernel itself. When called, the routine of FIG. 19 is provided with the protocol name or number, the source and destination IP address and ports for matching with incoming data packets, and the handle for the receive queue as it was provided to by the kernel during a resource allocation step 1312. In step 1910, the routine looks up the queue ID from the receive queue handle. The queue ID is the index into the receive queue descriptor table 540 (FIG. 5). In step 1912, the routine determines whether the protocol for which the filter entry is to be placed, is either a TCP or a UDP protocol. If it is neither, then in step 1914, the routine returns with an error because the filter table in the present embodiment does not support any other protocols. Incoming data packets using a different protocol will automatically default to a kernel queue for handling or delivery to the proper user level queue.

If the protocol is TCP or UDP, then in step 1916, the routine performs a hashed search in the host receive filter table for an empty slot. For UDP filters, a search of the UDP_wildcard entries is performed if the ip_src and src_port arguments are null. If either the ip_src or src_port argument contains a value, then a search of the UDP_full entries is performed. Alternatively, the API can include a separate parameter to indicate whether a full or wildcard search should be performed. For TCP filters, a search of the TCP_wildcard entries is performed if the ip_src and src_port arguments are null. If either the ip_src or src_port argument contains a value, then a search of the TCP_full entries is performed. In each case, the search is bounded by the appropriate search limit for the TCP_full, TCP_wildcard, UDP_full or UDP_wildcard protocol as programmed in step 1114 (FIG. 11). The search algorithm itself is described in detail with respect to FIGS. 22-26, and is the same as that used by the NIC against the NIC copy of the filter table upon receipt of a packet from the network.

In step 1918, if an empty slot was found before the appropriate search limit was reached, then the routine programs both the NIC and the host receive filter tables at the identified entry with the queue ID and the endpoint data as provided in step 1900. The kernel routine then returns to the caller in the user level transport library.

If the search limit was reached before an empty slot was found, then the routine makes a decision whether to increase the search limit for the particular kind of entry (step 1920). If not, then in step 1922 the routine simply sets up a software redirect for this set of endpoint data. The redirect is a data structure that the kernel driver consults on receipt of every packet to see whether the packet should be delivered to the kernel stack or a user transport managed endpoint. In one embodiment it is a separate table of filter entries, structured similarly to the host receive filter table.

If the routine does decide to increase the search limit, then in step 1924, the routine simply continues the hashed search of step 1916 until an empty slot is found. When one is found, then in step 1926, the routine programs the NIC and host receive filter tables at the identified entry with the queue ID and endpoint data from step 1900. Then in step 1928, the routine programs the new search limit for the particular type of entry, into the NIC and then in the kernel. It will be appreciated that steps 1920 and 1924 may be reversed in sequence or combined, so that the number of additional hops required to find an available entry can be taken into account in the decision of whether to increase the search limit.

Figure 20:
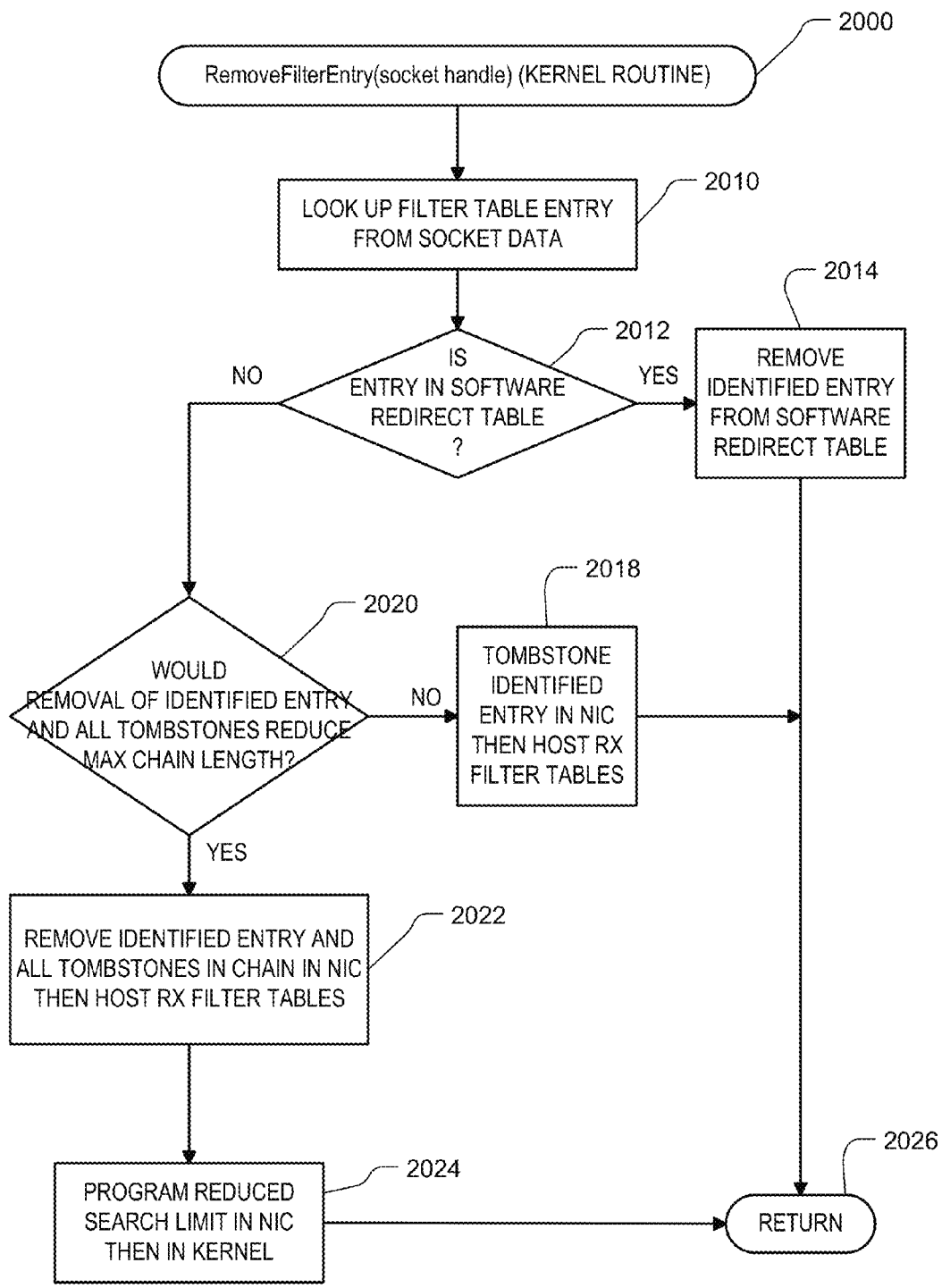
FIG. 20 is a flowchart of pertinent steps of a routine in the user level driver called for removing a filter entry.

In the close( ) function of the user level driver, called both at steps 1220 and 1232 of FIG. 12, one of the functions that must be performed is the removal of the socket's entries from the IP filter table. The routine in the user level driver accomplishes this by making a request to the RemoveFilterEntry( ) routine 2000 of the kernel, illustrated in FIG. 20. In step 2010, the routine looks up the filter table entry from the data associated with the socket handle specified. In step 2012, the routine determines whether the entry is located in the software redirect table or in the host filter table. If it is in the software redirect table, then in step 2014, the routine removes the entry from the software redirect table and returns (step 2026). If the entry is in the host filter table, when the entry is identified in step 2014, then in one embodiment, the routine can simply remove the identified entry in both the NIC receive filter table and the host receive filter table (in that order) (step 2018). As mentioned, removal involves simply writing a tombstone value into the entry, for example all zeros. However, it would be useful at this time to also perform certain garbage collection functions in order to keep the search chain lengths reasonable. These garbage collection functions can be performed at other times in the same or different embodiments, but the present embodiment conveniently performs them at least whenever a filter entry is to be removed. Accordingly, before the step of tombstoning the identified entry (step 2018), the routine first determines in step 2020 whether removal of the identified entry, and all tombstones previously written in the present chain, would reduce the overall maximum chain length. If not, then only the single entry removal is effected (step 2018). Garbage collection is typically an expensive process, so step 2020 limits the number of times that garbage collection is performed to only those times when a significant performance improvement can be achieved, such as through a reduction in the overall maximum chain length. Hysteresis can be applied here to avoid flapping, and a weight can be applied so that the chain length is reduced more aggressively if it has become longer than the maximum allowed for full line rate performance.

If the maximum chain length would be reduced, then in step 2022, the routine removes the identified entry from the table, as well as all tombstones in the table (or only those in the chain, if the chain is very long compared to others in the table), reprogramming the table to bring up into the previously tombstone the locations, entries and that were previously farther down in the search chain. Finally, in step 2024, the routine programs the new (smaller) search limit for the particular kind of entry into the NIC 216 and then makes it effective in the kernel as well. In an embodiment, the routine may skip step 2024 in the event that the new search limit would be smaller than some predetermined minimum chain length for the particular kind of entry. Many other optimizations will be apparent.

Figure 21:
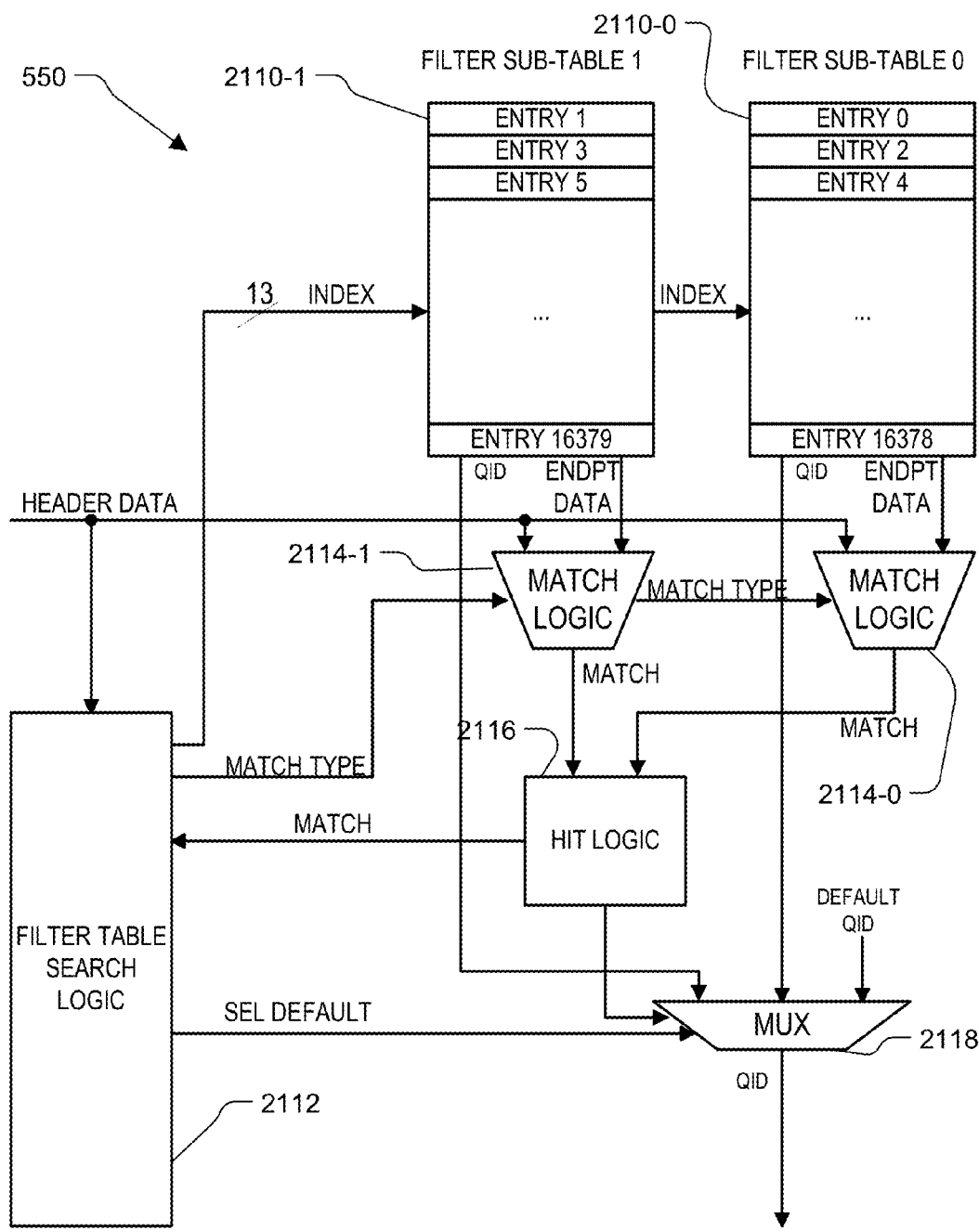
FIG. 21 is a detail of the filter table and logic unit of FIG. 5.

As mentioned, when packets arrive, the filter table and logic unit 550 (FIG. 5) first determines the queue ID of the receive queue into which the packet should be delivered. FIG. 21 is a detail of the filter table and logic unit 550. The filter table itself is implemented as two sub-tables 2110-0 and 2110-1 (collectively 2110). The software is unaware of this implementation detail, and instead sees only a single table. The hardware in the NIC 216 decodes the write address from the kernel driver software and places even numbered entries in filter sub-table 2110-0 and odd numbered entries in filter sub-table 2110-1. Thus filter sub-table 2110-0 contains entries 0, 2, 4, 6 and so on, whereas filter sub-table 2110-1 contains entries 1, 3, 5 and so on. The implementation of the filter table as two sub-tables enables parallel entry lookup per cycle to reduce the total lookup time. It will be appreciated that other implementations can use a single sub-table, or more than two sub-tables.

Both of the filter sub-tables 2110-0 and 2110-1 are addressed by a 13-bit index provided by filter table search logic 2112. A 13-bit index can address up to 8192 entries, which for two sub-tables, comes to 16,384 entries numbered 0 through 16,383. Four index values are reserved for the kernel NET driver queues, so only 16,380 entries are represented in the table. The filter table search logic 2112 is described hereinafter, but basically, it receives the header data of the incoming data packet and uses it to derive a hash key, then uses the hash key to derive a hash code which is the first 13-bit index to be searched in the filter table 2110. The filter table search logic also calculates subsequent entries to search if the first entry in neither of the two filter sub-tables matches that of the incoming header data, and also forces the selection of a default kernel queue for delivery of the current data packet if the search limit is reached before a match is found. The filter table search logic also determines a match type (TCP_full, TCP_wildcard, UDP_full or UDP_wildcard) in dependence upon the header data and the state of the search algorithm.

The various formats for an entry in the filter table 2110 are set forth in the table above. As shown in FIG. 21, the endpoint data from the selected entry of filter sub-table 2110-0 is provided to one input of match logic 2114-0, and the endpoint data from the selected entry of filter sub-table 2110-1 is provided to the corresponding input of match logic 2114-1. The other input of each of the match logic units 2114-0 and 2114-1 (collectively 2114) receives the header data of the incoming data packet. The match type is provided from the filter table search logic 2112 to both match logic units, each of which then outputs a "match" signal to a hit logic unit 2116. If the match type is TCP_full, then match logic units 2114-0 at 2114-1 will indicate a match only if the incoming packet type is TCP and all four fields of endpoint data match the corresponding fields of the incoming header data. If the match type is TCP_wildcard, then the match logic units 2114 will indicate a match if the incoming packet type is TCP and bits 95:48 of the endpoint data in the table contains the same destination IP address and destination port as the incoming header data. The source IP address and source port as indicated in the header data are ignored. If the match type is UDP_full, then match logic units 2114-0 at 2114-1 will indicate a match only if the incoming packet type is UDP and all four fields of endpoint data match the corresponding fields of the incoming header data. If the match type is UDP_wildcard, then match logic units 2114 will indicate a match if the incoming packet type is UDP and bits 95:64 of the filter endpoint data contain the same destination IP address, and bits 15:0 of the endpoint data contain the same destination port number, as indicated in the header data of the incoming packet.

If either match logic unit 2114-0 or 2114-1 indicates a match, then hit logic 2116 so notifies the filter table search logic 2112. The Q_ID fields of the currently selected entries in both filter sub-tables are provided to two of three inputs of a multiplexer 2118, and hit logic 2116 provides a select input so that the multiplexer 2118 will select the queue ID from the currently selected entry of the correct filter sub-table 2110-0 or 2110-1. As mentioned, if no matching entry has been found after the search limit has been reached, then the filter table search logic 2112 provides a signal to the multiplexer 2118 to select to the default queue ID provided on a third input of the multiplexer 2118. The default queue ID in one embodiment is queue 0, which is defined to be a kernel queue. In other embodiments the default queue ID can be programmable. In any event, whether or not a match has been found, the multiplexer 2118 outputs the queue ID indicating the particular receive queue to which the NIC 216 should deliver the incoming data packet.

Note that in a multiple CPU system, there can be multiple kernel queues. In such a system it is advantageous to distribute failed-search traffic as evenly as possible among the different kernel queues so as not to overload any particular one of them. It is also desirable that all failed-search traffic involving a particular connection always be delivered to a single one of the kernel queues. In order to accomplish both of these goals, the low order bit or bits of the initial hash key code already calculated is used to select the default kernel queue for delivery of failed-search packets. In particular, the kernel driver 325 first programs a register in the NIC 216 (not shown) to indicate the number of kernel queues in use. If a search fails, the NIC 216 then uses the low order 1 or 2 bits (depending on whether there are 2 or 4 processors) of the initial hash code in order to select the particular CPU whose kernel queue will receive the incoming data packet. Other methods may be used instead to select the kernel queue to which a failed-search packet will be delivered. As one alternative, a different hash function can be used, different from the one described herein for searching the filter table. For example, the Toeplitz hash function described in Microsoft, Scalable Networking with RSS, Win HEC 2005 Update (Apr. 19, 2005), incorporated by reference herein, can be used.

If a data packet has arrived without an IP header, or containing a mal-formed IP header, (such as with an IP header checksum error), then the NIC 216 delivers this packet to an overall default kernel queue, which is queue 0.

Figure 22:
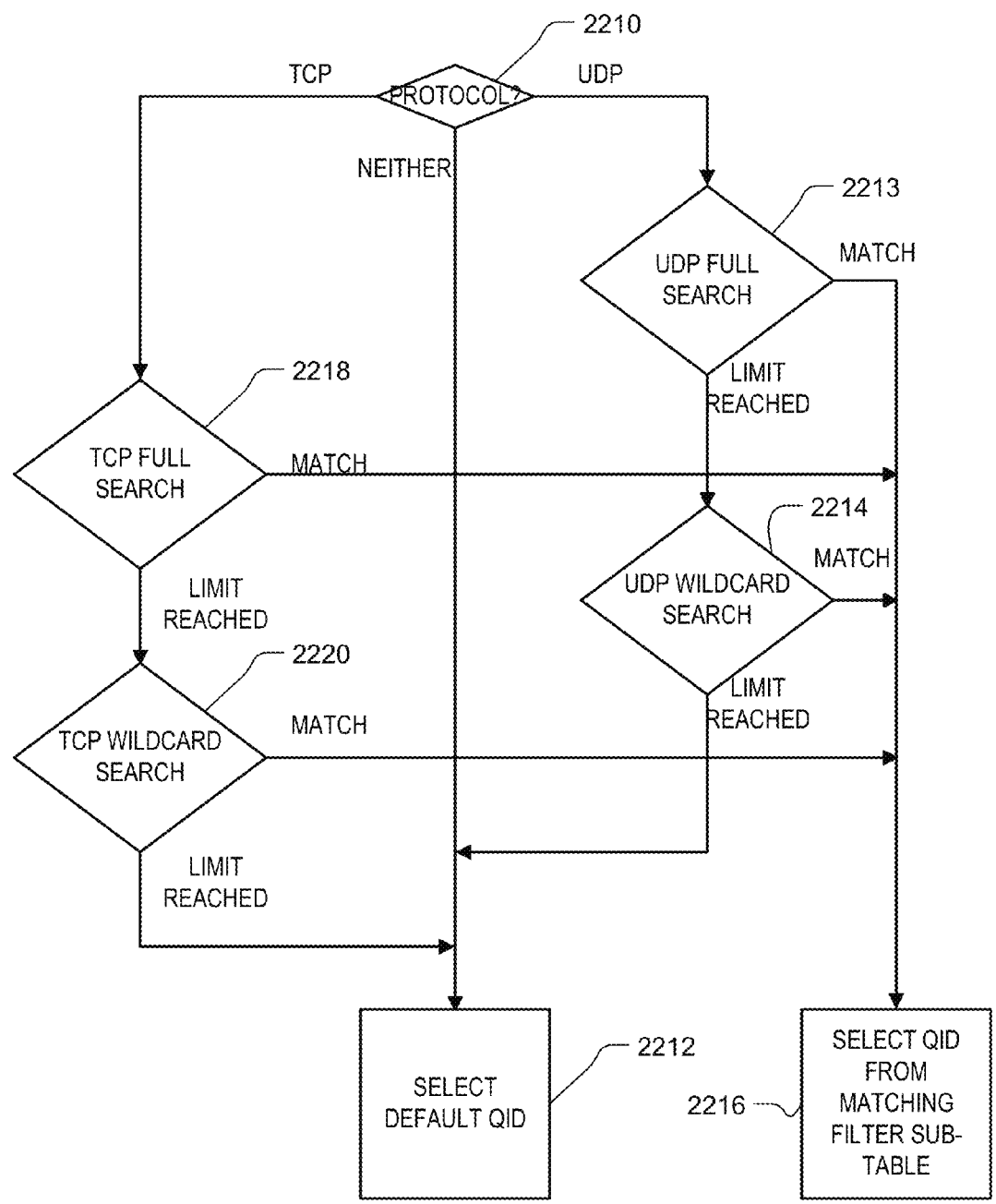
FIG. 22 is a flow chart illustrating the overall functions performed by filter table search logic of FIG. 21 in order to search for a match.

FIG. 22 is a flow chart illustrating the overall functions performed by filter table search logic 2112 in order to conduct a hashed search for a match. These functions can be implemented in software or firmware for and embedded processor, or can be controlled by a finite state machine, or can be implemented in another way all as known in the art or yet to be developed. In step 2210, the logic first determines from the protocol ID field in the header of the incoming data packet, which transport protocol is being used. Only TCP and UDP packets are filtered using the filter table, so if the transport protocol ID field indicates a different transport protocol, then in step 2212, the search logic immediately terminates the search and causes the multiplexer 2118 to select the default queue ID. It will then be up to the kernel to handle the particular incoming packet, including determining whether it needs to be forwarded to one of the user level transport libraries 324.

If the protocol of the incoming data packet is TCP, then in step 2218, the filter table search logic 2112 performs a hashed TCP_full search as described in more detail hereinafter. If this search finds a match before the TCP_full search limit is reached, then in step 2216, the filter table search logic 2112 cause the multiplexer 2118 to select the queue ID from the matching filter sub-table 2110-0 or 2110-1. If the TCP_full search limit is reached before a match is found in step 2218, then in step 2220, a TCP_wildcard search is performed. By performing a TCP_full search before a TCP_wildcard search, the more specific filter is given precedence over the more general filter. If the TCP_wildcard search finds a match before the TCP_wildcard search limit is reached, then in step 2216, the filter table search logic 2112 causes the multiplexer 2118 to select the queue ID from the matching filter sub-table 2110-0 or 2110-1. Otherwise, in step 2212 the filter table search logic 2112 causes the multiplexer 2118 to select the default queue ID.

If the protocol of the incoming data packet is UDP, then in step 2213, the filter table search logic 2112 performs a hashed UDP_full search as described in more detail hereinafter. If this search finds a match before the UDP_full search limit is reached, then in step 2216, the filter table search logic 2112 cause the multiplexer 2118 to select the queue ID from the matching filter sub-table 2110-0 or 2110-1. If the UDP_full search limit is reached before a match is found in step 2213, then in step 2214, a UDP_wildcard search is performed. If the UDP_wildcard search finds a match before the UDP_wildcard search limit is reached, then in step 2216, the filter table search logic 2112 causes the multiplexer 2118 to select the queue ID from the matching filter sub-table 2110-0 or 2110-1. Otherwise, in step 2212 the filter table search logic 2112 causes the multiplexer 2118 to select the default queue ID.

As with all flow charts herein, it will be appreciated that many of the steps in the flow chart of FIG. 22 can be combined, performed in parallel or performed in a different sequence without affecting the functions achieved.

Figure 23:
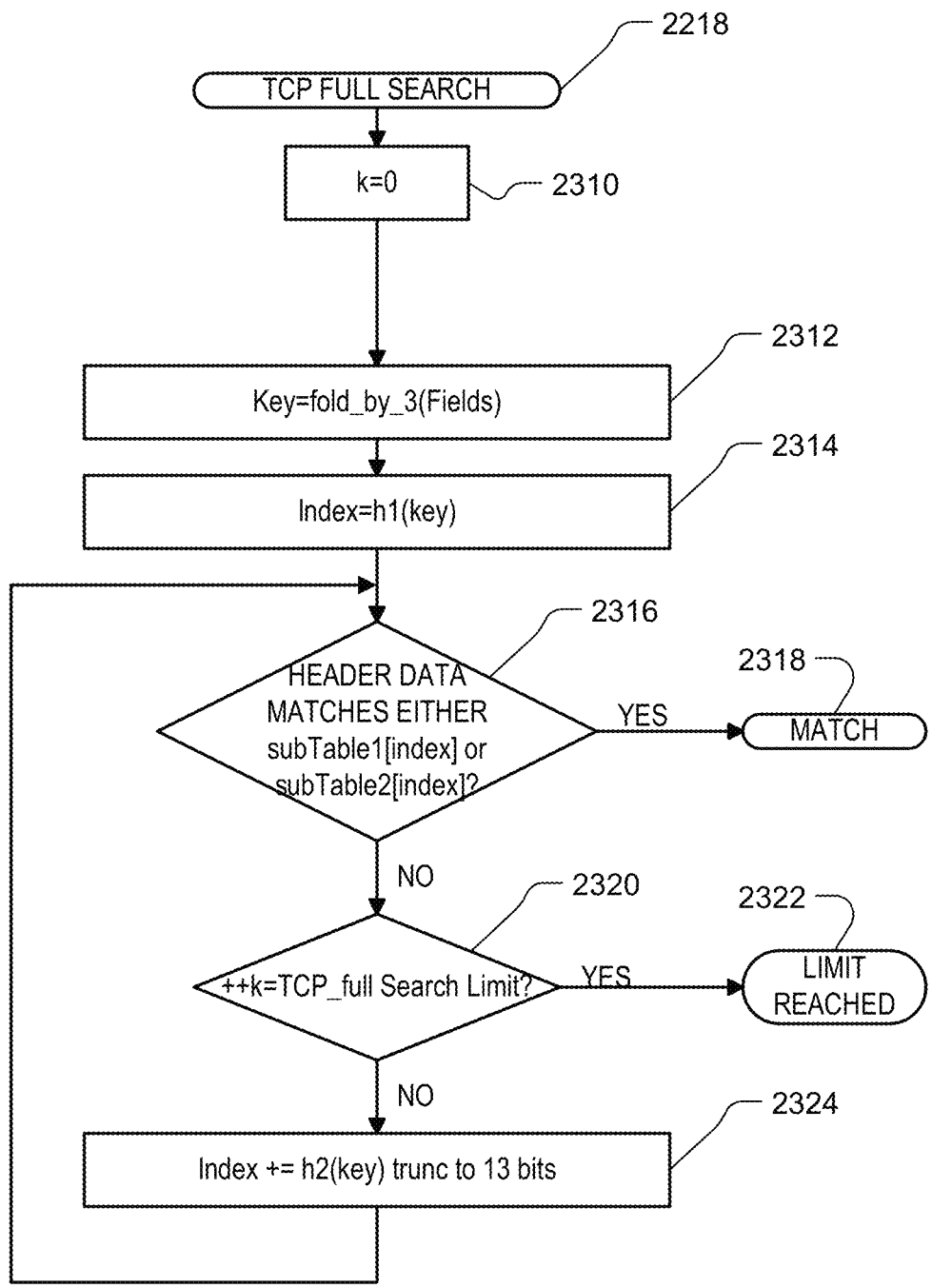
FIG. 23 is a flow chart detail of the step in FIG. 22 of performing a TCP_full search.

FIG. 23 is a flow chart detail of the step 2218 of performing a TCP_full search (FIG. 22). Initially, in a step 2310, an iteration count k is set to 0. The initial hash code is then calculated by first determining a hash key, and then passing the key through a first hash function h1(key). In particular, in step 2312, the hash key is determined by a fold_by_3 function performed on the destination IP address, the destination port number, the source IP address and the source port number, respectively, of the incoming data packet, as follows:

key=destIP[31:0]XOR{destPORT[15:0],srcIP[31:16]} XOR{srcIP[15:0],srcPORT[15:0]}

In step 2314, the key is passed through the first hash function h1(key) to determine the initial hash code which is then to be used as an index into the filter table 2110 as previously described. The first hash function is implemented through a linear feedback shifting register (LFSR) sequence with characteristic polynomial X^16+X^3+1 on the 32 bit key. This value is taken modulo 2^3 (by taking only the low order 13 bits of the LFSR output) to form the hash code. This function randomizes the key sufficiently so that even packets sharing the same IP address or port number are not likely to be mapped into the same initial code. The modulus 2^13 is the number of entries that can be held in one of the filter sub-tables 2110, so the truncation to only the low order 13 bits effectively keeps the hash code within the total index range of the table. In an implementation, the hash function can be performed in a single cycle by flattening the serial shift register into parallel XOR functions of the 32 bit key. Other first hash functions can be used instead of this one, but this one is preferred.

Now that the initial index has been calculated in step 2314, in step 2316 the match logic units 2114 and hit logic unit 2116 indicate to the filter table search logic 2112 whether the header data matches either the endpoint data in the currently selected entry of filter sub-table 2110-0 or that of the currently selected entry of filter sub-table 2110-1. The filter table search logic 2112 indicates TCP_full as the match type provided to match logic units 2114-1 and 2114-0. If the current entry of one of the two filter sub-tables matches, then a match has been found (step 2318) and the filter table search logic 2112 cause the multiplexer 2118 to select the appropriate queue ID (step 2216, FIG. 22). If not, then in step 2320, the filter table search logic increments the iteration count k and determines whether the TCP_full search limit has been reached. If so, then the routine exits (step 2322) such that a TCP_wildcard search can be performed (step 2220 in FIG. 22). If the search limit has not been reached, then in step 2324, the index is incremented by a second hash function h2 of the key and truncated again to 13 bits. The second hash function need not be as expensive as the first, but it is advantageously a function of the key in order to provide sufficient randomness to minimize overlapping hop sequences for different incoming header data. In an embodiment, the second hash function is simply $$h2(key)=13 \text{ LSB of } (key*2-1).$$

Combining the two has functions, it can be seen that the filter table index for the k'th search is given by $$index(k)=(h1(key)+k*h2(key)) \mod 2^{13}.$$

If the filter table 2110 had not been divided into sub-tables, then the modulus would be 2^14 instead of 2^13. In general, if the overall filter table can hold N entries, and they are divided into P parallel tables (where P is an integer greater than or equal to 1), then the modulus would be M=N/P. Note that while the embodiment described herein maintains a current value for k, it uses this value only for determining when the search limit is reached. The different index values are maintained and calculated separately, without using the current value of k. Another embodiment could instead use the current value of k to calculate each index value, for example by using the combined mathematical function above for index(k).

Once the next index has been calculated in step 2324, the TCP_full search logic returns to step 2316 to determine whether the header data matches the endpoint data in either filter table entry now pointed to by the new index. Eventually either a match will be found (step 2318) or the TCP_full search limit will be reached (2322) and the TCP_full search step 2218 will terminate.

Figure 24:
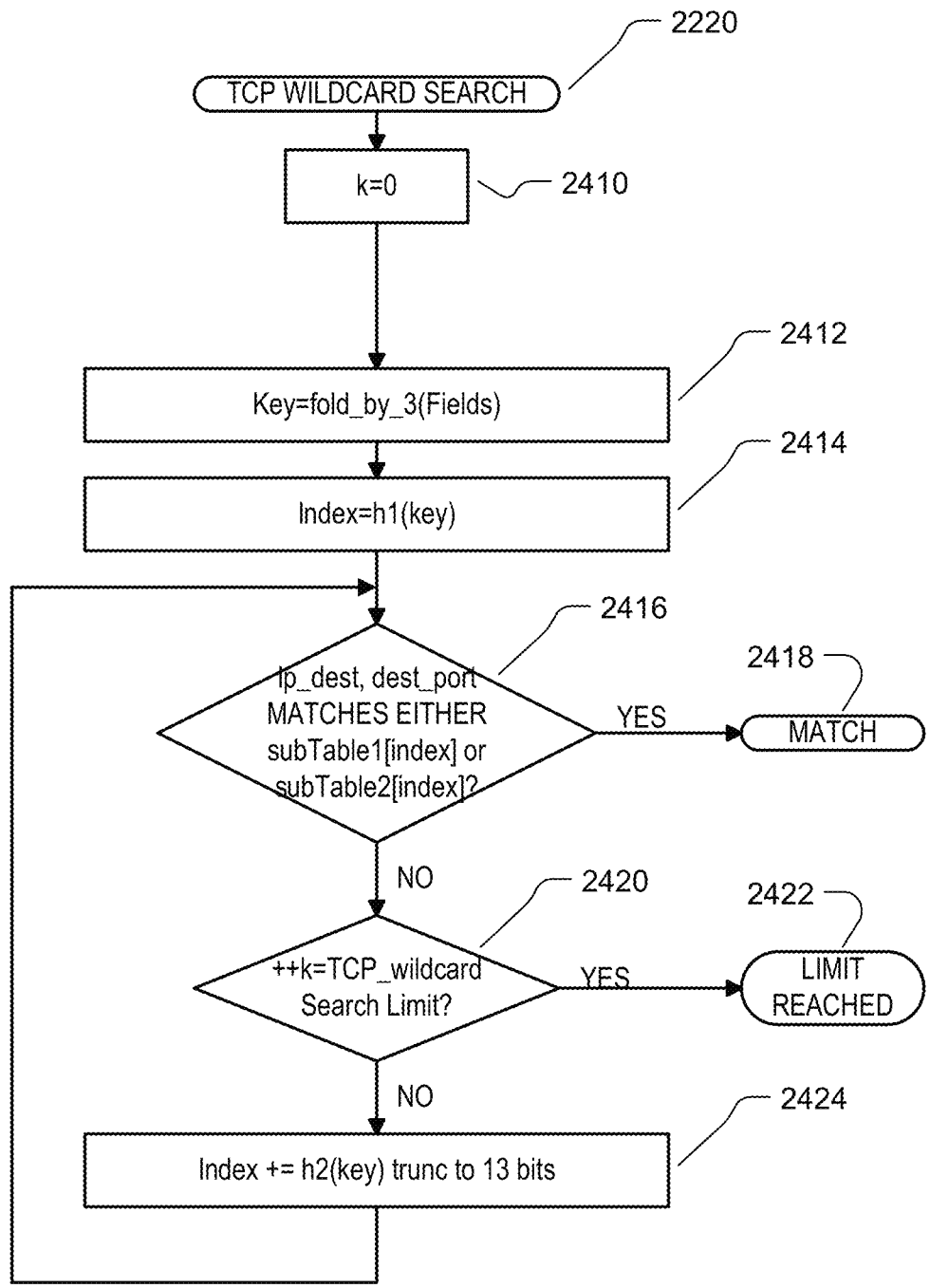
FIG. 24 is a flow chart detail of the step in FIG. 22 of performing a TCP_wildcard search.

FIG. 24 is a flow chart detail of the step 2220 of performing a TCP_wildcard search (FIG. 22). It is very similar to the TCP_full search of FIG. 23, except that the fold-by-three function operates on different parts of the header, the match type is TCP_wildcard instead of TCP_full, and the TCP_wildcard search limit is different and the TCP_full search limit. In particular, in a step 2410, an iteration count k is initialized to 0. In step 2412, the hash key is determined by the following fold_by_3 function performed on the destination IP address and port number:

key=destIP[31:0]XOR{destPORT[15:0], 16'h0000}XOR32'h0

In step 2414, the key is passed through the first hash function h1(key) to determine the initial hash code which is then to be used as an index into the filter table 2110 as previously described. The same first hash function is used as is set forth above for the TCP_full search, although in another embodiment a different first hash function might be used.

The initial index is applied to the filter sub-tables 2110, and in step 2416 the match logic units 2114 and hit logic unit 2116 indicate to the filter table search logic 2112 whether the header data matches either the endpoint data in the currently selected entry of filter sub-table 2110-0 or that of the currently selected entry of filter sub-table 2110-1. The filter table search logic 2112 indicates TCP_wildcard as the match type provided to match logic units 2114 and 2114. If the current entry of one of the two filter sub-tables matches, then a match has been found (step 2418) and the filter table search logic 2112 cause the multiplexer 2118 to select the appropriate queue ID (step 2216, FIG. 22). If not, then in step 2420, the filter table search logic increments the iteration count k and determines whether the TCP_wildcard search limit has been reached. If so, then the routine exits (step 2422) such that the default queue ID can be selected (step 2212 of FIG. 22). If the search limit has not been reached, then in step 2424, the index is incremented by the second hash function h2 of the key and truncated again to 13 bits. The second hash function is again the same as for the TCP_full search, but it need not be in a different embodiment. Once the next index has been calculated, the TCP_wildcard search logic returns to step 2416 to determine whether the header data matches the endpoint data in either filter table entry now pointed to by the new index. Eventually either a match will be found (step 2418) or the TCP_wildcard search limit will be reached (2422) and the TCP_wildcard search step 2220 will terminate.

Figure 25:
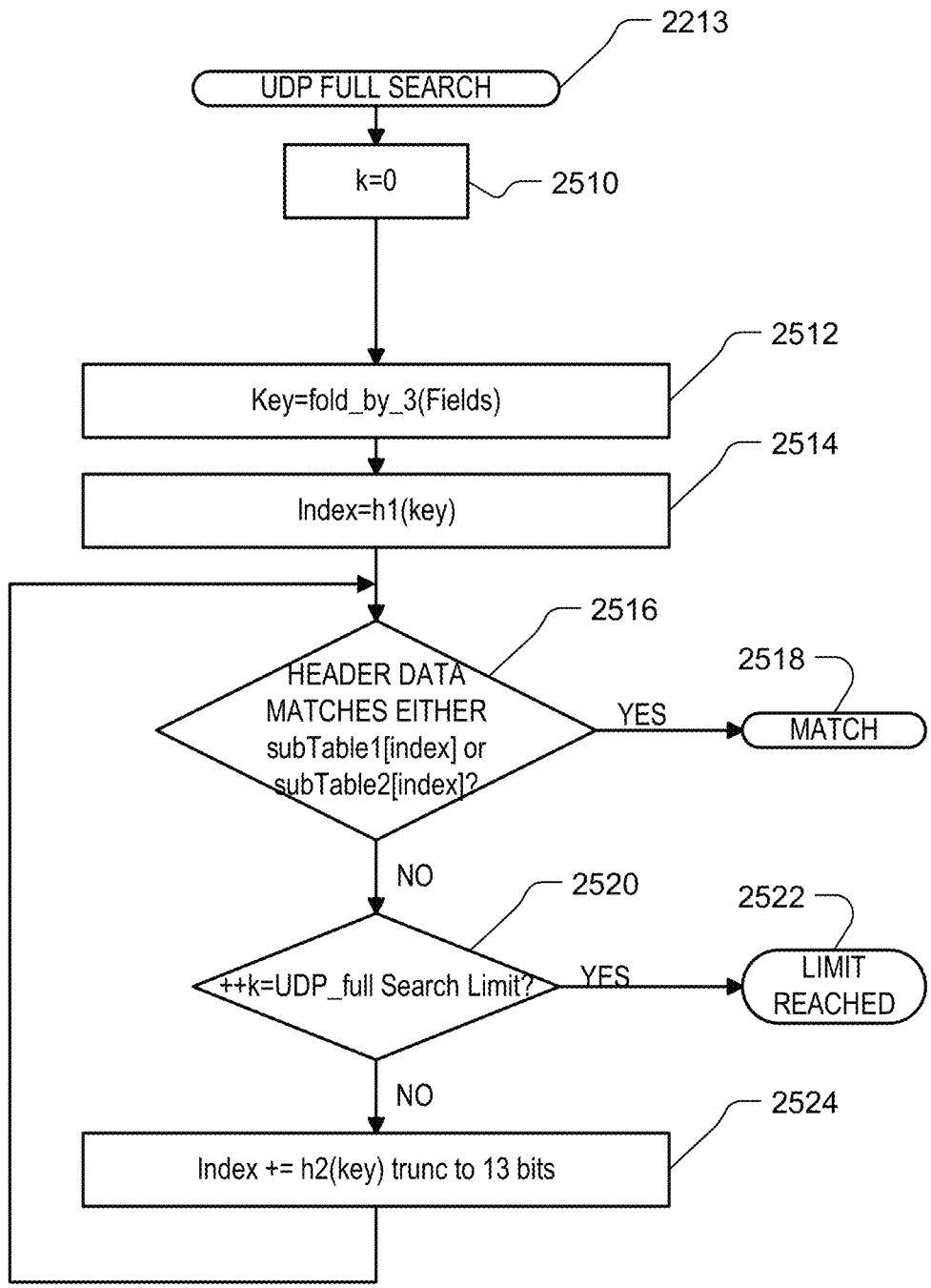
FIG. 25 is a flow chart detail of the step in FIG. 22 of performing a UDP_full search.

FIG. 25 is a flow chart detail of the step 2213 of performing the UDP_full search (FIG. 22). Again it is very similar to the TCP_full search of FIG. 23, except that the fold-by-three function operates on different bits of the header, the match type is UDP_full, and the UDP_full search limit is different. In particular, in a step 2510, the iteration count k is initialized to 0. In step 2512, the hash key is determined by the following fold_by_3 function performed on the destination IP address and port number:

key={destIP[31:1],~destIP[0]}XOR{destPORT[15:0],srcIP[31:16]}XOR{srcIP[15:0],srcPORT[15:0]}

In step 2514, the key is passed through the first hash function h1(key) to determine the initial hash code which is then to be used as an index into the filter table 2110 as previously described. The same first hash function is used as is set forth above for the TCP_full and TCP_wildcard searches, although again, in another embodiment, a different first hash function might be used for UDP_full searches.

The initial index is applied to the filter sub-tables 2110, and in step 2516 the match logic units 2114 and hit logic unit 2116 indicate to the filter table search logic 2112 whether the header data matches either the endpoint data in the currently selected entry of filter sub-table 2110-0 or that of the currently selected entry of filter sub-table 2110-1. The filter table search logic 2112 indicates UDP_full as the match type provided to match logic units 2114 and 2114. If the current entry of one of the two filter sub-tables matches, then a match has been found (step 2518) and the filter table search logic 2112 cause the multiplexer 2118 to select the appropriate queue ID (step 2216, FIG. 22). If not, then in step 2520, the filter table search logic increments the iteration count k and determines whether the UDP_full search limit has been reached. If so, then the routine exits (step 2522) such that the default queue ID can be selected (step 2212 of FIG. 22). If the search limit has not been reached, then in step 2524, the index is incremented by the second hash function h2 of the key and truncated again to 13 bits. The second hash function is again the same as for the TCP_full and TCP_wildcard searches, but it need not be in a different embodiment. Once the next index has been calculated, the UDP_full search logic returns to step 2516 to determine whether the header data matches the endpoint data in either filter table entry now pointed to by the new index. Eventually either a match will be found (step 2518) or the UDP_full search limit will be reached (2522) and the UDP_full search step 2214 will terminate.

Figure 26:
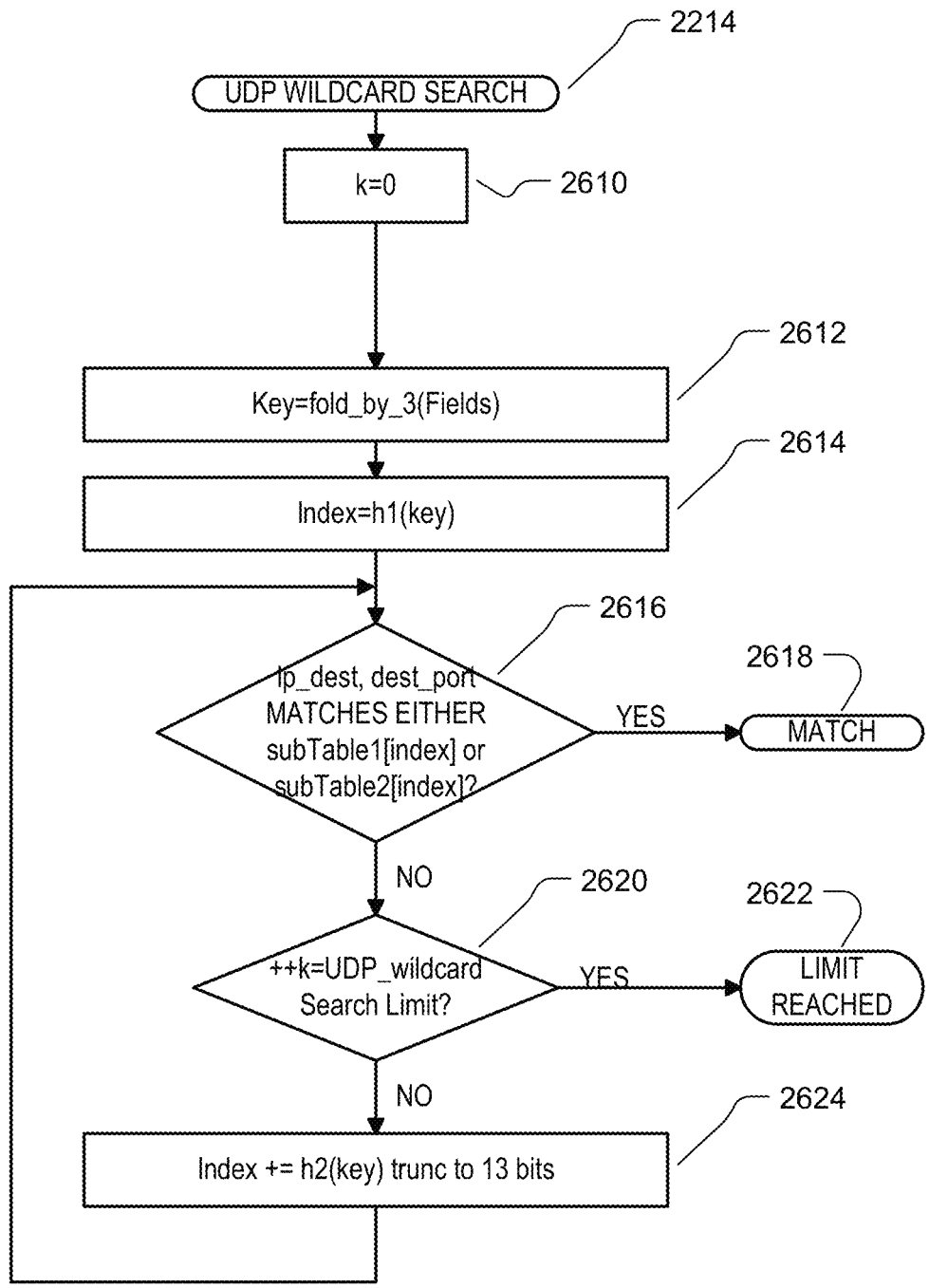
FIG. 26 is a flow chart detail of the step in FIG. 22 of performing a UDP_wildcard search.

FIG. 26 is a flow chart detail of the step 2214 of performing the UDP_wildcard search (FIG. 22). Again it is very similar to the TCP_full search of FIG. 23 and the TCP_wildcard search of FIG. 24, except that the fold-by-three function operates on different parts of the header, the match type is UDP_wildcard, and the UDP_wildcard search limit is different. In particular, in a step 2610, the iteration count k is initialized to 0. In step 2612, the hash key is determined by the following fold_by_3 function performed on the destination IP address and port number:

key=destIP[31:0]XOR32'h0XOR{16'h0,destPORT[15:0]}

It can be seen that in a compact hardware implementation of the search algorithm, all three fold-by-three functions can be performed with common XOR hardware by preceding it with a multiplexer to select to the XOR logic the particular fields of the incoming packet header data that are required for the particular search type.

In step 2614, the key is passed through the first hash function h1(key) to determine the initial hash code which is then to be used as an index into the filter table 2110 as previously described. The same first hash function is used as is set forth above for the TCP_full and TCP_wildcard searches, although again, in another embodiment, a different first hash function might be used for UDP_wildcard searches.

The initial index is applied to the filter sub-tables 2110, and in step 2616 the match logic units 2114 and hit logic unit 2116 indicate to the filter table search logic 2112 whether the header data matches either the endpoint data in the currently selected entry of filter sub-table 2110-0 or that of the currently selected entry of filter sub-table 2110-1. The filter table search logic 2112 indicates UDP_wildcard as the match type provided to match logic units 2114 and 2114. If the current entry of one of the two filter sub-tables matches, then a match has been found (step 2618) and the filter table search logic 2112 cause the multiplexer 2118 to select the appropriate queue ID (step 2216, FIG. 22). If not, then in step 2620, the filter table search logic increments the iteration count k and determines whether the UDP_wildcard search limit has been reached. If so, then the routine exits (step 2622) such that the default queue ID can be selected (step 2212 of FIG. 22). If the search limit has not been reached, then in step 2624, the index is incremented by the second hash function h2 of the key and truncated again to 13 bits. The second hash function is again the same as for the TCP_full and TCP_wildcard searches, but it need not be in a different embodiment. Once the next index has been calculated, the UDP_wildcard search logic returns to step 2616 to determine whether the header data matches the endpoint data in either filter table entry now pointed to by the new index. Eventually either a match will be found (step 2618) or the UDP_wildcard search limit will be reached (2622) and the UDP_wildcard search step 2214 will terminate.

Figure 27:
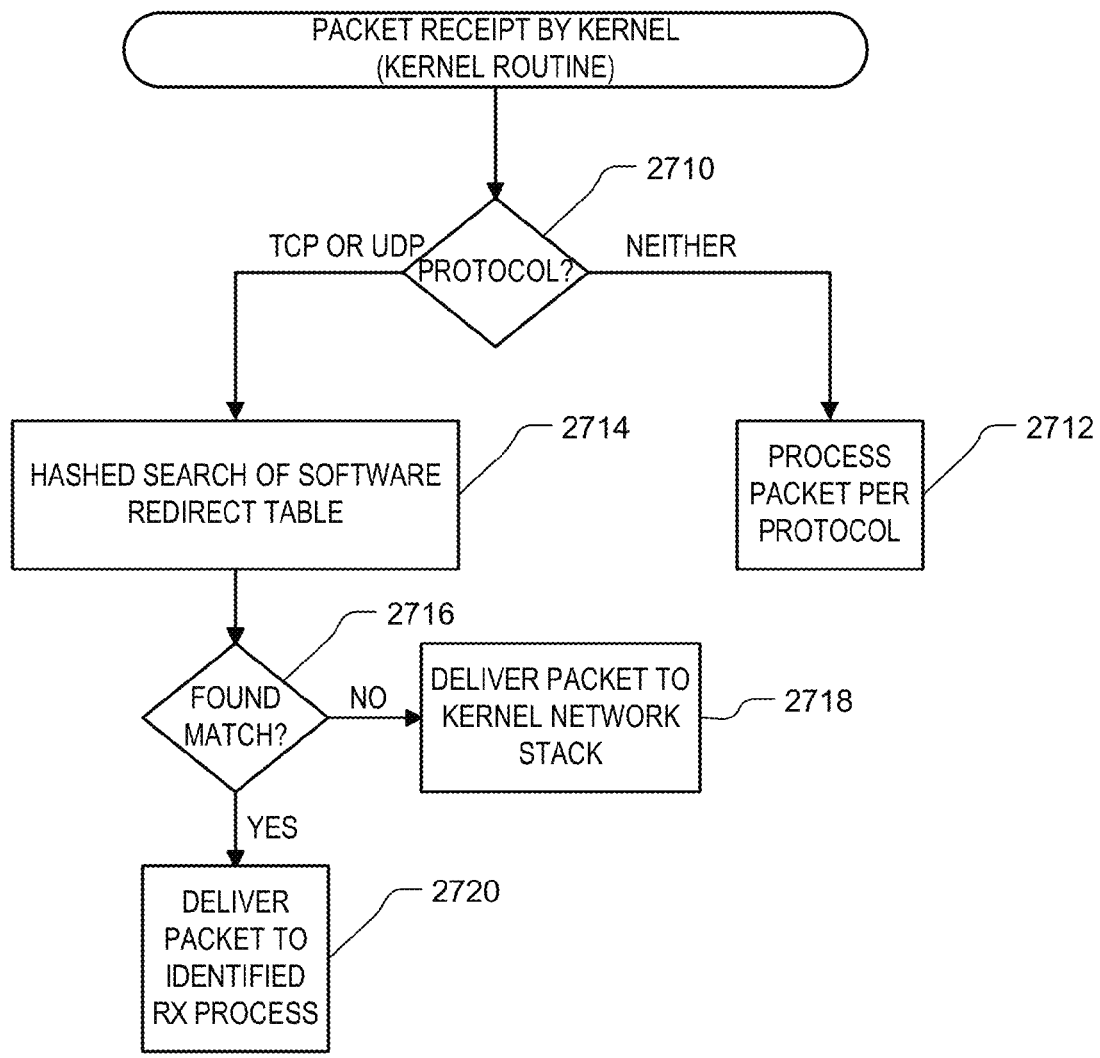
FIG. 27 is a flow chart showing pertinent steps that the kernel driver performs upon receipt of a data packet.

As previously mentioned, if the incoming data packet is mal-formed or uses a protocol that is not supported in the filter table 2110, or if it uses the supported protocol but a match was not found in the filter table 2110 before the appropriate search limit(s) was (were) reached, then the NIC 216 will deliver the incoming data packet to a receive queue of the kernel driver 325. FIG. 27 is a flow chart showing pertinent steps that the kernel driver performs upon receipt of such a data packet. Initially, in step 2710, the kernel routine determines whether the incoming data packet uses the TCP or UDP protocol. If not, then in step 2712, the kernel driver processes the packet in whatever manner is appropriate for the particular packet format. If the incoming data packet does use TCP or UDP, then in step 2714, the kernel driver 325 performs a hashed search, with no search limit imposed, of the software redirect table. In step 2716, if no match was found, then the kernel driver 325 simply delivers the packet to a normal kernel network stack (step 2718). If a match was found then in step 2720 the kernel driver 325 delivers the packet to the proper user level receive process. In order to avoid contention with the NIC 216 attempting to deliver its own data packets to receive queues in an application's transport library 324, the delivery of the packet from the kernel driver 325 to the user level transport library 324 occurs by some communication channel other than through the use of the receive queue. Typical standard operating system mechanisms can be used to notify the user level driver of the availability of this packet.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Additionally, as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. As an example, whereas in the embodiments described herein it is the header fields of an incoming packet which are compared to fields in the filter table to detect a matching filter table entry, in another embodiment other aspects of the content of the incoming packet can be compared instead. As another example, whereas the filter table in the NIC in the embodiments described herein have a tabular format, it will be appreciated that a table is only one possible format for what is more generally known as a database. Another embodiment might implement a filter database having a different structure that need not be tabular. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A method for use by a host computer system in dynamically reconfiguring a filter table in a network interface device, the filter table having a plurality of filter entries, the method comprising:
   receiving a request to close a specified network socket;
   identifying in the network interface device filter table a particular filter entry in a particular chain of filter entries, the particular filter entry containing data that corresponds to the specified socket;
   responsive to a determination that removing from the filter table data from a first set of filter entries including the particular filter entry would not reduce a maximum chain length of filter entries in the filter table, the module replacing the data in the particular filter entry in the filter table with a tombstone marker; and
   responsive to a determination that removing from the filter table data from a second set of filter entries including the particular filter entry would reduce the maximum chain length of filter entries in the filter table, performing a garbage collection of tombstoned filter entries;
   wherein the chain length of the particular chain of filter entries is the number of entries between a first filter entry of the particular chain and the last filter entry that contains data corresponding to an open socket, inclusive.

2. The method of claim 1, wherein receiving the request is performed by a module in the host computer system.

3. The method of claim 2, wherein the module in the host computer system receiving the request to close a specified network socket runs as a kernel level process of the host computer system, and the request is received from a user level process.

4. The method of claim 3, wherein the request to close a specified network socket is a UNIX close( ) system call.

5. The method of claim 1, wherein identifying a particular filter entry containing data that corresponds to the specified socket, is performed by a module in the host computer system.

6. The method of claim 5, wherein:
   the module has a host-centric copy of the network interface device's filter table; and
   identifying the particular filter entry in the network interface device's filter table which corresponds to the specified socket comprises:
      searching the host-centric copy for an entry containing data therein that corresponds to the specified socket; and
      identifying the particular filter entry based on the entry found in the host-centric copy of the network interface device's filter table.

7. The method of claim 6, wherein searching the host-centric copy of the network interface device's filter table comprises a hashed search.

8. The method of claim 1, wherein the first set of filter entries and the second set of filter entries are the same set.

9. The method of claim 1, wherein the second set of filter entries includes the particular filter entry and all tombstoned entries in the particular chain of filter entries.

10. The method of claim 1, further comprising:
receiving a request to open a particular network socket;
identifying in the network interface device filter table an available filter entry in which to store data that corresponds to the particular socket.

11. The method of claim 10, wherein receiving the request to open a particular network socket is performed by a module in the host computer system.

12. The method of claim 11, wherein the module in the host computer system receiving a request to open a particular network socket runs as a kernel process of the host computer system and the request is received from a user level process.

13. The method of claim 12, wherein the request to open a particular network socket is a UNIX recvfrom( ), listen( ), or accept( ) system call.

14. The method of claim 1, wherein the data stored in a filter entry comprises criteria that is used by the network interface device to match data packets received from a network.

15. The method of claim 1, wherein garbage collection comprises replacing a tombstoned entry with an entry from later in the same chain which contains data corresponding to an open socket.

16. The method of claim 1, wherein garbage collection comprises removing all tombstoned entries from the particular chain of filter entries.

17. The method of claim 1, wherein garbage collection comprises removing all tombstoned entries from the filter table.

18. A network interface device for processing data packets received from a network, for use with a computing device, comprising:
a memory having stored therein in a non-transitory manner a filter table having a plurality of filter entries for filtering incoming data packets for a plurality of transport protocols, each filter entry in the plurality storing values that specify comparison criteria and identifying a respective queue in the computing device to which matching incoming data packets are to be delivered;
the comparison criteria identified by each of the filter entries including a destination IP address and at least one member of the group consisting of a source IP address, a source transport layer port number, and a destination transport layer port number; and
logic which, in response to receipt by the network interface device of a first incoming data packet:
calculates a first hash key in dependence upon content of the data packet, the first hash key identifying a first hash bucket in the filter table;
performs a first iterative search of entries in the filter table for a matching entry whose comparison criteria are satisfied by content of the data packet received from the network; and
if a matching entry was identified by the first iterative search, forwards the packet to the receive queue in the computing device that is indicated by the matching entry, wherein:
a first one of the filter entries in the plurality of filter entries is associated with a first transport protocol, and a second one of the filter entries in the plurality of filter entries is associated with a second transport protocol different from the first transport protocol; and
the first filter entry and the second filter entry store destination transport layer port numbers in different fields within the respective filter entry.

19. The network interface device of claim 18, wherein the comparison criteria identified by one of the filter entries includes at least a destination IP address and a destination transport layer port number.

20. The network interface device of claim 18, wherein the comparison criteria identified by one of the filter entries includes at least a destination IP address, a destination transport layer port number, and at least one of a source IP address and a source transport layer port number.

21. The network interface device of claim 18, wherein a field in a filter entry having a pre-determined wildcard value is considered to match the respective field of every incoming data packet.

22. The network interface device of claim 18, further comprising:
responsive to determining that the transport protocol indicator in the incoming data packet does not match any of the protocols of the plurality of protocols that are filtered using the filter table, forwarding the incoming data packet to a default queue in the computing device.

23. The network interface device of claim 18, wherein the logic searches for and fails to find a filter entry that qualifies as a full match before searching for an entry that qualifies as a wildcard match.

24. The network interface device of claim 23, wherein the logic, responsive to failing to find a matching filter entry while searching for a wildcard match, forwards the incoming data packet to a default queue in the computing device.

25. A network interface device for processing data packets received from a network, for use with a computing device, comprising:
a memory having stored therein in a non-transitory manner a filter table having a plurality of filter entries for filtering incoming data packets, said filter entries comprising at least one chain of filter entries, a chain length of a respective chain of filter entries comprising a number of entries between a first filter entry of the respective chain and a last filter entry that contains data corresponding to an open socket, inclusive; and
a resource configuration unit configured to:
replace with a tombstone marker data in an identified filter table entry that corresponds to a specific socket, in response to receipt from the computing device of a request to remove the identified filter table entry, when removing from the filter table data from a chain of filter entries including the identified filter table entry would not reduce a maximum chain length of filter entries in the filter table; and
receive from the computing device one or more requests that cause the resource configuration unit to perform garbage collection of tombstoned filter entries, responsive to a determination that removing from the filter table data from a chain of filter entries including the identified filter entry would reduce the maximum chain length of filter entries in the filter table.

26. A method for processing data packets received from a network, the method comprising:
storing a filter table having a plurality of filter entries for filtering incoming data packets for a plurality of transport protocols, each filter entry in the plurality of filter entries storing values that specify comparison criteria and identifying a respective queue in the computing device to which matching incoming data packets are to be delivered, wherein the comparison criteria identified by each of the filter entries includes a destination IP address and at least one member of the group consists of a source IP address, a source transport layer port number, and a destination transport layer port number;

receiving a first incoming data packet;

calculating a first hash key in dependence upon content of the first incoming data packet, the first hash key identifying a first hash bucket in the filter table;

performing a first iterative search of entries in the filter table for a matching entry whose comparison criteria are satisfied by content of the data packet received from the network; and responsive to the first iterative search identifying a matching a filter table entry, forwarding the packet to the receive queue in the computing device that is indicated by the matching entry, wherein:

a first one of the filter entries in the plurality of filter entries is associated with a first transport protocol, and a second one of the filter entries in the plurality of filter entries is associated with a second transport protocol different from the first transport protocol; and the first filter entry and the second filter entry store destination transport layer port numbers in different fields within the respective filter entry.

27. A network interface device for processing data packets received from a network, for use with a computing device, comprising:

a memory having stored therein in a non-transitory manner a filter table having a plurality of filter entries for filtering incoming data packets for a plurality of transport protocols, each filter entry in the plurality storing values that specify comparison criteria and identifying a respective queue in the computing device to which matching incoming data packets are to be delivered;

the comparison criteria identified by each of the filter entries including a destination IP address and at least one member of the group consisting of a source IP address, a source transport layer port number, and a destination transport layer port number; and logic which, in response to receipt by the network interface device of a first incoming data packet:

calculates a first hash key in dependence upon content of the data packet, the first hash key identifying a first hash bucket in the filter table;

performs a first iterative search of entries in the filter table for a matching entry whose comparison criteria are satisfied by content of the data packet received from the network; and if a matching entry was identified by the first iterative search, forwards the packet to the receive queue in the computing device that is indicated by the matching entry, wherein:

the first iterative search of filter entries is successful upon finding a filter entry that qualifies as a full match, wherein a full match comprises the incoming data packet matching a filter entry that specifies a non-wildcard value for a set of required fields comprising the destination IP address, the destination transport layer port address, and at least one of the source IP address or the source transport layer port address; and every value in the set of required fields matches the respective fields in the incoming data packet.

28. A network interface device for processing data packets received from a network, for use with a computing device, comprising:

a memory having stored therein in a non-transitory manner a filter table having a plurality of filter entries for filtering incoming data packets for a plurality of transport protocols, each filter entry in the plurality storing values that specify comparison criteria and identifying a respective queue in the computing device to which matching incoming data packets are to be delivered;

the comparison criteria identified by each of the filter entries including a destination IP address and at least one member of the group consisting of a source IP address, a source transport layer port number, and a destination transport layer port number; and logic which, in response to receipt by the network interface device of a first incoming data packet:

calculates a first hash key in dependence upon content of the data packet, the first hash key identifying a first hash bucket in the filter table;

performs a first iterative search of entries in the filter table for a matching entry whose comparison criteria are satisfied by content of the data packet received from the network; and if a matching entry was identified by the first iterative search, forwards the packet to the receive queue in the computing device that is indicated by the matching entry, wherein:

the logic considers the first iterative search of filter entries to be successful upon finding a filter entry that qualifies as a wildcard match with the incoming data packet, wherein the filter entry specifies a non-wildcard value for a set of required fields comprising the destination IP address, and the destination transport layer port address; and every value in the set of required fields matches the respective fields in the incoming data packet.

29. A method for processing data packets received from a network, the method comprising:

storing a filter table having a plurality of filter entries for filtering incoming data packets for a plurality of transport protocols, each filter entry in the plurality of filter entries storing values that specify comparison criteria and identifying a respective queue in the computing device to which matching incoming data packets are to be delivered, wherein the comparison criteria identified by each of the filter entries includes a destination IP address and at least one member of the group consists of a source IP address, a source transport layer port number, and a destination transport layer port number;

receiving a first incoming data packet;

calculating a first hash key in dependence upon content of the first incoming data packet, the first hash key identifying a first hash bucket in the filter table;

performing a first iterative search of entries in the filter table for a matching entry whose comparison criteria are satisfied by content of the data packet received from the network;

responsive to the first iterative search identifying a matching a filter table entry, forwarding the packet to the receive queue in the computing device that is indicated by the matching entry, wherein:

the first iterative search of filter entries is successful upon finding a filter entry that qualifies as a full match, wherein a full match comprises the incoming data packet matching a filter entry that specifies a non-wildcard value for a set of required fields comprising the destination IP address, the destination transport layer port address, and at least one of the source IP address or the source transport layer port address; and every value in the set of required fields matches the respective fields in the incoming data packet.

30. A method for processing data packets received from a network, the method comprising:
storing a filter table having a plurality of filter entries for filtering incoming data packets for a plurality of transport protocols, each filter entry in the plurality of filter entries storing values that specify comparison criteria and identifying a respective queue in the computing device to which matching incoming data packets are to be delivered, wherein the comparison criteria identified by each of the filter entries includes a destination IP address and at least one member of the group consists of a source IP address, a source transport layer port number, and a destination transport layer port number;
receiving a first incoming data packet;
calculating a first hash key in dependence upon content of the first incoming data packet, the first hash key identifying a first hash bucket in the filter table;
performing a first iterative search of entries in the filter table for a matching entry whose comparison criteria are satisfied by content of the data packet received from the network; and
responsive to the first iterative search identifying a matching a filter table entry, forwarding the packet to the receive queue in the computing device that is indicated by the matching entry, wherein:
the logic considers the first iterative search of filter entries to be successful upon finding a filter entry that qualifies as a wildcard match with the incoming data packet, wherein the filter entry specifies a non-wildcard value for a set of required fields comprising the destination IP address, and the destination transport layer port address; and
every value in the set of required fields matches the respective fields in the incoming data packet.

* * * * *